US007581512B2

(12) United States Patent
Cole et al.

(10) Patent No.: US 7,581,512 B2
(45) **Date of Patent: *Sep. 1, 2009**

(54) PAN BREEDER FEEDER

(75) Inventors: Theodore J. Cole, Milford, IN (US); Lionel L. Kreger, Warsaw, IN (US); Charles R. Bird, Milford, IN (US)

(73) Assignee: CTB, Inc., Milford, IN (US)

( * ) Notice: Subject to any disclaimer, the term of this patent is extended or adjusted under 35 U.S.C. 154(b) by 203 days.

This patent is subject to a terminal disclaimer.

(21) Appl. No.: 11/539,943

(22) Filed: Oct. 10, 2006

(65) Prior Publication Data

US 2007/0186862 A1 Aug. 16, 2007

Related U.S. Application Data

(60) Provisional application No. 60/725,358, filed on Oct. 11, 2005.

(51) Int. Cl.
*A01K 5/02* (2006.01)

(52) U.S. Cl. ....................................... 119/53; 119/56.1

(58) Field of Classification Search ................ 119/61.5, 119/52.1, 52.4, 53, 56.1, 56.2; D30/131
See application file for complete search history.

(56) References Cited

U.S. PATENT DOCUMENTS

| | | | |
|---|---|---|---|
| 31,256 | A | 1/1861 | Myer |
| 89,791 | A | 5/1869 | Quick |
| 91,084 | A | 6/1869 | Carr |
| 96,740 | A | 11/1869 | Springstead |
| 364,557 | A | 6/1887 | Walin |
| 414,405 | A | 11/1889 | Hallock |
| 434,697 | A | 8/1890 | Browne |
| 478,246 | A | 7/1892 | Stoner |
| 570,569 | A | 11/1896 | Smith |

(Continued)

FOREIGN PATENT DOCUMENTS

| | | |
|---|---|---|
| DE | 101 64 100 | 4/2003 |

(Continued)

OTHER PUBLICATIONS

HaiKoo Product Brochure by Roxell; Dated Mar. 2005; Four (4) pages.

(Continued)

*Primary Examiner*—Kimberly S Smith
(74) *Attorney, Agent, or Firm*—Trexler, Bushnell, Giangiorgi, Blackstone & Marr, Ltd

(57) ABSTRACT

A feeder assembly is used in a feed distribution system having a feed supply conduit. The feeder assembly includes a pan member, which is preferably elongated in configuration, in a shape of two intersecting circles. The feeder assembly also includes at least one fill port for receiving feed from the feed supply conduit and for providing feed onto a base portion of the pan member. The at least one fill port is defined through an outer grill member which is operatively associated with the pan member. Like the pan member, the outer grill member has a rim member which is preferably elongated in configuration, in a shape of two intersecting circles. The outer grill member defines a plurality of apertures therethrough through which birds can eat the feed presented on the base portion of the pan member.

33 Claims, 61 Drawing Sheets

U.S. PATENT DOCUMENTS

| | | | | |
|---|---|---|---|---|
| 580,054 | A | | 4/1897 | Merriman |
| 905,393 | A | | 12/1908 | Webb |
| 948,014 | A | | 2/1910 | Lewis |
| 984,980 | A | | 2/1911 | Taylor |
| 1,069,943 | A | | 8/1913 | Haffey |
| 1,131,491 | A | | 3/1915 | Drake |
| 1,154,073 | A | | 9/1915 | Stocking |
| 1,463,063 | A | * | 7/1923 | Rysdon .................... 119/61.5 |
| 1,565,117 | A | | 12/1925 | Stabbert |
| 1,699,501 | A | | 1/1929 | McCartney |
| 1,862,349 | A | | 6/1932 | Perry |
| 2,111,456 | A | | 3/1938 | Markle, Jr. |
| D123,236 | S | | 10/1940 | Perlmutter |
| D132,100 | S | | 4/1942 | Ipsen |
| 2,323,117 | A | | 6/1943 | Carmo |
| 2,457,432 | A | | 12/1948 | Ballard |
| D155,753 | S | | 10/1949 | Warner |
| D156,872 | S | | 1/1950 | Dreitzer |
| 2,533,853 | A | | 12/1950 | Tinder |
| D167,709 | S | | 9/1952 | Muehlfeld |
| 2,653,570 | A | | 9/1953 | Grindstaff |
| 2,681,639 | A | | 6/1954 | Littlefield |
| 2,709,417 | A | | 5/1955 | Brembeck |
| 2,715,386 | A | | 8/1955 | Jones |
| 2,789,534 | A | | 4/1957 | Landgraf |
| 2,804,844 | A | | 9/1957 | Gigliotti |
| D182,624 | S | * | 4/1958 | Rysdon et al. ............ D30/131 |
| 2,875,729 | A | | 3/1959 | Gibson |
| 2,884,899 | A | | 5/1959 | Jackes et al. |
| 2,933,064 | A | | 4/1960 | Geerlings |
| 2,941,506 | A | | 6/1960 | Fulton |
| D188,655 | S | | 8/1960 | Blough |
| 3,085,552 | A | | 4/1963 | Pilch |
| 3,102,511 | A | | 9/1963 | Atcheson |
| 3,105,463 | A | | 10/1963 | Pilch |
| RE25,589 | E | | 6/1964 | Hostetler et al. |
| 3,203,397 | A | | 8/1965 | Henry |
| 3,205,860 | A | | 9/1965 | Moore |
| 3,211,131 | A | | 10/1965 | Klein |
| 3,230,933 | A | | 1/1966 | Myers et al. |
| 3,330,255 | A | | 7/1967 | Scott et al. |
| 3,388,690 | A | | 6/1968 | Hostetler |
| 3,389,689 | A | | 6/1968 | Van Huis |
| 3,408,988 | A | | 11/1968 | Lee |
| 3,476,087 | A | | 11/1969 | Scott et al. |
| 3,485,215 | A | | 12/1969 | Scott et al. |
| 3,490,419 | A | | 1/1970 | Van Huis |
| 3,503,372 | A | | 3/1970 | Saurer |
| 3,511,215 | A | | 5/1970 | Myers |
| 3,547,082 | A | | 12/1970 | Blessin |
| 3,566,843 | A | | 3/1971 | Van Huis |
| 3,585,970 | A | | 6/1971 | Scott et al. |
| D221,099 | S | | 7/1971 | Alparone |
| D221,370 | S | | 8/1971 | Hutzler |
| 3,628,505 | A | | 12/1971 | Myers |
| 3,648,661 | A | | 3/1972 | Moore |
| 3,675,627 | A | | 7/1972 | Myers |
| 3,742,913 | A | | 7/1973 | Crippen |
| D230,612 | S | * | 3/1974 | Williamson ............... D30/131 |
| 3,807,359 | A | | 4/1974 | Hostetler |
| 3,811,412 | A | | 5/1974 | Murto et al. |
| 3,827,405 | A | | 8/1974 | Allen |
| 3,901,194 | A | | 8/1975 | Meyer et al. |
| 3,908,601 | A | | 9/1975 | Geary |
| 3,911,868 | A | | 10/1975 | Brembeck |
| 3,971,340 | A | | 7/1976 | Allen |
| 3,999,519 | A | | 12/1976 | Rodemeyer |
| 4,003,339 | A | | 1/1977 | Hostetler |
| 4,070,990 | A | | 1/1978 | Swartzendruber |
| 4,082,064 | A | | 4/1978 | Newell, III |
| 4,200,060 | A | | 4/1980 | Van Daele |
| 4,216,742 | A | | 8/1980 | Kirchhofer |
| 4,223,638 | A | | 9/1980 | Sappington et al. |
| 4,348,988 | A | | 9/1982 | Lawson |
| 4,353,329 | A | | 10/1982 | Thibault |
| 4,355,596 | A | | 10/1982 | Peppler |
| 4,357,905 | A | | 11/1982 | Carpenter |
| 4,361,117 | A | | 11/1982 | Tohme |
| 4,380,214 | A | | 4/1983 | Williams |
| D269,586 | S | | 7/1983 | Allgeyer et al. |
| 4,401,057 | A | | 8/1983 | Van Gilst |
| 4,476,811 | A | | 10/1984 | Swartzendruber |
| 4,488,509 | A | | 12/1984 | Awalt |
| 4,527,513 | A | | 7/1985 | Hart et al. |
| 4,552,095 | A | | 11/1985 | Segalla |
| D286,692 | S | | 11/1986 | DePew |
| 4,676,197 | A | | 6/1987 | Hoover |
| 4,722,301 | A | | 2/1988 | Strong |
| 4,800,844 | A | | 1/1989 | Van Gilst |
| 4,815,417 | A | | 3/1989 | Strong |
| 4,834,026 | A | | 5/1989 | Brembeck et al. |
| D302,750 | S | | 8/1989 | Brembeck et al. |
| 4,953,505 | A | | 9/1990 | Lia |
| 4,987,859 | A | | 1/1991 | Vanderzanden |
| 4,995,343 | A | | 2/1991 | Cole et al. |
| 5,007,380 | A | | 4/1991 | Badia et al. |
| D321,959 | S | | 11/1991 | Cole et al. |
| D322,911 | S | | 1/1992 | Schmengler |
| D322,912 | S | | 1/1992 | Schmengler |
| 5,092,274 | A | | 3/1992 | Cole et al. |
| 5,097,797 | A | | 3/1992 | Van Zee et al. |
| 5,101,765 | A | | 4/1992 | Manfrin |
| 5,101,766 | A | | 4/1992 | Runion |
| 5,113,797 | A | | 5/1992 | van Daele |
| 5,117,778 | A | | 6/1992 | Imamura |
| 5,199,382 | A | | 4/1993 | Adriano |
| 5,218,926 | A | | 6/1993 | Wenstrand |
| 5,241,900 | A | * | 9/1993 | Piane, Sr. .................... 99/422 |
| 5,249,700 | A | | 10/1993 | Dumke |
| D341,449 | S | | 11/1993 | Conner |
| 5,275,131 | A | | 1/1994 | Brake et al. |
| 5,311,839 | A | | 5/1994 | Pollock et al. |
| 5,406,907 | A | | 4/1995 | Hart |
| 5,435,267 | A | | 7/1995 | Patterson |
| 5,456,210 | A | | 10/1995 | Miller |
| 5,462,017 | A | | 10/1995 | Pollock et al. |
| 5,463,980 | A | | 11/1995 | Rasmussen |
| 5,479,891 | A | | 1/1996 | Dollar et al. |
| 5,497,730 | A | | 3/1996 | van Daele et al. |
| 5,517,944 | A | | 5/1996 | Bate et al. |
| 5,564,363 | A | | 10/1996 | Soffici |
| 5,588,394 | A | | 12/1996 | Balistreri |
| 5,699,753 | A | | 12/1997 | Aldridge, III |
| 5,718,187 | A | | 2/1998 | Pollock et al. |
| 5,762,021 | A | | 6/1998 | Horwood et al. |
| 5,765,503 | A | | 6/1998 | van Daele |
| 5,778,821 | A | | 7/1998 | Horwood et al. |
| 5,782,200 | A | | 7/1998 | Knowles et al. |
| 5,794,562 | A | | 8/1998 | Hart |
| 5,875,733 | A | | 3/1999 | Chen |
| 5,884,581 | A | | 3/1999 | Vandaele |
| D409,055 | S | | 5/1999 | Johnson et al. |
| 5,927,232 | A | | 7/1999 | Pollock |
| 5,941,193 | A | | 8/1999 | Cole |
| 5,957,083 | A | | 9/1999 | Cheng |
| 5,960,982 | A | | 10/1999 | Perlis et al. |
| 5,996,530 | A | | 12/1999 | Miller et al. |
| 6,050,220 | A | | 4/2000 | Kimmel et al. |
| 6,055,934 | A | | 5/2000 | Burns et al. |
| D426,682 | S | | 6/2000 | Kreger et al. |
| 6,083,339 | A | | 7/2000 | Peters et al. |
| 6,170,435 | B1 | | 1/2001 | Momont et al. |
| 6,173,676 | B1 | | 1/2001 | Cole |
| D444,676 | S | | 7/2001 | Murphy |

| | | | | |
|---|---|---|---|---|
| 6,314,909 | B1 | 11/2001 | Horwood | |
| 6,349,672 | B1 | 2/2002 | Daffi | |
| D460,839 | S | 7/2002 | Kreger et al. | |
| 6,467,429 | B1 | 10/2002 | Plouzen | |
| 6,470,826 | B2 | 10/2002 | Thuline | |
| 6,474,261 | B1 | 11/2002 | Turner et al. | |
| 6,644,241 | B2 * | 11/2003 | Brown | 119/61.5 |
| 6,655,317 | B1 | 12/2003 | Steudler, Jr. et al. | |
| 6,659,040 | B1 * | 12/2003 | Decker | 119/52.1 |
| D491,320 | S | 6/2004 | Cole et al. | |
| D491,696 | S | 6/2004 | Cole et al. | |
| 6,779,488 | B2 | 8/2004 | Corti et al. | |
| 6,786,178 | B2 | 9/2004 | De Rouck | |
| D498,565 | S | 11/2004 | Cole et al. | |
| D499,218 | S | 11/2004 | Cole et al. | |
| 7,107,932 | B2 | 9/2006 | Cole et al. | |
| D530,045 | S | 10/2006 | Cole et al. | |
| 7,162,973 | B2 | 1/2007 | Cole et al. | |
| 7,228,817 | B2 | 6/2007 | Busse | |
| 2001/0047766 | A1 | 12/2001 | Thuline | |
| 2002/0117116 | A1 * | 8/2002 | Chrisco et al. | 119/56.1 |
| 2002/0152965 | A1 | 10/2002 | Turner et al. | |
| 2003/0106498 | A1 | 6/2003 | Mersits et al. | |
| 2003/0192480 | A1 | 10/2003 | Bennett | |
| 2004/0016408 | A1 | 1/2004 | Gaspary et al. | |
| 2004/0050336 | A1 | 3/2004 | De Rouck | |
| 2005/0039690 | A1 | 2/2005 | Sage, Jr. | |
| 2007/0028844 | A1 * | 2/2007 | Bodenstab et al. | 119/52.1 |

FOREIGN PATENT DOCUMENTS

| | | |
|---|---|---|
| DE | 101 64 122 | 5/2003 |
| EP | 0 951 825 | 10/1999 |
| FR | 2 678 480 | 1/1993 |
| FR | 2 680 949 | 3/1993 |
| JP | 11341933 | 12/1999 |
| TW | 226518 | 7/1994 |
| TW | 342596 | 10/1998 |
| TW | 343434 | 10/1998 |
| WO | 01/06846 | 2/2001 |
| WO | 01/52790 | 7/2001 |

OTHER PUBLICATIONS

Kixoo Product Brochure by Roxell; Dated Mar. 2004; Six (6) pages.

Augermatic & TruPan Product Brochure by Big Dutchman; Dated Aug. 2001; Six (6) pages.

Augermatic Product Brochure by Big Dutchman; Dated Jun. 2001; Six (6) pages.

Model ATF Turkey Feeder Brochure by Chore-Time; Dated Dec. 1993; Two (2) pages.

Tru Pan Brochure by Big Dutchman; One (1) page.

Fluxx Broiler Feeding System by Big Dutchman; Two (2) pages.

Two (2) page printout from www.roxell.com regarding Laica pan feeding system.

One (1) page printout from www.roxell.com regarding Vitoo pan feeding system.

* cited by examiner

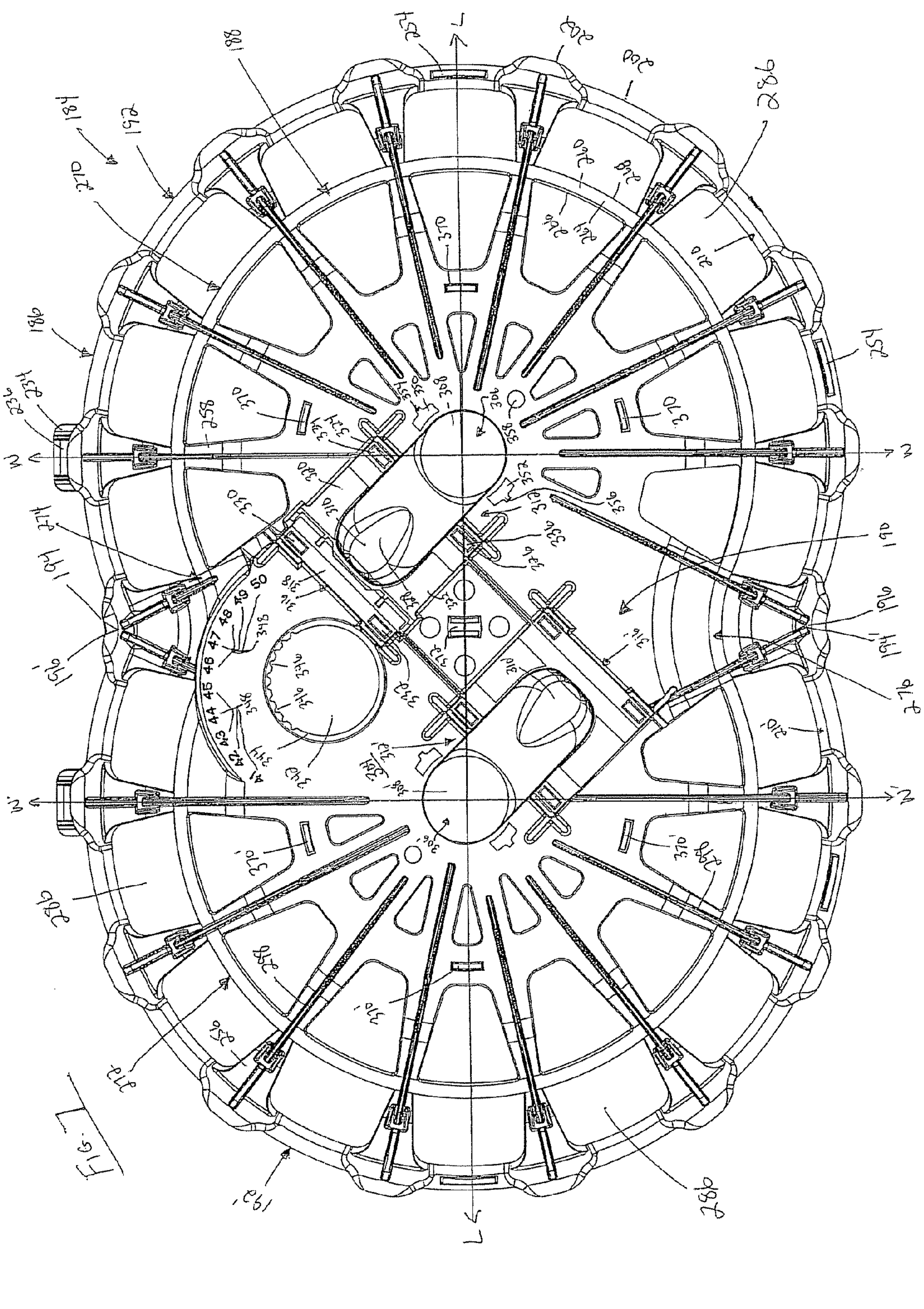

PAN BREEDER FEEDER

CROSS-REFERENCE AND INCORPORATION BY REFERENCE

This patent application claims the benefit of domestic priority of U.S. Provisional Application Ser. No. 60/725,358, filed Oct. 11, 2005, and entitled “Pan Breeder Feeder”. U.S. Provisional Application Ser. No. 60/725,358 is hereby incorporated by reference.

FIELD OF THE INVENTION

The invention generally relates to the field of feeder assemblies used for feeding livestock, specifically poultry.

BACKGROUND OF THE INVENTION

As the broiler breeder market worldwide is followed and tracked, growing changes to the size of the building have been found, such that the buildings are becoming wider and longer. It has further been found that more birds are being placed in these new, larger buildings (higher stocking density) as a greater amount of ventilation, cooling, and automated ventilation controls are being utilized. The dilemma this has created is related to being able to provide sufficient feed space for the birds, but to not take up floor space with feeding equipment. The broiler breeder layer house disposition of feeding system has been dominated by the chain trough-type feeder for years because of its low cost, familiarity, simplicity, and complacency of the integrators to change.

For the broiler breeder pullet (rearing) house, the pan feeder has been the accepted feeder of choice because of feed savings, improved bird uniformity, less stress on the birds, and less mortality, which relates to better performance in the layer house. Most integrator breeder production people recognize they could improve performance and attain feed savings in the broiler breeder house based on the results they have experienced in the pullet houses and from breeder layer houses that have pan feeders. In reference to the trend change of making the houses or buildings larger, the wider building size offers the opportunity for the pan feeding system as typical round feeders generally offer 30% more feeding space over a trough-type feeder. However, it has been recognized that these typical round pan feeders may not offer sufficient feeder space for the future unless additional feeder lines are placed into the house, which would invariably increase the system cost, and would also take up valuable floor space.

This trend has been recognized in the industry such that pan feeders have been developed which will feed up to sixteen (16) birds per pan, compared to the customary system that will handle fourteen (14) birds per pan. By having a feeder pan that can feed a greater number of birds, there will not be the requirement to add more feeder lines to the breeder house. Another scenario is the replacement/upgrade feeder market where chain feeders will be replaced by pan feeders to improve bird performance and efficiency. Thus, fewer feed pans will be able to be placed in the older/conventional houses for a cost saving to the producer.

Of all of the major poultry equipment companies in the world, only one, Roxell N.V., is known to have been progressive in this area by designing a pan feeder specifically for broiler breeders. Specifically, Roxell N.V. is the assignee of U.S. Pat. No. 6,786,178 and manufactures and sells the Kixoo® Feeder. The ’178 patent discloses and claims a feeder dispenser having a dispenser tray which is non-circular in shaped, and which has a circumferential edge with first edge area which have a relatively large radius of curvature and second edge area which have a relatively small radius of curvature, as well as guide means for guiding feed from a horizontal feed conveyor pipe to the dispenser tray. The Kixoo® Feeder meets this description of the ’178 patent as the Kixoo® Feeder is generally elliptical in configuration. The Kixoo® Feeder has also met with much interest and much sales in the marketplace, but the Kixoo® Feeder does have its drawbacks.

While the Kixoo® Feeder increased the number of birds which can feed from the feeder from fourteen (14) to sixteen (16), it would obviously be more desirable to feed even more birds from a single feeder if possible, without causing other detriment within the poultry house. Also, as the Kixoo® Feeder is generally elliptical and thus elongated, problems have arisen with regard to feed flow to the outer limits of the feed pan through the single drop tube member.

SUMMARY OF THE INVENTION

Briefly, and in accordance with the foregoing, the invention provides a feeder assembly for use in a feed distribution system having a feed supply conduit. The feeder assembly includes a pan member, which is preferably elongated in configuration, in a shape of either two intersecting circles or an oval, such as a racetrack configuration or an elliptical configuration. The feeder assembly also includes first and second fill ports for receiving feed from the feed supply conduit and for providing feed onto a base portion of the pan member. Each fill port provides feed to a separate portion of the base portion of the elongated pan member. The fill ports are defined through an outer grill member which is operatively associated with the pan member. Like the pan member, the outer grill member has a rim member which is preferably elongated in configuration, in a shape of either two intersecting circles or an oval, such as a racetrack configuration or an elliptical configuration.

First and second drop tube members are associated with the first and second fill ports, respectively, in order to direct feed flowing through the first and second fill ports through first and second lower feed gates and onto the pan member. The first and second drop tube members can be raised and lowered to adjust the height of the first and second lower feed gates. In one embodiment, the first and second drop tube members are each provided with a brood or upper feed gate to allow feed to flow onto the pan member and be provided at a raised level compared to that which can be provided through the lower feed gates. A feed gate blocker can be moved, preferably manually, to block feed from flowing through the brood gate, if desired.

The outer grill member defines a plurality of apertures therethrough through which birds can eat the feed presented on the base portion of the pan member. The feeder assembly provides first and second inner grill members therein which can be rotated to partially mask the apertures through the outer grill member in order to effectively change the width of the apertures. The inner grill members are connected to one another by interlocking fingers such that rotation of one of the inner grill members causes rotation of the other inner grill member in the opposite direction. The inner grill members are rotated by a dial member which is secured to the outer grill member and which, upon rotation thereof between predetermined positions, causes rotation of the one inner grill member, which in turn causes rotation of the other inner grill member in the opposite direction.

The feeder assembly also provides an outer ring member which is positioned around and engaged with the outer grill member. The outer ring member can be manipulated to move the outer ring member either upwardly or downwardly to partially mask the apertures through the outer grill member in order to effectively change the height of the apertures.

The longitudinal length of each feeder is provided at an angle, preferably 45 degrees, relative to the longitudinal length of the feed supply conduit, such that the feeder assemblies minimize the amount of floor space in a poultry house.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIG. 10 is a second side plan view of the outer grill member;

FIG. 12 is a cross-sectional view of the outer grill member taken along line L-L of FIG. 7;

FIG. 40 is a bottom view of the first embodiment of the feeder assembly connected to the feed supply conduit;

DETAILED DESCRIPTION OF THE ILLUSTRATED EMBODIMENTS

Figure 1:
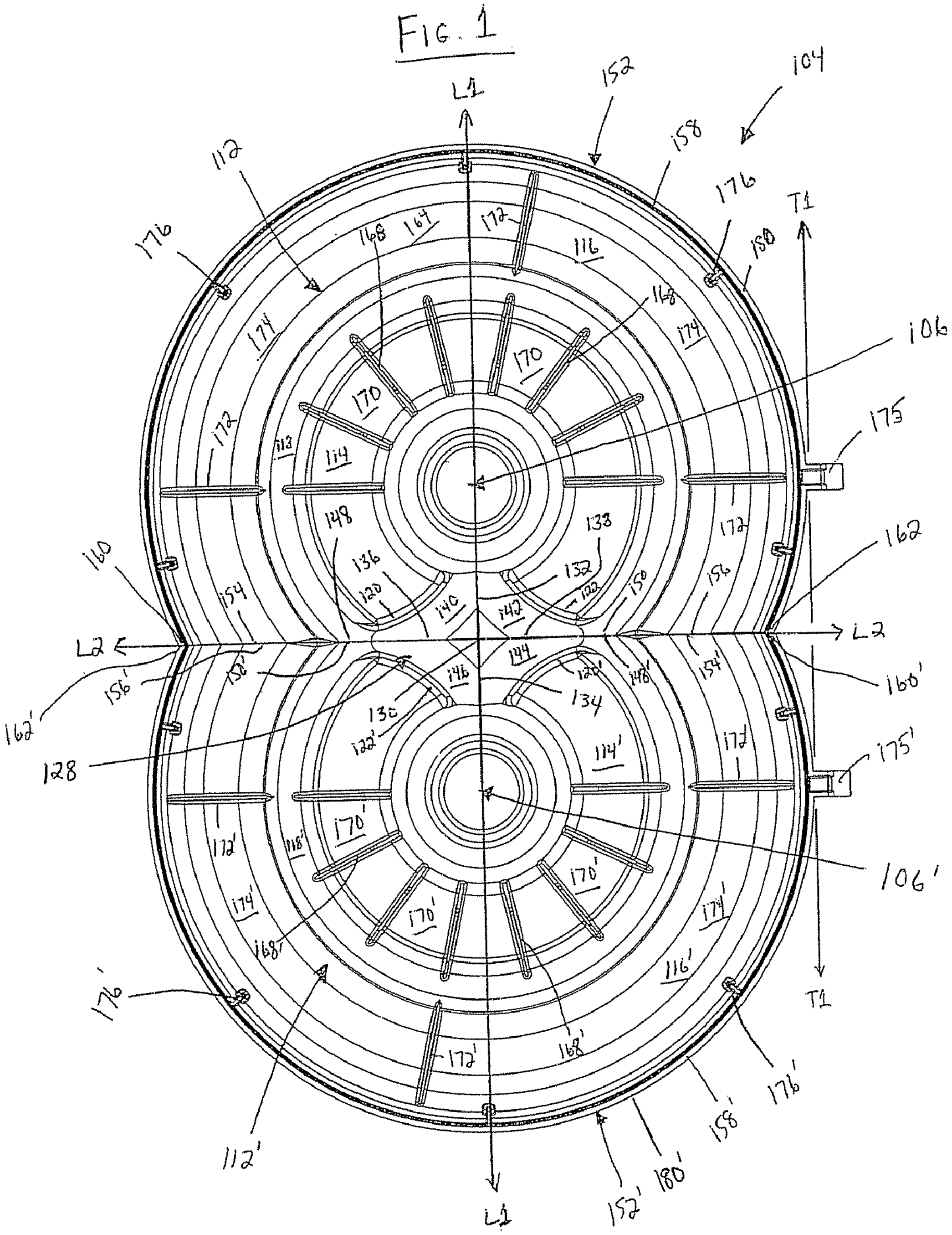
FIG. 1 is a top plan view of a pan member which incorporates features of a first embodiment of a feeder assembly of the invention.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

Figure 67:
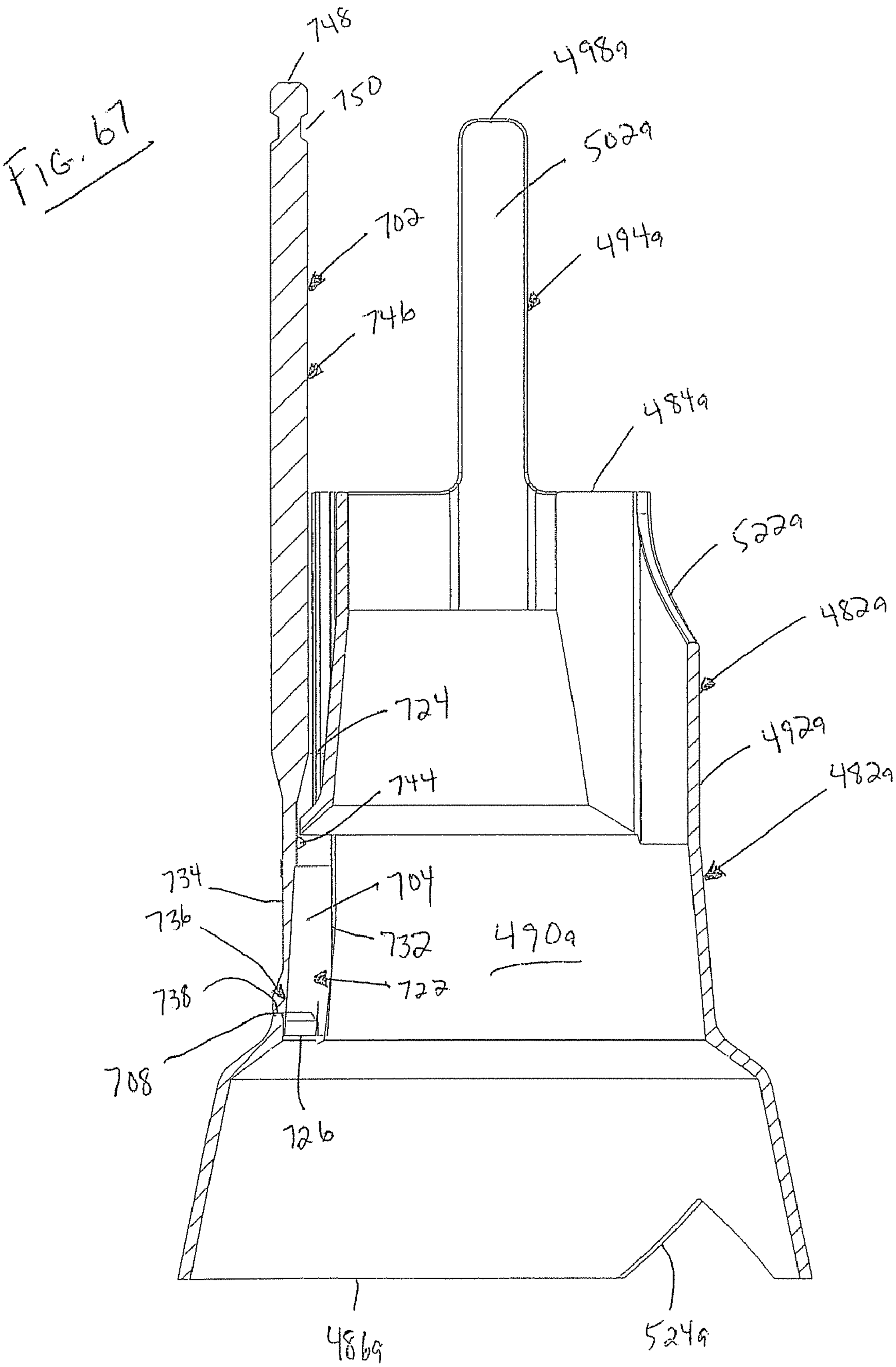
FIG. 67 is a cross-sectional view of the drop tube member and the brood gate blocker with the brood gate blocker in a position to prevent feed from flowing through the upper brood gate.
Figure 68:
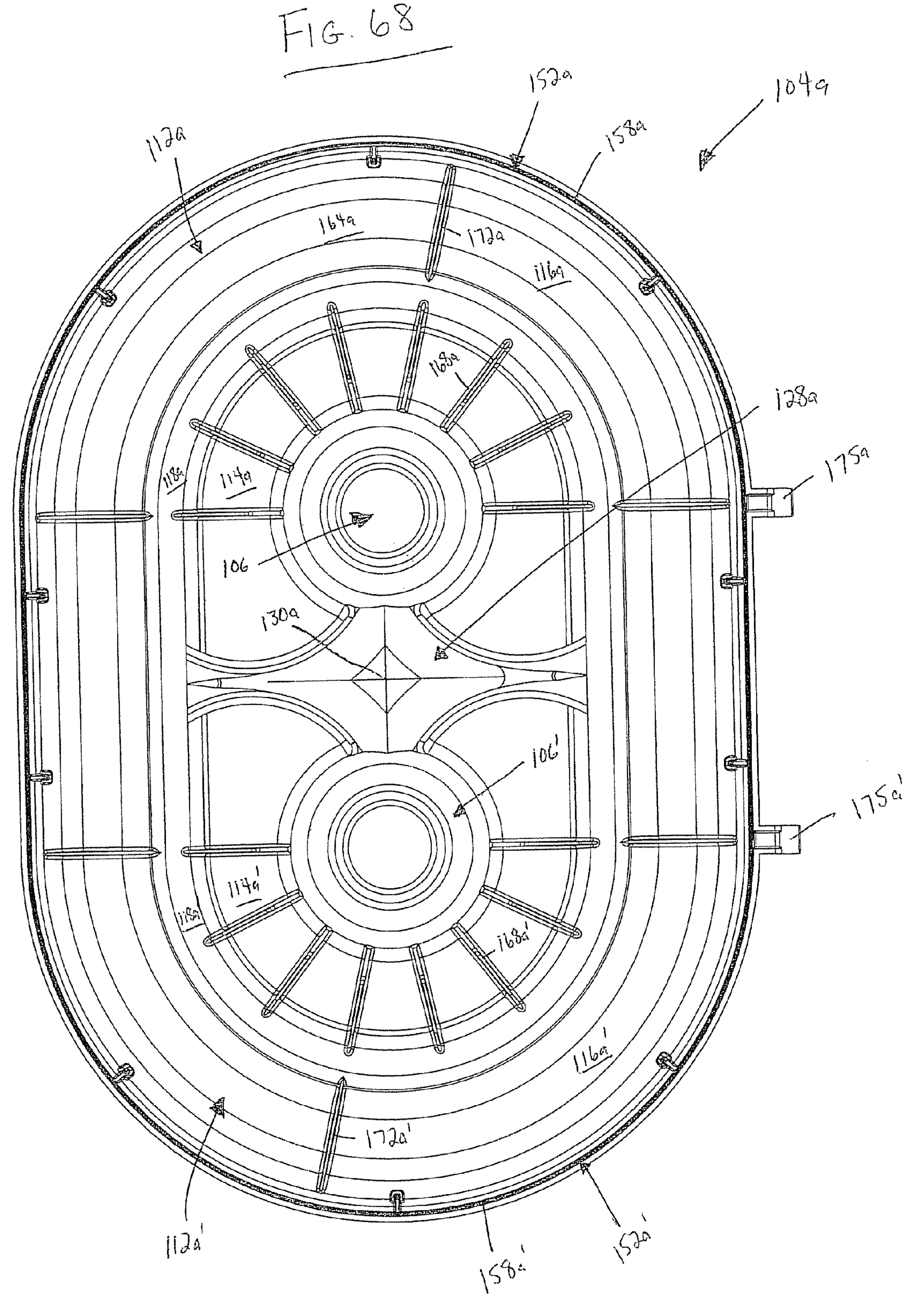
FIG. 68 is a top plan view of a pan member which incorporates features of a third embodiment of a feeder assembly of the invention.
Figure 69:
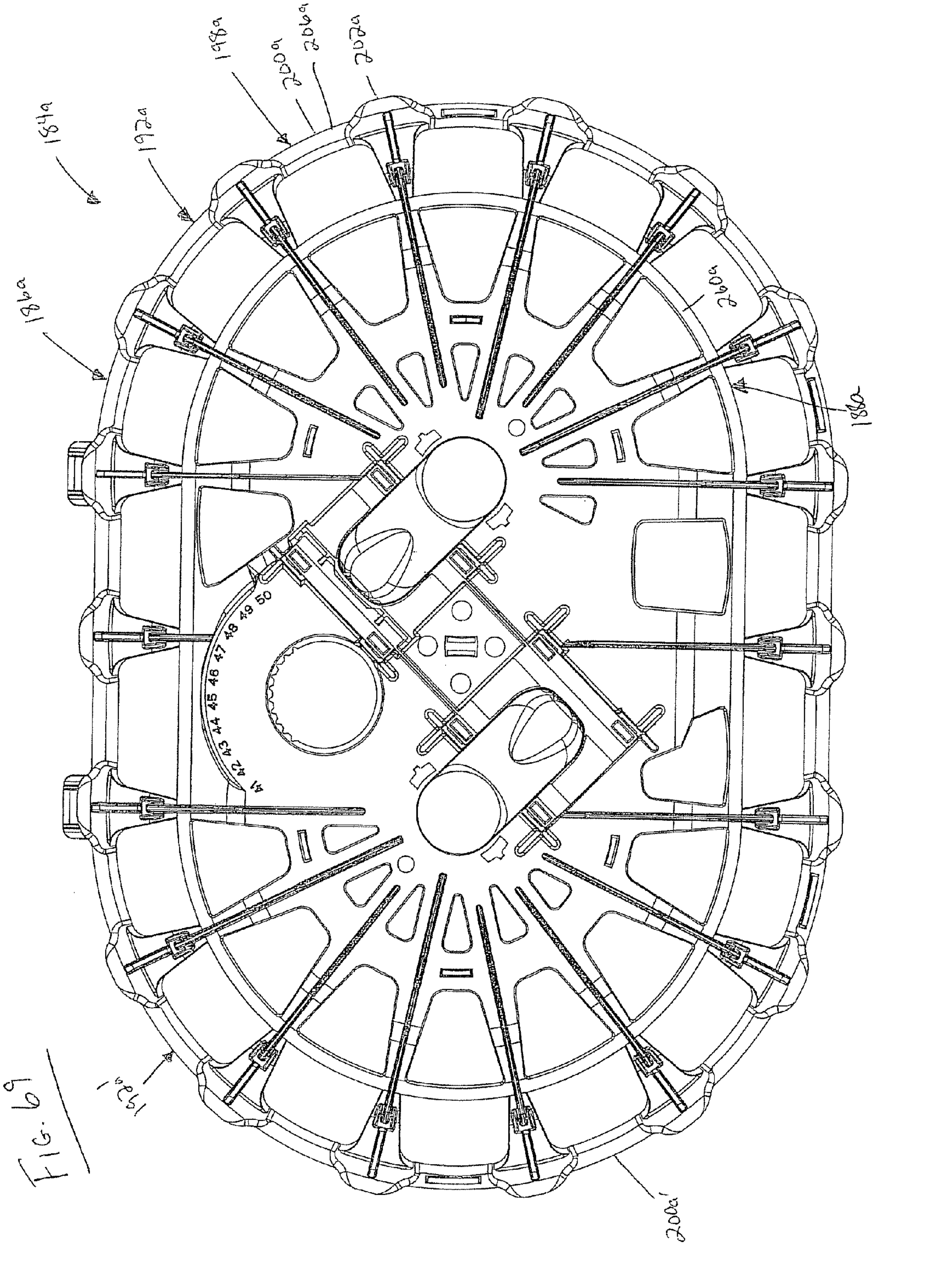
FIG. 69 is a top plan view of a grill member which incorporates features of the third embodiment of the feeder assembly of the invention.
Figure 70:
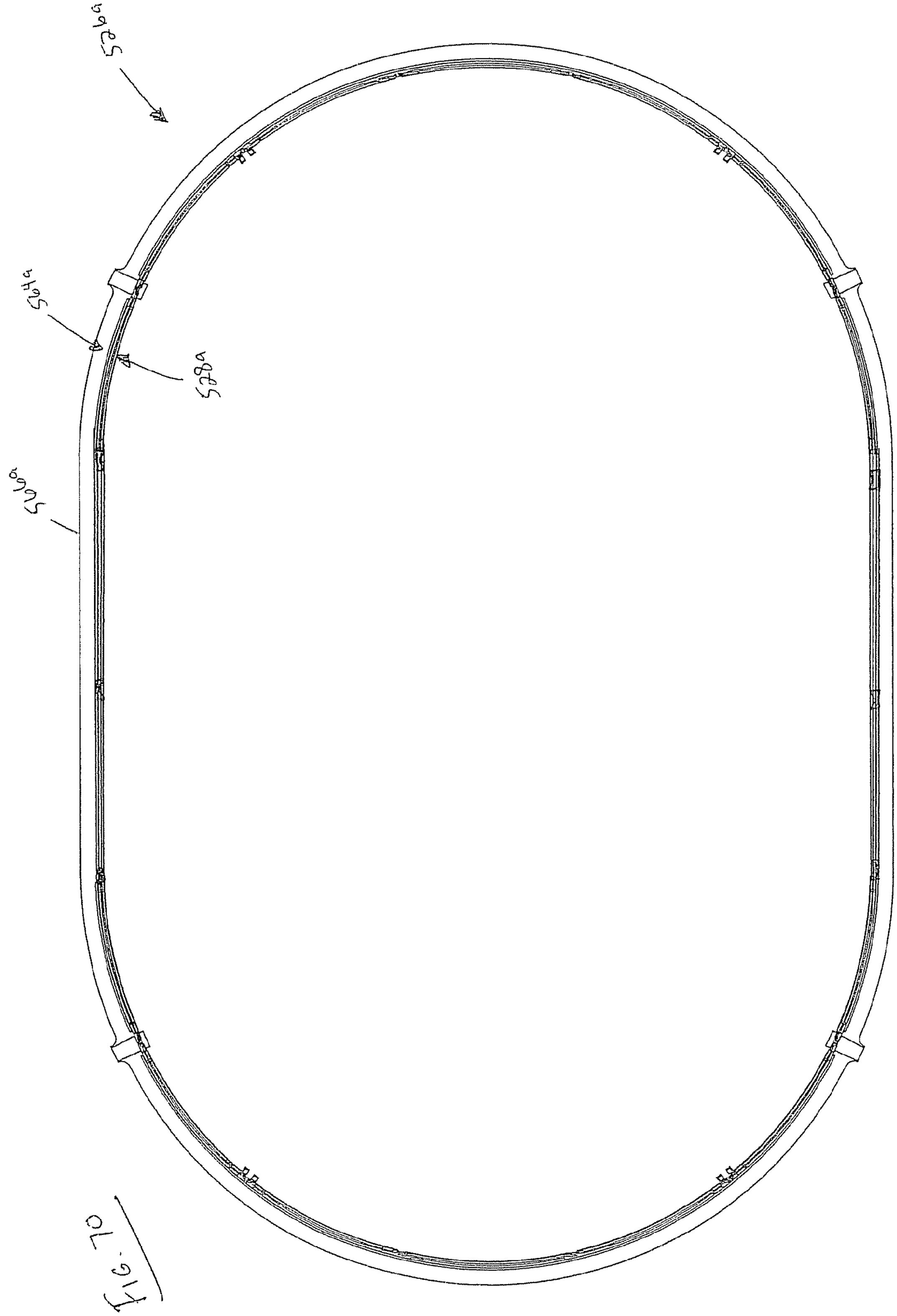
FIG. 70 is a top plan view of an outer ring member which incorporates features of the third embodiment of the feeder assembly of the invention.
Figure 71:
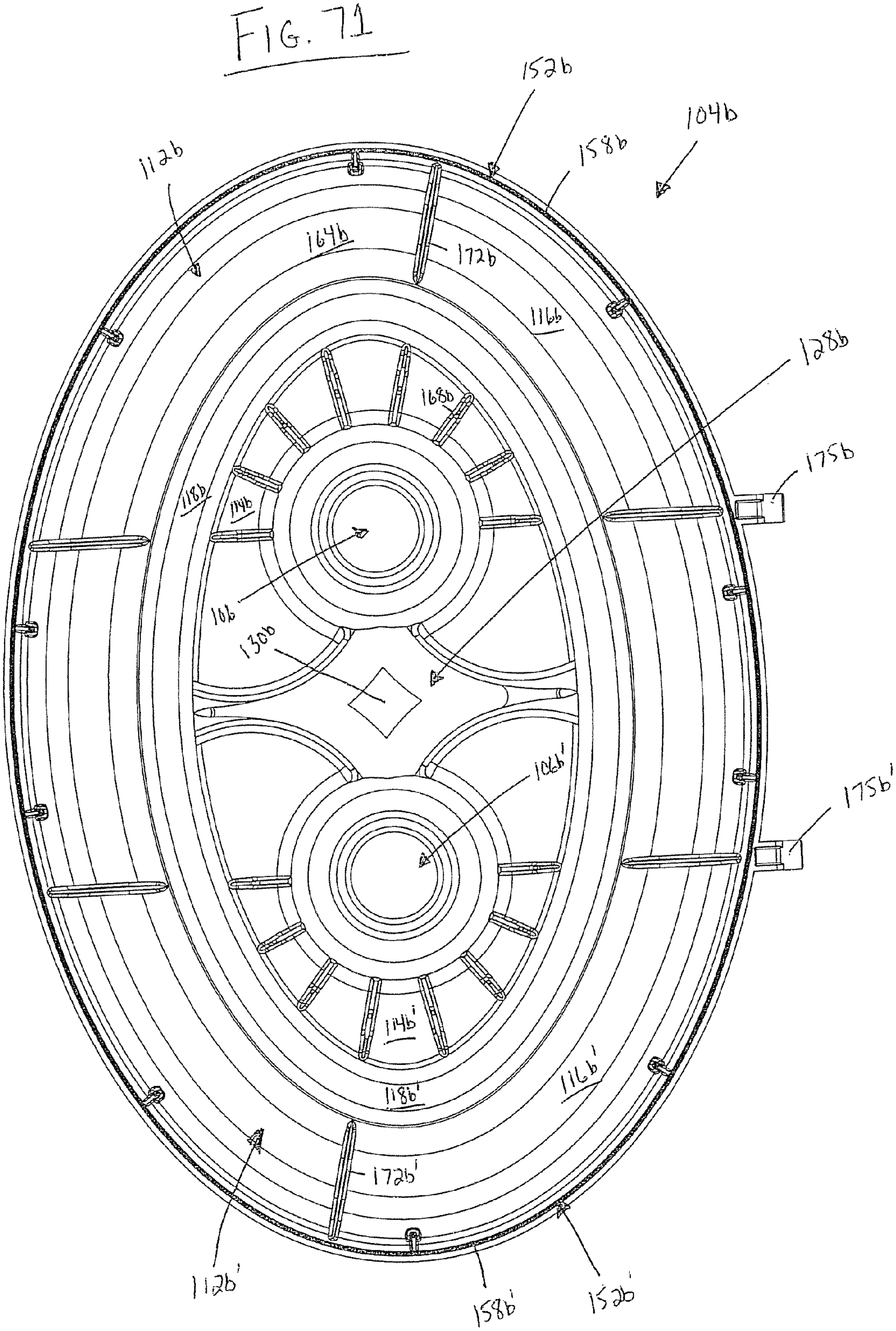
FIG. 71 is a top plan view of a pan member which incorporates features of a fourth embodiment of a feeder assembly of the invention.
Figure 72:
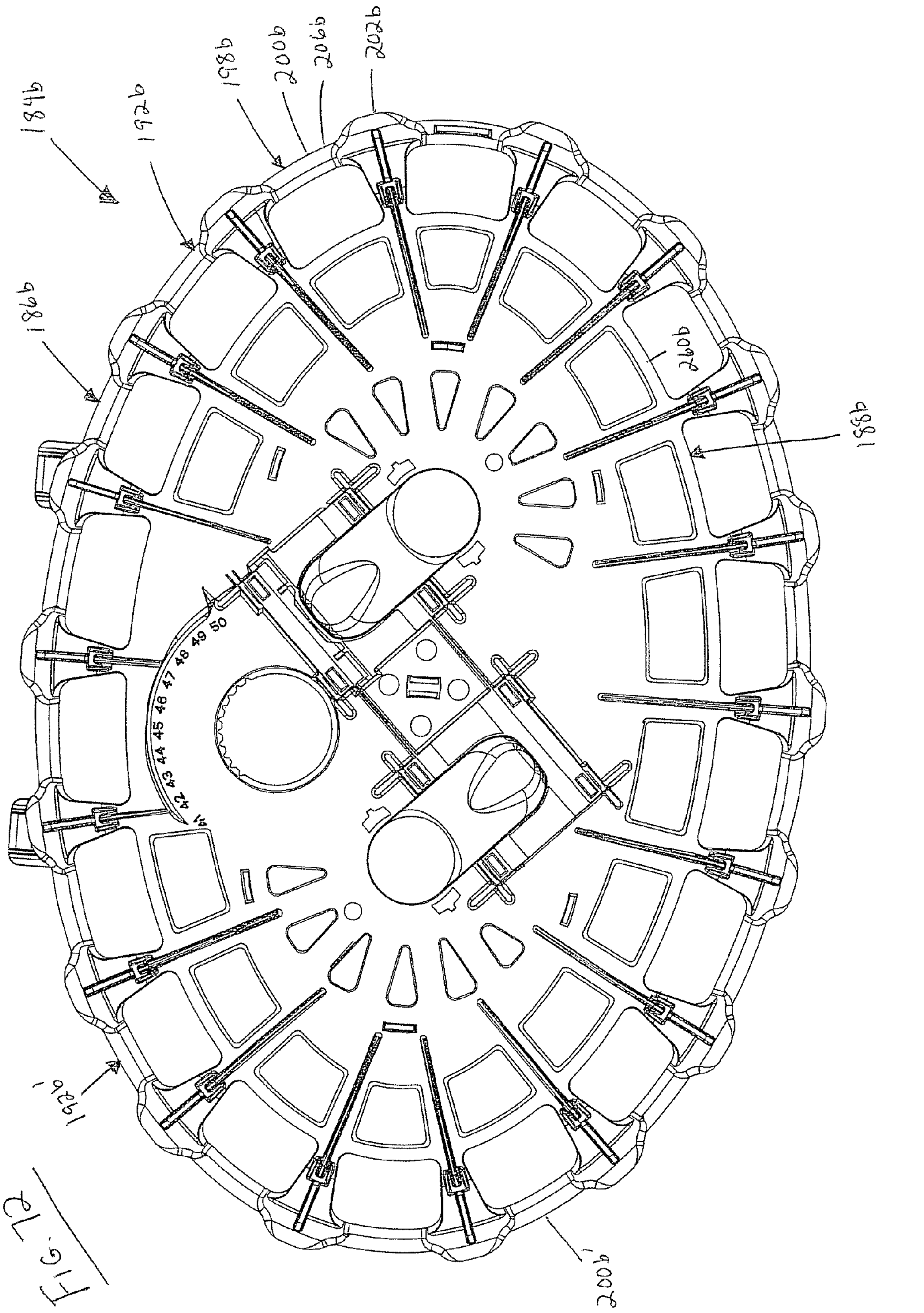
FIG. 72 is a top plan view of a grill member which incorporates features of the fourth embodiment of the feeder assembly of the invention.
Figure 73:
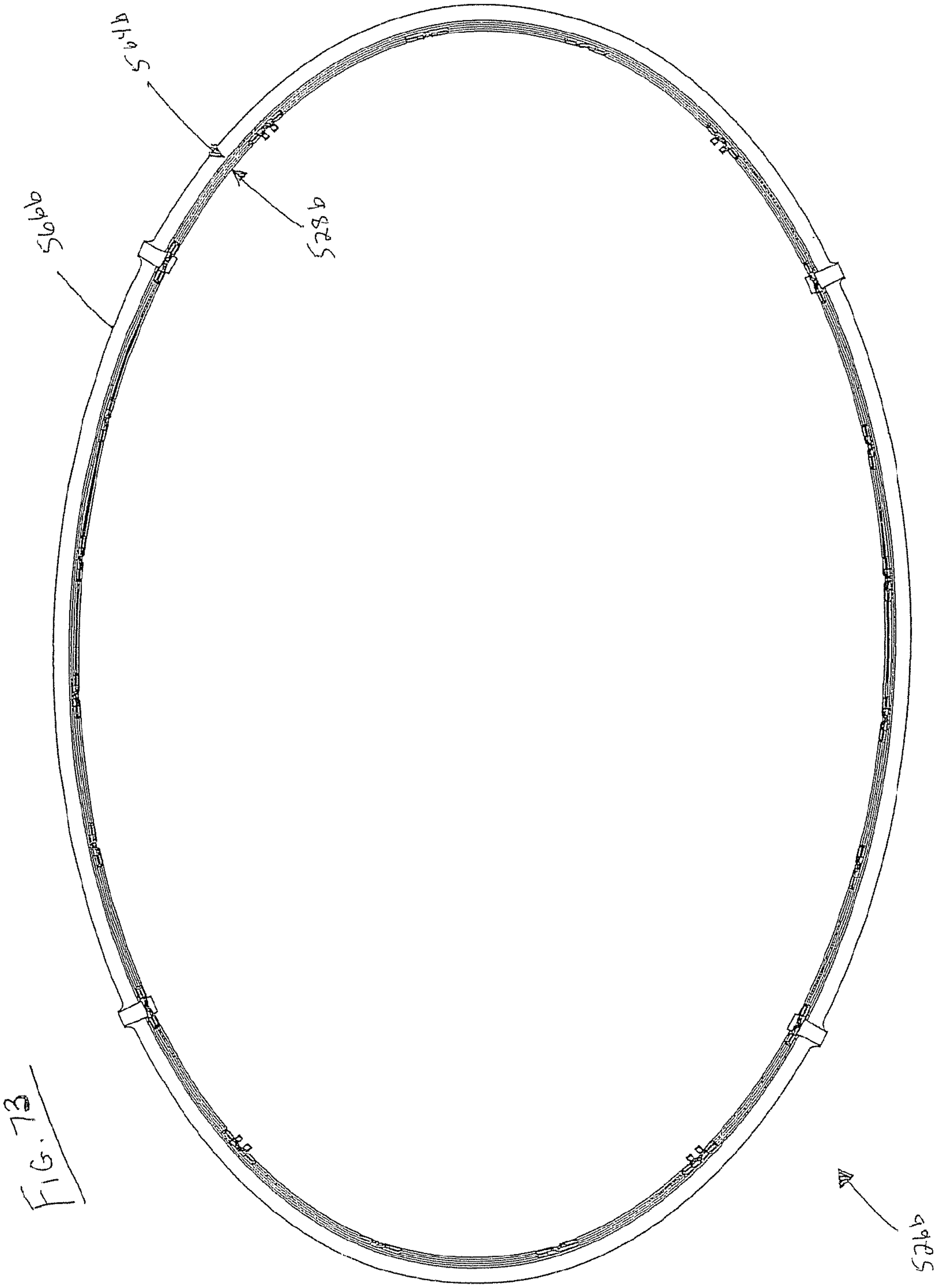
FIG. 73 is a top plan view of an outer ring member which incorporates features of the fourth embodiment of the feeder assembly of the invention.

A first embodiment of the feeder assembly 100 which incorporates features of the invention is shown in FIGS. 1-50; a second embodiment of the feeder assembly 700 which incorporates features of the invention is shown in FIGS. 51-67; a third embodiment of the feeder assembly 800 which incorporates features of the invention is shown in FIGS. 68-70; and a fourth embodiment of the feeder assembly 900 which incorporates features of the invention is shown in FIGS. 71-73.

Structure of the Feeder Assembly 100

Attention is invited to the first embodiment of the feeder assembly 100 which is illustrated in FIGS. 1-50. The illustrated feeder assembly 100 desirably is adapted to be used in connection with a poultry feed distribution system that includes a feed supply conduit 102. Desirably, the poultry feeder system includes a plurality of feeder assemblies 100, which can be vertically adjusted to either rest on the ground or be suspended above the ground by raising or lowering the feed supply conduit 102 or by other suitable means. The feeder assemblies 100 are preferably utilized in poultry houses used for housing and feeding poultry which are to be bred, commonly referred to as breeders. The feeder assemblies 100 are specifically designed to allow for the female breeders to eat therefrom, but to prevent the male breeders from eating therefrom. It is to be understood, however, that other types of animals and poultry could also be fed with the feeder assemblies 100 of the invention.

The illustrated feeder assembly 100 generally includes a pan member 104, an outer grill member 184, first and second feed supply conduit securement members 374, 374', first and second inner grill members 408, 408', first and second drop tube members 482, 482', an outer ring member 526, and a dial member 568.

Pan Member 104

Attention is now directed to the pan member 104, which is best illustrated in FIGS. 1-6. The pan member 104, in a preferred embodiment, is generally formed in a shape of two intersecting circles as will be described in more detail herein.

The pan member 104 includes first and second upstanding cone portions 106, 106' which are identical to one another in configuration and, therefore, only the first upstanding cone portion 106 will be described in detail with the understanding that the description of the second upstanding cone portion 106' would be identical. As such, the elements of the second upstanding cone portion 106' are denoted with a prime (').

Figure 6:
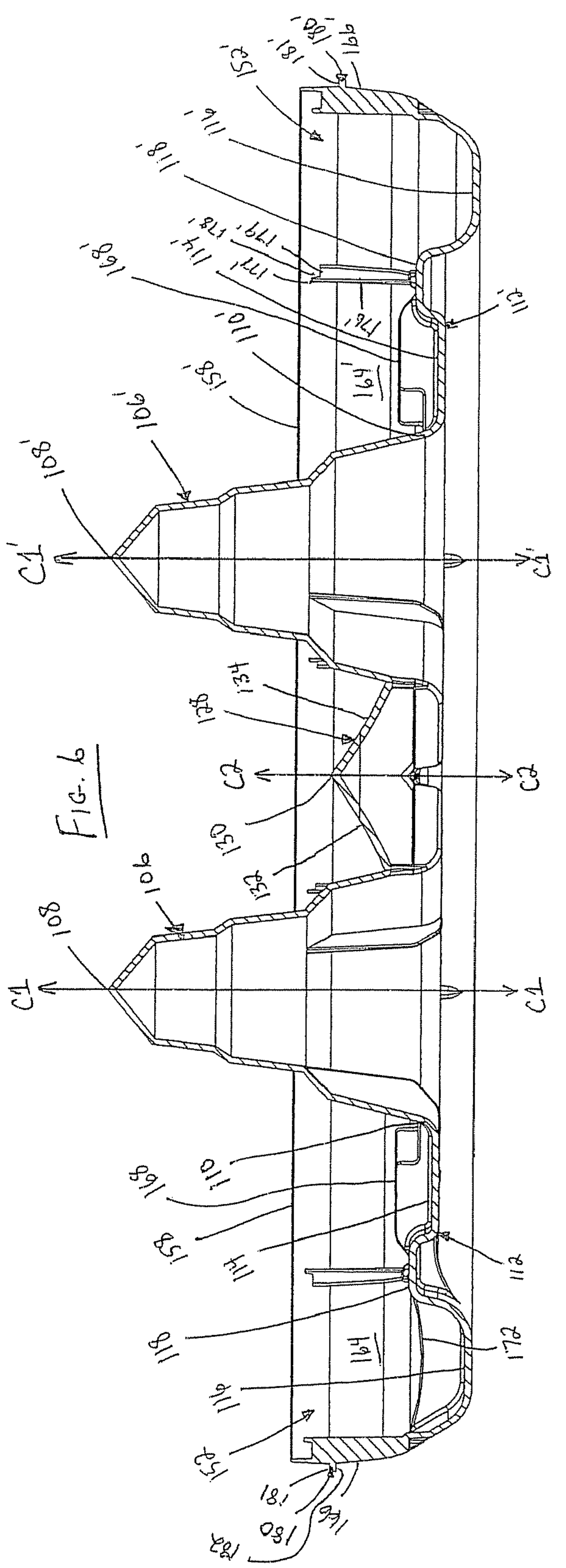
FIG. 6 is a cross-sectional view of the pan member taken along line 6-6 of FIG. 4.

The first upstanding cone portion 106 extends from a top end 108 thereof, which preferably comes to a point, to a bottom end 110 thereof, which is preferably circular and defined about a center line C1, as illustrated in FIG. 6. The center line C1 extends through the pointed top end 108 of the first upstanding cone portion 106. A diameter of the first upstanding cone portion 110 preferably increases from the top end 108 to the bottom end 110. The diameter of the first upstanding cone portion 106 at the bottom end 110 thereof is preferably approximately 4.05 inches. A straight line distance between the center line C1 and the center line C1' is preferably approximately 6.0 inches such that a straight line distance between the bottom ends 110, 110' is preferably approximately 1.95 inches.

The pan member 104 includes first and second base portions 112, 112' which are identical to one another in configuration and, therefore, only the first base portion 112 will be described in detail with the understanding that the description of the second base portion 112' would be identical. As such, the elements of the second base portion 112' are denoted with a prime ('). The first base portion 112 has an inner feeding surface 114 and an outer feeding surface 116 separated by an inner rim member 118.

The inner feeding surface 114 extends radially outwardly from substantially all of the bottom end 110 of the first upstanding cone portion 106 relative to the center line C1 to the inner rim member 118 such that the inner feeding surface 114 has first and second ends 120, 122 and is generally C-shaped. The first and second ends 120, 122 connect an inner edge of the inner feeding surface 114 to an outer edge of the inner feeding surface 114. The inner edge is defined at the connection to the bottom end 110 of the first upstanding cone portion 106 and thus is preferably provided at a radial distance of approximately 2.025 inches from the center line C1. The outer edge is preferably provided at a radial distance of approximately 3.37 inches from the center line C1 such that the inner feeding surface 114 preferably has a width of approximately 1.345 inches.

The inner feeding surfaces 114, 114' are generally C-shaped, and not entirely circular, because an upstanding portion 128 of the pan member 104 is provided which extends between the first and second upstanding cone portions 106, 106'. The upstanding portion 128 has a top end 130 thereof, which preferably comes to a point, and is defined about a center line C2. The center line C2 extends through the pointed top end 130 of the upstanding portion 128 and is provided generally equidistantly between the center lines C1, C1' along a longitudinal reference line L1, as illustrated in FIG. 1.

The upstanding portion 128 defines first, second, third and fourth top edges 132, 134, 136, 138 which extend outwardly from the pointed top end 130. The first top edge 132 extends angularly downwardly to the first upstanding cone portion 106 along the longitudinal reference line L1 and the second top edge 134 extends angularly downwardly to the second upstanding cone portion 106' along the longitudinal reference line L1. The third and fourth top edges 136, 138 extend angularly downwardly to the connections of the inner rim member 118 to the inner rim member 118' in opposite directions of one another along a lateral reference line L2, which is generally perpendicular to the longitudinal reference line L1, as illustrated in FIG. 1. Each of the third and fourth top edges 136, 138 are thus provided between the first and second top edges 132, 134.

The upstanding portion 128 further defines first, second, third and fourth surfaces 140, 142, 144, 146. The first surface 140 is provided between the first and third top edges 132, 136 and extends downwardly from the top end 130 to the first end 120 of the inner feeding surface 114. The second surface 142 is provided between the first and fourth top edges 132, 138 and extends downwardly from the top end 130 to the second end 122 of the inner feeding surface 114. The third surface 144 is provided between the second and fourth top edges 134, 138 and extends downwardly from the top end 130 to the first end 120' of the inner feeding surface 114'. The fourth surface 146 is provided between the second and third top edges 134, 136 and extends downwardly from the top end 130 to the second end 122' of the inner feeding surface 114'. Each of the surfaces 140, 142, 144, 146 are preferably curved, and are preferably curved in a convex manner.

The inner rim member 118 extends radially outwardly from the inner feeding surface 114 relative to the center line C1 to the outer feeding surface 116. The inner rim member 118 has first and second ends 148, 150 and is generally C-shaped. The first and second ends 148, 150 connect an inner edge of the inner rim member 118 to an outer edge of the inner rim member 118. The inner edge is generally defined at the connection to the outer edge of the inner feeding surface 114 and, thus, is preferably provided at a radial distance of approximately 3.37 inches from the center line C1. The outer edge is preferably provided at a radial distance of approximately 4.32 inches from the center line C1 such that the inner rim member 118 preferably has a width of approximately 0.95 inches.

The inner rim members 118, 118' are generally C-shaped, and not entirely circular, because the first end 148 of the inner rim member 118 connects to the second end 150' of the inner rim member 118' along the lateral reference line L2. Likewise, the second end 150 of the inner rim member 118 connects to the first end 148' of the inner rim member 118' along the lateral reference line L2. Thus, the inner rim members 118, 118' are generally collectively formed in the shape of two intersecting circles. The first and second ends 148, 150; 148', 150' of the inner rim members 118, 118' also connect to the upstanding portion 128.

The outer feeding surface 116 extends radially outwardly from the inner rim member 118 relative to the center line C1 to a first outer rim member 152 of the pan member 104. The outer feeding surface 116 has first and second ends 154, 156 and is generally C-shaped. The first and second ends 154, 156 connect an inner edge of the outer feeding surface 116 to an outer edge of the outer feeding surface 116. The inner edge is generally defined at the connection to the outer edge of the inner rim member 118 and, thus, is preferably provided at a radial distance of approximately 4.32 inches from the center line C1. The outer edge is preferably provided at a radial distance of approximately 6.15 inches from the center line C1 such that the outer feeding surface 116 preferably has a width of approximately 1.83 inches.

The outer feeding surfaces 116, 116' are generally C-shaped, and not entirely circular, because the first end 154 of the outer feeding surface 116 connects to a second end 156' of the outer feeding surface 116' along the lateral reference line L2. Likewise, the second end 156 of the outer feeding surface 116 connects to the first end 154' of the outer feeding surface 116' along the lateral reference line L2. Thus, the outer feeding surfaces 116, 116' are generally collectively formed in the shape of two intersecting circles.

The pan member 104 further includes the first and second outer rim members 152, 152' which are identical to one another in configuration and, therefore, only the first outer rim member 152 will be described in detail with the understanding that the description of the second outer rim member 152' would be identical. As such, the elements of the second outer rim member 152' are denoted with a prime (').

The outer rim member 152 extends upwardly from the outer edge of the outer feeding surface 116 to a top edge 158. The outer rim member 152 preferably extends upwardly and outwardly from the outer edge of the outer feeding surface 116 to the top edge 158, and further preferably curves upwardly and outwardly, preferably in a concave manner, from the outer edge of the outer feeding surface 116 to the top edge 158. Thus, the outer rim member 152 preferably extends radially outwardly from the outer feeding surface 116 relative to the center line C1.

The outer rim member 152 has first and second ends 160, 162 and is thus generally C-shaped. The top edge 158 of the outer rim member 152 separates an inner surface 164 of the pan member 104 from an outer surface 166 of the pan member 104. The top edge 158 of the outer rim member 152 at the inner and outer surfaces 164, 166 of the pan member 104 is preferably provided at a radial distance of approximately 6.53 inches and approximately 6.59 inches from the center line C1, respectively.

The outer rim members 152, 152' are generally C-shaped, and not entirely circular, because the first end 160 of the outer rim member 152 connects to the second end 162' of the outer rim member 152' along the lateral reference line L2. Likewise, the second end 162 of the outer rim member 152 connects to the first end 160' of the outer rim member 152' along the lateral reference line L2. Thus, the top edges 158, 158' of the outer rim members 152, 152' are generally collectively formed in the shape of two intersecting circles. Tab members 167, 167' may extend outwardly from the outer surface 166 of the outer rim members 152, 152'.

The inner surface 164 of the inner rim member 118 is preferably raised above the inner surfaces 164 of the inner and outer feeding surfaces 114, 116 in order to separate the inner and outer feeding surfaces 114, 116 for purposes which will be discussed in further detail hereinbelow. The top edge 158 of the outer rim member 152 is preferably provided at a height which is higher than the inner surface 166 of the inner rim member 118, and the top ends 108 of the first upstanding cone portion 106 is preferably provided at a height which is higher than the top edge 158 of the outer rim member 152. The top end 130 of the upstanding portion 128 is preferably provided at a height which is higher than the inner surface 166 of the inner rim member 118, but which is lower than the height of the top edge 158 of the outer rim member 152.

The first base portion 112 of the pan member 104 preferably includes a plurality of fin members 168 which separate the inner feeding surface 114 into a plurality of feeding pockets 170. Each fin member 168 generally extends from the first upstanding cone portion 106, along the inner feeding surface 114, to the inner rim member 118. The first base portion 112 is illustrated as having eight (8) fin members 168 separating the inner feeding surface 114, but it is to be understood that more or less fin members 168, as desired, could be provided.

The first base portion 112 of the pan member 104 preferably includes a plurality of fin members 172 which separate the outer feeding surface 116 into a plurality of feeding pockets 174. Each fin member 172 generally extends from the inner rim member 118, along the outer feeding surface 116, to the first outer rim member 152. The first base portion 112 is illustrated as having three (3) fin members 172 separating the outer feeding surface 116, but it is to be understood that more or less fin members 172, as desired, could be provided.

Along a line T1 which is tangent to the outer surfaces 166, 166' of both the first and second outer rim members 152, 152', first and second hook members 175, 175' extend outwardly from the outer surfaces 166, 166' of the outer rim members 152, 152', as illustrated in FIG. 1. The first hook member 175 extends outwardly from the outer surface 166 of the outer rim member 152, and the second hook member 175' extends outwardly from the outer surface 166' of the outer rim member 152'.

A plurality of reinforcement/support members 176, 176' extend inwardly from the inner surfaces 164, 164' of the outer rim members 152, 152'. The reinforcement/support members 176, 176' extend from proximate the connection of the outer rim members 152, 152' to the base portions 112, 112' to top ends 177, 177' thereof which are provided proximate the top edges 158, 158' of the outer rim members 152, 152'. Notches 178, 178' are provided in the top ends 177, 177' which define shelf portions 179, 179' of the reinforcement/support members 176, 176'. Each of the outer rim members 152, 152' is preferably provided with five (5) reinforcement/support members 176, 176' where one (1) of the five (5) reinforcement/support members 176, 176' is provided along the longitudinal reference line L1. Each of the five (5) reinforcement/support members 176, 176' are provided generally equidistantly from one another.

Each outer rim member 152, 152' also has a flange 180, 180' which extends outwardly from the outer surfaces 166, 166' thereof from the first ends 160, 160' thereof to the second ends 162, 162' thereof, except for where the hook members 175, 175' are provided. The flanges 180, 180' are provided at a predetermined distance below the top edges 158, 158' and provide top surfaces or top ledges 181, 181', bottom surfaces 182, 182', and outer edges 183, 183'.

Thus, from the foregoing and from a study of FIGS. 1-6 illustrating the pan member 104, it is apparent that the pan member 104 is generally formed in the shape of two intersecting circles. Each of the intersecting circles is preferably equal in diameter, which is approximately thirteen inches. The pan member 104 has at least one (1) plane of symmetry (not taking into account the placement of the fin members 168, 168' or the fin members 172, 172'), whether mirror symmetry (identical or mirror image on either side of plane of symmetry) or two-fold rotational symmetry (shape returns to the same shape after rotation through 180 degrees). The axis of symmetry of the pan member 104 is taken along the lateral reference line L2. If the hook members 175, 175' were not provided on the pan member 104, the pan member 104 would have an infinite number of axes of symmetry, all of which would extend through the center reference line C2, including an axis of symmetry of the pan member 104 taken along the longitudinal reference line L1. It is further envisioned that the pan member 104 could be formed in the shape of three or more intersecting circles, as desired, in keeping with the principles of the invention, such that the pan member 104 would have planes of multi-fold rotational symmetry (for instance, if three intersecting circles provided, three-fold rotational symmetry such that the shape would return to the same shape after rotation through 120 degrees).

Outer Grill Member 184

Attention is now directed to the outer grill member 184, which is best illustrated in FIGS. 7-13.

The outer grill member 184 includes a rim member 186, a spoke assembly 188, and a top member 190. The spoke assembly 188 is connected at a lower end thereof to the rim member 186 and at an upper end thereof to the top member 190. The rim member 186, the spoke assembly 188 and the top member 190 are all preferably integrally formed. The outer grill member 184 is preferably elongated such that a length of the outer grill member 184, which is defined along line L-L of FIG. 7 where the length of the outer grill member 184 is at its largest, is larger than a width of the outer grill member 184, which is defined along lines W-W and W'-W' of FIG. 7 where the width of the outer grill member 184 is at its largest.

The rim member 186, in a preferred embodiment, is generally formed in a shape to match the shape in which the top edges 158, 158' of the outer rim members 152, 152' of the pan member 104 are formed, preferably in a shape of two intersecting circles, such that the rim member 186 has a first portion 192 which is generally C-shaped in configuration and has first and second ends 194, 196, and a second portion 192' which is generally C-shaped in configuration and has first and second ends 194', 196'. The first and second portions 192, 192' are preferably identical to one another, with the first end 194 of the first portion 192 being connected to the second end 196' of the second portion 192', and with the second end 196 of the first portion 192 being connected to the first end 194' of the second portion 192'. As the first and second portions 192, 192' are identical to one another in configuration, only the first portion 192 will be described in detail with the understanding that the description of the second portion 192' would be identical. As such, the elements of the second portion 192' are denoted with a prime (').

The first portion 192 of the rim member 186 has a side rim portion 198 including an inner wall 200 and a plurality of outer walls 202.

The inner wall 200 has an inner surface 204 and an outer surface 206. The inner wall 200 is preferably arcuate or C-shaped in configuration and extends from the first end 194 to the second end 196. The inner wall 200 extends upwardly from a bottom edge 208 of the side rim portion 198 to a top rim portion 210 of the first portion 192 of the rim member 186. The bottom edge 208 is preferably planar.

The outer walls 202 are formed as a plurality of spaced-apart projecting portions which extend outwardly from the outer surface 206 of the inner wall 200 from the first end 194 to the second end 196. Each outer wall 202 extends upwardly from the bottom edge 208 of the side rim portion 198 to the top rim portion 210. Each outer wall 202 has first and second ends 211, 212 which are connected to the outer surface 206 of the inner wall 200. From the first end 211, each outer wall 202 has a first surface 214 which curves outwardly from the outer surface 206 of the inner wall 200, preferably in a concave manner, to a second surface 216. From the second end 212, each outer wall 202 has a third surface 218 which curves outwardly from the outer surface 206 of the inner wall 200, preferably in a concave manner, to a fourth surface 220. From the first surface 214, the second surface 216 curves outwardly, preferably in a convex manner, to a fifth surface 222. From the third surface 218, the fourth surface 220 curves outwardly, preferably in a convex manner, to the fifth surface 222. The fifth surface 222 extends preferably straight between the third and fourth surfaces 218, 220.

Preferably, from the first end 194 of the first portion 192 of the rim member 186, the side rim portion 198 begins with half of an outer wall 202, such that only half of the fifth surface 222 is provided. When viewed from the side, the inner wall 200 and the outer walls 202 appear to be provided in alternating configuration about the arced perimeter of the first portion 192 of the rim member 186 to another half of an outer wall 202 provided at the second end 196 of the first portion 192 of the rim member 186. In a preferred embodiment, nine (9) outer walls 202 are provided, and two (2) half outer walls 202 are provided.

Thus, the half fifth surface 222 of the half outer wall 202 provided on the first portion 192 of the rim member 186 at the first end 194 thereof will be joined to the half fifth surface 222' of the half outer wall 202' provided on the second portion 192' of the rim member 186 at the second end 196' thereof, but the half fifth surfaces 222, 222' will be angled relative to one another because of the rim member 186 being formed in the shape of two intersecting circles. Likewise, the half fifth surface 222 of the half outer wall 202 provided on the first portion 192 of the rim member 186 at the second end 196 thereof will be joined to the half fifth surface 222' of the half outer wall 202' provided on the second portion 192' of the rim member 186 at the first end 194' thereof, but the half fifth surfaces 222, 222' will be angled relative to one another because of the rim member 186 being formed in the shape of two intersecting circles. The two intersecting circles defining the rim member 186 preferably have equal diameters.

The top rim portion 210 of the first portion 192 of the rim member 186 extends inwardly from the side rim portion 198. The top rim portion 210 is formed of a plurality of concave surfaces 224, and a plurality of generally flat surfaces 226. The concave surfaces 224 and the flat surfaces 226 are provided in an alternating configuration from the first end 194 of the first portion 192 of the rim member 186 to the second end 196 of the first portion 192 of the rim member 186.

Each concave surface 224 is connected to the outer surface 206 of the inner wall 200 between adjacent outer walls 202, and each flat surface 226 is connected to one of the outer walls 202. Thus, in a preferred embodiment, nine (9) concave surfaces 224 are provided, eight (8) flat surfaces 226 are provided, and two (2) half flat surfaces 226 are provided. The connection between the concave surfaces 224 and the outer surface 206 of the inner wall 200, and the connection between the flat surfaces 226 and the outer walls 202, is preferably rounded or smoothed to define a rounded rim portion 228 of the first portion 192 of the rim member 186, such that there are not sharp edges defined between the top rim portion 210 and the side rim portion 198.

The first portion 192 of the rim member 186 further includes a sealing member 230 which extends generally straight downwardly from the top rim portion 210 to an end 232 thereof. The sealing member 230 is spaced from the inner surface 204 of the inner wall 200 at a generally constant distance from the first end 194 to the second end 196. The sealing member 230 preferably does not extend as far downwardly from the top rim portion 210 as does the inner wall 200 and, thus, does not extend to the bottom edge 208 of the side rim portion 198.

The first portion 192 of the rim member 186 also includes an extension 234 which extends outwardly from one of the outer walls 202, preferably the first full outer wall 202 of the first portion 192 of the rim member 186 proximate to the first end 194 thereof. A slot 236 is provided between the extension 234 and the bottom edge 208 of the first portion 192 of the rim member 186 and/or between the fifth surface 222 of the outer wall 202 of the first portion 192 of the rim member 186. In a preferred embodiment, the fifth surface 222 of the outer wall 202 has a notch 238 cut therein from the bottom edge 208 to aid in access to the slot 236. The purpose for the slot 236 will be discussed in further detail herein.

The first portion 192 of the rim member 186 further includes a pair of tongue extensions 240. Each tongue extension 240 extends downwardly from the bottom edge 208 of the inner wall 200, between where two adjacent outer walls 202 connect to the inner wall 200. Each tongue extension 240 defines inner and outer surfaces 242, 244 and an outer edge 246 which connects the inner and outer surfaces 242, 244. The outer edge 246 is generally arcuate in configuration, but can be configured in any shape desired. Each tongue extension 240 has a wedge-shaped flange 248 extending inwardly from the inner surface 242 thereof proximate to the connection of the bottom edge 208 of the inner wall 200. Each wedge-shaped flange 248 has a flat surface 250 which extends inwardly generally perpendicularly to the inner surface 242 and which is generally parallel to, and which may be planar with, the bottom edge 208 of the inner wall 200. Each wedge-shaped flange 248 also has an angled surface 252 which extends angularly downwardly and outwardly from the flat surface 250 back to the inner surface 242 of the tongue extension 240. Each tongue extension 240 is preferably provided with a little flexibility relative to the inner wall 200 such that the tongue extension 240 can be flexed inwardly and/or outwardly relative to the inner wall 200 as desired. One of the tongue extensions 240 is preferably provided generally opposite where the extension 234 is provided, and the other one of the tongue extensions 240 is provided generally equidistantly between where the extension 234 and the other tongue extension 240 are provided, namely along a longitudinal center of the rim member 186. More or less tongue extensions 240 may be provided on the first portion 192 of the rim member 186 as desired.

The first portion 192 of the rim member 186 further includes a pair of elongated apertures 254 provided through the rounded rim portion 228. Each elongated aperture 254 is provided above where the wedge-shaped flanges 248 of the tongue extensions 240 are provided in order provide visibility of the wedge-shaped flanges 248 through the elongated apertures 254.

The spoke assembly 188 includes a first set of spoke members 256, a second set of spoke members 258, and a ring member 260. The ring member 260 has inner and outer surfaces 262, 264, and upper and lower edges 266, 268. The inner and outer surfaces 262, 264 are curved, preferably in a convex manner, from the lower edge 268 to the upper edge 266 such that the lower edge 268 is preferably generally planar with the bottom edges 208, 208' of the rim member 186, and such that the upper edge 266 if not preferably planar with the lower edge 268. The ring member 260 is generally formed in the shape of two intersecting circles, but the intersection of the two circles is generally rounded in an opposite direction relative to the remainder of the ring member 260. Thus, the ring member 260 has first and second arcuate portions 270, 272 which are provided opposite one another, and third and fourth arcuate portions 274, 276 which are provided opposite one another, and which connect the first and second arcuate portions 270, 272 together.

The first set of spoke members 256 include a plurality of individual spaced-apart spoke members 256. Each spoke member 256 extends from the top rim portions 210, 210' of the side rim portions 198, 198' to the lower edge 268 of the ring member 260. Preferably, each spoke member 256 has first, second, third and fourth portions 278, 280, 282, 284. Preferably, each first portion 278 curves, preferably in a convex manner, inwardly and upwardly from one of the flat surfaces 226, 226' of the top rim portions 210, 210' to the second portion 280. The second portion 280 extends angularly upwardly and inwardly from the first portion 278 to the third portion 282. The third portion 282 curves, preferably in a concave manner, inwardly and upwardly from the second portion 280 to the fourth portion 284. The fourth portion 284 extends angularly upwardly and inwardly from the third portion 282 to the lower edge 268 of the ring member 260. Thus, the ring member 260 is provided above and inward of the rim member 186. A width of the spoke members 256 is generally increased from the connection to the ring member 260 to the connection to the rim member 186. Preferably, eighteen (18) spoke members 256 are provided, but the two spoke members 256 which extend upwardly from the connections of the first and second portions 192, 192' of the rim member 186 are thicker in width than the remainder of the spoke members 256. Thus, apertures 286 are provided between each adjacent spoke members 256 and between the rim member 186 and the ring member 260. Preferably, eighteen (18) apertures 286 are provided through the outer grill member 184.

The second set of spoke members 258 include a plurality of individual spaced-apart spoke members 258. Each spoke member 258 extends from the upper edge 266 of the ring member 260 to the top member 190. Preferably, each spoke member 258 has first, second, third and fourth portions 288, 290, 292, 294. Preferably, each first portion 288 curves, preferably in a concave manner, upwardly and inwardly from the upper edge 266 of the ring member 260 to the second portion 290. The second portion 290 extends angularly upwardly and inwardly from the first portion 288 to the third portion 292. The third portion 292 curves, preferably in a convex manner, inwardly and upwardly from the second portion 290 to the fourth portion 294. The fourth portion 294 extends generally straight inwardly from the third portion 292 to an outer edge 296 of the top member 190. Thus, the top member 190 is provided above and inward of the ring member 260. Each spoke member 258 is preferably generally aligned above one of the spoke members 256. If desired, material can be removed from between adjacent spoke members 258 in order to reduce the amount of material used to form the outer grill member 184, to reduce the cost of manufacturing the outer grill member 184, and to allow for visibility through the outer grill member 184, so long as the amount of material removed does not violate the integrity of the outer grill member 184.

A plurality of reinforcing members 298 are provided on the outer grill member 184. Each reinforcing member 298 extends outwardly from the spoke members 256, 258 and from the ring member 260. Each spoke member 256 has at least one reinforcing member 298 extending outwardly therefrom, but the two spoke members 256 provided above the connection of the first and second portions 192, 192' of the rim member 186 preferably have two reinforcing members 298 extending outwardly therefrom. Thus, there are preferably twenty (20) reinforcing members 298. Preferably all of the reinforcing members 298, except for two of those provided above one of the connections of the first and second portions 192, 192' of the rim member 186, extend beyond the connection of the spoke members 258 and the top member 190, and onto the top member 190 of the outer grill member 184, but these reinforcing members 298 preferably do not extend far enough on the top member 190 such that they contact one another. Some of the reinforcing members 298 which extend onto the top member 190 of the outer grill member 184 may extend further off of the top member 190 than some of the other reinforcing members 298 for reasons which will be discussed in further detail herein.

At least one of, and preferably four of, the reinforcing members 298 have a plurality of notches 300 cut therein along the portion thereof which extends from the fourth portion 284 of the spoke members 256. The notches 300 are preferably provided on the four reinforcing members 298 which are adjacent to the spoke members 256 that are adjacent to the spoke members 256 having two reinforcing members 298 provided thereon. The reinforcing members 298 having the notches 300 preferably have notches 300 which are evenly spaced apart from one another along the height of the reinforcing member 298, and the notches 300 preferably number six (6). The purpose for the notches 300 will be discussed in further detail herein. Each of the reinforcement members 298 has an enlarged portion 301 provided below where the notches 300 would be, or are, provided thereon, and above the connection to the rim member 186.

The top member 190 of the outer grill member 184 has interior and exterior surfaces 302, 304 which are both preferably generally planar with one another and with the bottom edges 208, 208' of the first and second portions 192, 192' of the rim member 186 of the outer grill member 184. The interior and exterior surfaces 302, 304 are connected to one another by the outer edge 296 of the top member 190.

The top member 190 has first and second apertures 306, 306' provided therethrough. Each aperture 306, 306' is generally elongated in configuration, preferably in a racetrack configuration, but any other configuration for the apertures 306, 306' is acceptable, but preferably the apertures 306, 306' are provided in some oval or elliptical configuration, namely the racetrack configuration. The first and second apertures 306, 306' are preferably provided separated from, and parallel to, one another, but are preferably provided at an angle relative to the line L-L, preferably at a forty-five (45) degree angle relative to the line L-L. Each aperture 306, 306' has first and second opposite end portions 308, 310; 308', 310' provided along the length thereof. The first aperture 306 is provided through the top member 190 such that the first opposite end portion 308 is provided at the intersection of the line L-L and line W-W, as illustrated in FIG. 7. The second aperture 306' is provided through the top member 190 such that the first opposite end portion 308' is provided at the intersection of the line L-L and the line W'-W', as illustrated in FIG. 7. From the first opposite end portions 308, 308', the remainder of the first and second apertures 306, 306' extends outwardly therefrom, in opposite directions, to the second opposite end portions 310, 310'.

The first aperture 306 is formed as a part of a first fill port 312 defined by the top member 190, and the second aperture 306' is formed as a part of a second fill port 312' defined by the top member 190. The first fill port 312 is defined by the first aperture 306, a first feed pipe supporting base 314, and a first feed directing extension 316. Likewise, the second fill port 312' is defined by the second aperture 306', a second feed pipe supporting base 314', and a second feed directing extension 316'. As the first fill port 312 and the second fill port 312' are identical to one another in configuration, other than being reversed in positioning on the top member 190, only the first fill port 312 will be described hereinbelow in detail with the understanding that the description of the second fill port 312' would be identical, except as otherwise noted. Reference numerals denoting elements of the second fill port 312' will be denoted with a prime (') to differentiate from the reference numerals denoting elements of the first fill port 312.

The first feed pipe supporting base 314 is generally U-shaped in configuration such that it has a first base leg 318, and second and third extending legs 320, 322 which extend outwardly, in the same direction, from opposite ends of the first base leg 318 to free ends 324, 326 thereof, such that a first opening 328 of the first fill port 312 is defined, at the top thereof. The second opposite end portion 310 of the first aperture 306 is in communication with, and is generally provided directly below, the top opening 328 of the first fill port 312. The first, second and third legs 318, 320, 322 are preferably integrally formed with the top member 190 and are positioned on the exterior surface 304 thereof. Top surfaces of the second and third extending legs 320, 322 are configured in a concave manner such that the elongated feed supply conduit 102 can be supported on the concave top surfaces of the second and third extending legs 320, 322. The lowest point of the concavity of the top surfaces of the second and third extending legs 320, 322 is preferably positioned at or above the exterior surface 304 of the top member 190. The top surface of the first base leg 318 is generally planar with the top surfaces of the second and third extending legs 320, 322 at their free ends 324, 326. First and second apertures 330, 332 are provided through the top surface of the first base leg 318 at the ends thereof, and third and fourth apertures 334, 336 are provided through the top surfaces of the second and third extending legs 320, 322 at their free ends 324, 326, the purpose of which will be discussed in further detail herein.

The first feed directing extension 316 is generally wedge shaped in configuration. The first feed directing extension 316 is preferably integrally formed with the top member 190 and is positioned on the interior surface 302 of the top member 190 around the first aperture 306. The first feed directing extension 316 has a ramp portion 338 which enlarges the depth of the first aperture 306 from the second portion 310 thereof to the first portion 308 thereof. The first feed directing extension 316 also defines a second opening 340 of the first fill port 312, at the bottom thereof. The bottom opening 340 is in communication with, and is positioned generally directly below, the first portion 308 of the first aperture 306, next to a lower end of the ramp portion 338, such that were any liquid or solid placed on the ramp portion 338, the liquid or solid would tend to move down the ramp portion 338 toward the bottom opening 340. The bottom opening 340 is thus offset from the top opening 328 of the first fill port 312.

The top member 190 of the outer grill member 184 has a third aperture 342 provided therethrough which is generally circular in configuration, and which defines an aperture wall 344 through the top member 190. The third aperture 342 is preferably provided proximate to the first base leg 318 of the first feed pipe supporting base 314, and generally proximate to the first portion 308' of the second aperture 306' through the top member 190. An arcuate portion of the aperture wall 344 which is provided most proximate to the spoke members 256 has a plurality of notches 346 provided therein which extend from the exterior surface 304 of the top member 190 to the interior surface 302 of the top member 190. The notches 346 are generally equally spaced apart from one another and, preferably, ten (10) notches 346 are provided. Of course, it is to be understood, that the number of notches 346 can be varied as desired, for purposes which will be discussed in detail herein.

The exterior surface 304 has a plurality of indicators 348 provided thereon between the arcuate portion of the aperture wall 344 of the third aperture 342 and the connection of the outer edge 296 of the top member 190. The number of indicators 348 is directly related to the member of notches 346 provided and, as such, the corresponding notch 346 is provided along the same radial line as is the corresponding indicator 348 relative to a center of the third aperture 342. The indicators 348 are preferably numbers which indicate a width, preferably in millimeters, of the apertures 286 provided between adjacent spoke member 256, which can be changed as desired, as will be discussed further in detail hereinbelow. Preferably, the numbers of the indicators 348 are forty-one (41) to fifty (50).

The top member 190 has fourth, fifth, sixth and seventh apertures 350, 352, 350', 352' provided therethrough, where the fourth and fifth apertures 350, 352 are associated with the first fill port 312 and where the sixth and seventh apertures 350', 352' are associated with the second fill port 312'. The sixth aperture 350' is identical to the fourth aperture 350 and the seventh aperture 352' is identical to the fifth aperture 352 and, therefore, only the configuration and positioning of the fourth and fifth apertures 350, 352 will be described in detail herein. The fourth aperture 350 is generally rectangular in configuration, but the sides thereof may be slightly curved if desired, and is positioned next to the first portion 308 of the first aperture 306 and proximate to the free end 324 of the second extending leg 320 of the first feed pipe supporting base 314. The fifth aperture 352 is generally rectangular in configuration, but the sides thereof may be slightly curved if desired, and is positioned next to the first portion 308 of the first aperture 306 and proximate to the free end 326 of the third extending leg 322 of the first feed pipe supporting base 314. Thus, the fifth aperture 352 is provided opposite the fourth aperture 350, across the first portion 308 of the first aperture 306. The sides of the apertures 350, 352 which are not next to the first portion 308 of the first aperture 306 have notches 354, 356 provided therein.

The top member 190 has eighth and ninth apertures 358, 358' provided therethrough, where the eighth aperture 358 is associated with the first fill port 312 and where the ninth aperture 358' is associated with the second fill port 312'. The ninth aperture 358' is identical to the eighth aperture 358 and, therefore, only the configuration and positioning of the eighth aperture 358 will be described in detail herein. The eighth aperture 358 is generally circular in configuration and is positioned outwardly from the first portion 308 of the first aperture 306, generally equidistantly from the fourth and fifth apertures 350, 352.

Proximate to the outer edge 296 of the top member 190, a plurality of support flanges 360, 360' extend downwardly from the interior surface 302 of the top member 190. Each support flange 360, 360' has a first portion 362, 362' which extends straight downwardly from the top member 190 to a free end 364, 364' thereof. Each support flange 360, 360' also has a second portion 366, 366' which is generally wedge-shaped and which extends outwardly from the first portion 362, 362' proximate to the free end 364, 364'. The wedge-shaped second portion 366, 366' defines a support ledge 368, 368' thereon. Preferably, four (4) support flanges 360 are provided and four (4) support flanges 360' are provided. The support flanges 360 are provided proximate the first fill port 312 and the support flanges 360' are provided proximate the second fill port 312'. Each of the support flanges 360 are provided generally equidistantly from one another about a circle having its center at the intersection of lines L-L and W-W and three (3) of the four (4) are spaced generally equidistantly from the outer edge 296 of the top member 190. Each of the support flanges 360' are provided generally equidistantly from one another about a circle having its center at the intersection of lines L-L and W'-W' and three (3) of the four (4) support flanges 360, 360' are spaced generally equidistantly from the outer edge 296 of the top member 190. If desired, tenth and eleventh apertures 370, 370' may be provided through the top member 190 generally above where the three (3) of the four (4) support flanges 360, 360' are provided in order to allow visibility of the wedge-shaped second portions 366, 366' for purposes which will be discussed in detail herein. The one (1) support flanges 360, 360' which are not spaced generally equidistantly from the outer edge 296, but rather are provided next to, and separated from, one another. If desired, a twelfth aperture 372 may be provided through the top member 190 generally above where the one (1) support flanges 360, 360' are provided in order to allow visibility of the wedge-shaped second portions 366, 366' for purposes which will be described in detail herein. The twelfth aperture 372 is preferably rectangular in configuration. The twelfth aperture 372 is provided generally equidistantly between the third extending leg 322 of the first feed pipe supporting base 314, and between the third extending leg 322' of the second feed pipe supporting base 314'. The twelfth aperture 372, however, does not extend parallel to the third extending legs 322, 322', but rather extends at an angle relative to the third extending legs 322, 322', preferably at a forty-five (45) degree angle as illustrated in FIG. 7.

Other apertures not described may be provided through the top member 190 as desired either for the purposes of removal of material, such that less material is used in making the outer grill member 184, or for the purpose of allowing for dust removal from within the outer grill member 184, or both.

Feed Supply Conduit Securement Members 374, 374'

First and second feed supply conduit securement members 374, 374' are provided, which are identical to one another in configuration and, therefore, only the first feed supply conduit securement member 374 will be described in detail with the understanding that the description of the second feed supply conduit securement member 374' would be identical. As such, the elements of the second feed supply conduit securement member 374' are denoted with a prime ('). The first feed supply conduit securement member 374 is associated with the first fill port 312 and the second feed supply conduit securement member 374' is associated with the second fill port 312'.

The first feed supply conduit securement member 374, as best illustrated in FIGS. 14-18, has first and second portions 376, 378. The first portion 376 is generally wedge-shaped such that a top surface thereof extends generally angularly upwardly from a first end thereof to a second end thereof. The first portion 376 is configured to be positioned on the exterior surface 304 of the top member 190 around the first portion 308 of the first aperture 306. First and second apertures 379, 380 are provided on opposite sides of the first portion 376 on opposite sides of the first aperture 306

The second portion 378 extends from the second end of the first portion 376 proximate to or at a top thereof. The second portion 378 is a generally elongated arcuate member having first and second generally planar ends 381, 382 and upper and lower arcuate surfaces 384, 386 extending therebetween. The second portion 378 is connected to the first portion 376 generally at or proximate to the first planar end 381. The first planar end 381 is preferably not continuous such that the lower arcuate surface 386 of the second portion 378 is connected to an inner surface 390 of the first portion 376. An aperture 392 is provided through the second portion 378 generally equidistantly between the first and second planar ends 381, 382.

The first feed supply conduit securement element 374 further includes a roost extension 394 extending upwardly from the upper arcuate surface 384 of the second portion 378 to an upper edge 396 thereof. The roost extension 394 defines an aperture 398 therethrough which is in communication with the aperture 392 through the second portion 378 as the roost extension 394 extends upwardly from the upper arcuate surface 384 around the aperture 398. The roost extension 394 is configured at or around the upper edge 396 thereof to have a roost wire (not shown) secured thereto, for purposes which are known in the art.

The first feed supply conduit securement element 374 further includes first, second, third and fourth extensions 400, 402, 404, 406. The first and second extensions 400, 402 extend downwardly from opposite sides of the first planar end 381 and the third and fourth extensions 404, 406 extend downwardly from opposite sides of the second planar end 382.

Inner Grill Members 408, 408'

Attention is now directed to the first and second inner grill members 408, 408'. The first and second inner grill members 408, 408' are identical to one another in configuration and, therefore, only the first inner grill member 408 will be described in detail with the understanding that the description of the second inner grill member 408' would be identical. As such, the elements of the second inner grill member 408' are denoted with a prime (').

The first inner grill member 408, which is best illustrated in FIGS. 19-23, has a first arcuate ring portion 410 having first and second ends 412, 414, upper and lower edges 416, 418, and inner and outer surfaces 420, 422. The lower edge 418 is preferably planar from the first end 412 to the second end 414. The inner and outer surfaces 420, 422 extend upwardly from the lower edge 418 to the upper edge 416 and are generally perpendicular to the planar lower edge 418.

The first inner grill member 408 has a second arcuate ring portion 424 having first and second ends 426, 428, upper and lower edges 430, 432, and inner and outer surfaces 434, 436. The lower edge 432 is preferably generally planar from the first end 426 to the second end 428, and is generally parallel with the planar lower edge 418 of the first arcuate ring portion 410.

The first inner grill member 408 has a top portion 438 defining top and bottom surfaces 440, 442, inner and outer walls 444, 446, an outer edge 448 and a lower edge 450. The inner wall 444 is defined by an aperture 452 extending through the top portion 438, and extends from the top surface 440 to the lower edge 450. The aperture 452 is preferably generally circular in configuration such that the inner wall 444 is preferably generally cylindrical in configuration. The lower edge 450 connects the inner and outer walls 444, 446 and is generally planar to the lower edge 418 of the first arcuate ring member 410. The outer wall 446 extends upwardly from the lower edge 450 to the bottom surface 442. The bottom surface 442 extends outwardly from the outer wall 446 to the outer edge 448, which connects the bottom surface 442 to the top surface 440. The top and bottom surfaces 440, 442 are preferably planar with the lower edge 450, and with the lower edge 418 of the first arcuate ring member 410.

A plurality of spaced-apart spoke members 454 extend from the upper edge 416 of the first arcuate ring portion 410 to the lower edge 432 of the second arcuate ring portion 424, such that a plurality of apertures 456 are provided between the first and second arcuate ring portions 410, 424 and adjacent spoke members 454. Each spoke member 454 is generally formed of first, second, third and fourth portions 458, 460, 462, 463. The first portion 458 is curved, preferably in a concave manner, inwardly and upwardly from the upper edge 416 of the first arcuate ring portion 410 to the second portion 460. The second portion 460 is angled inwardly and upwardly from the first portion 458 to the third portion 462. The third portion 462 is curved, preferably in a concave manner, inwardly and upwardly from the second portion 460 to the fourth portion 463. The fourth portion 463 extends generally straight upwardly from the third portion 462 to the lower edge 432 of the second arcuate ring portion 424. Thus, the first arcuate ring portion 410 is formed at a larger diameter than is the second arcuate ring portion 424. A width of each spoke member 454 is also increased from the connection thereof to the second arcuate ring portion 424 to the connection thereof to the first arcuate ring portion 410. The upper edge 416 of the first arcuate ring portion 410, between adjacent spoke members 454, is preferably curved, preferably to have a concave portion between convex portions which extend to the adjacent spoke members 454. Preferably, ten (10) spoke members 454 are provided such that nine (9) apertures are provided between adjacent spoke members 454. The spoke members 454 provided at the first and second ends 412, 414; 426, 428 of the first and second arcuate ring members 410, 424 may be reduced in width compared to the remainder of the spoke members 454, if desired.

A plurality of spaced-apart spoke members 464 extend from the upper edge 430 of the second arcuate ring portion 424 to the bottom surface 442 and the outer wall 446 of the top portion 438, such that a plurality of apertures 466 are provided between the second arcuate ring portion 424, the top portion 438, and adjacent spoke members 464. Each spoke member 464 is generally formed of first, second and third portions 468, 470, 472. The first portion 468 is curved, preferably in a convex manner, inwardly and upwardly from the upper edge 430 of the second arcuate ring portion 424 to the second portion 470. The second portion 470 is angled inwardly and upwardly from the first portion 468 to the third portion 472. The third portion 472 is curved, preferably in a convex manner, inwardly and upwardly from the second portion 470 to the outer edge 448 of the top portion 438. A width of each spoke member 464 is also increased from the connection thereof to the second arcuate ring portion 424 to the connection thereof to the top portion 438. Preferably, ten (10) spoke members 464 are provided such that nine (9) apertures 466 are provided between adjacent spoke members 464. The spoke members 464 provided at the first and second ends 426, 428 of the second arcuate ring member 424 may be reduced in width compared to the remainder of the spoke members 464, if desired. The spoke members 464 are preferably generally aligned with the spoke members 454.

The outer wall 446, which the spoke members 464 connect, is generally preferably cylindrical in configuration. The outer wall 446, however, does have a plurality of finger-like elements 474 extending outwardly therefrom generally equidistantly between where the two (2) end spoke members 464 connect to the outer wall 446. The finger-like elements 474 are preferably rounded and preferably number four (4), although more or less could be provided as desired, such that three (3) notches 476, which are preferably rounded, are provided between the finger-like elements 474.

The outer edge 448 is generally C-shaped in configuration between the two (2) end spoke members 464 such that the outer edge 448 is generally arcuate in configuration to match the curvature of the inner and outer walls 444, 446. From the connection of each of the end spoke members 464 to the outer wall 446, however, the outer edge 448 extends outwardly to a line which is tangent to the outer wall 446 where the finger-like elements 474 are provided. An aperture 478 is provided through the top portion 438 from the top surface 440 thereof to the bottom surface 442 thereof between one of the end spoke members 464 and the finger like elements 474. The aperture 478 is generally elongated in configuration, having a length which is larger than its width, and is preferably formed in a race-track configuration, but may be formed in any other elliptical or oval configuration as desired. The length of the aperture 478 extends generally normal to the outer wall 446.

The inner grill member 408 may preferably have a plurality of notches 480 formed in the outer surface 436 of the second arcuate ring portion 424. Each notch 480 is preferably provided next to, and on one side of, the connection of the spoke members 454, 464 to the second arcuate ring portion 424. The notches 480 assist in the stacking of inner grill members 408, in order to provide a smaller package for shipping, thus saving costs.

Drop Tube Members 482, 482'

Attention is now directed to the first and second drop tube members 482, 482'. The first and second drop tube members 482, 482' are identical to one another in configuration and, therefore, only the first drop tube member 482 will be described in detail with the understanding that the description of the second drop tube member 482' would be identical. As such, the elements of the second drop tube member 482' are denoted with a prime (').

The first drop tube member 482, which is best illustrated in FIGS. 24-28, has upper and lower edges 484, 486 and an aperture 488 extending therethrough from the upper edge 484 to the lower edge 486 thereof. The aperture 488 defines an inner wall 490 of the first drop tube member 482, which also has an outer wall 492. The first drop tube member 482 is preferably configured to have cylindrical and conical portions such that the upper and lower edges 484, 486 are preferably circular in configuration. An inner diameter of the aperture 488 at the lower edge 486 is preferably larger than the inner diameter of the aperture 488 at the upper edge 484.

The first drop tube member 482 has first and second extension members 494, 496 which extend upwardly from the upper edge 484 to free ends 498, 500. The first and second extension members 494, 496 are positioned opposite one another and are identical in configuration to one another. The first and second extension members 494, 496 have inner and outer surfaces 502, 504; 506, 508. The inner surfaces 502, 506 are preferably flush with the inner wall 490 and the outer surfaces 504, 508 are preferably flush with the outer wall 492. The outer surfaces 504, 508 of the first and second extension members 494, 496 have serrated portions 510, 512 proximate to the free ends 498, 500 thereof.

The first drop tube member 482 has first and second flange members 514, 516. The first flange member 514 extends outwardly from the outer surface 504 of the first extension member 494 and from the outer wall 492, and the second flange member 516 extends outwardly from the outer surface 508 of the second extension member 496 and from the outer wall 492, such that the first and second flange members 514, 516 are positioned opposite one another. The flange members 514, 516 extend downwardly from the serrated portions 510, 512 toward the lower edge 486, but preferably do not extend to the lower edge 486. Each of the flange members 514. 516 have a plurality of notches 518, 520, preferably five (5) notches, cut therein, although it is to be understood that more or less notches 518, 520 could be provided as desired. The notches 518, 520 are preferably provided on the flange members 514, 516 outwardly of the outer surfaces 504, 508 of the extension members 494, 496, and not outwardly of the outer wall 492.

The first drop tube member 482 further includes first and second cutouts 522, 524 therethrough. The first cutout 522 is provided from the upper edge 484, between where the first and second extension members 494, 496 are provided, and extends downwardly toward the lower edge 486 in a generally curved manner. The second cutout 524 is provided from the lower edge 486, and extends upwardly toward the first cutout 522, in a generally triangular manner. The purpose for the first and second cutouts 522, 524 will be described in further detail herein.

Outer Ring Member 526

The feeder assembly 100 includes an outer ring member 526, which is best illustrated in FIGS. 29-32. The outer ring member 526 has an upstanding member 528 having inner and outer surfaces 530, 532 and upper and lower edges 534, 536. The upstanding member 528 is generally formed in the shape of two intersecting circles, but the intersection of the two circles is generally rounded in an opposite direction relative to the remainder of the upstanding member 528. Thus, the upstanding member 528 has first and second arcuate portions 538, 540 which are provided opposite one another, and third and fourth arcuate portions 542, 544 which are provided opposite one another, and which connect the first and second arcuate portions 538, 540 together.

The upper edge 534 is generally planar. The lower edge 536 at the third and fourth arcuate portions 542, 544 is generally planar and are generally parallel with the upper planar edge 534. The lower edge 536 at the first and second arcuate portions 538, 540 is generally formed of, in series, a first edge portion 546 which is generally planar with the lower edge 536 at the third and fourth arcuate portions 542, 544, a second edge portion 548 which is formed by a notch, preferably rectangular in configuration, which extends upwardly toward the upper edge 534, a third edge portion 550 which is generally planar with the first edge portion 546, and a fourth edge portion 552 which is generally curved upwardly toward the upper edge 534 and then downwardly to another one of the first edge portions 546. The lower edge 536 at each of the third and fourth arcuate portions 542, 544 is connected to the first edge portion 546 at one end thereof and to the third edge portion 550 at the other end thereof. Preferably, each of the first and second arcuate portions 538, 540 has ten (10) second edge portions 548 and nine (9) fourth edge portions 552.

The upstanding member 528 has a plurality of track members 554 extending from each of the second edge portions 548 of the lower edge 536 straight upwardly to the upper edge 534. Each track member 554 defines a slot 556 along the height thereof.

The upstanding member 528 has a plurality of tab members 558 extending therethrough such that an inner tab portion 560 of each tab member 558 extends inwardly from the inner surface 530 thereof and such that an outer tab portion 562 of each tab member 558 extends outwardly from the outer surface 532 thereof. The inner tab portions 560 extend through selected track members 554, thus breaking up the slot 556 into first and second portions. The tab member 558 is configured to be flexible such that movement of the outer tab portion 562 in an upward direction causes downward movement of the inner tab portion 560. Preferably, four (4) tab members 558 are provided, with two (2) of the tab members 558 being provided on the first arcuate portion 538 of the upstanding member 528 and the other two (2) tab members 558 being provided on the second arcuate portion 540 of the upstanding member 528.

The outer ring member 526 further has a generally continuous flange member 564 which extends outwardly from the outer surface 532 of the upstanding member 528 proximate to the upper edge 534 thereof, and above where the outer tab portions 562 extend. The flange member 564 extends outwardly to an outer edge 566 thereof. The outer edge 566 of the flange member 564 is preferably formed in a racetrack configuration, but can be formed in any other suitable oval or elliptical shape, other than the racetrack configuration, as desired.

Dial Member 568

The feeder assembly 100 includes a dial member 568. The dial member 568 includes a cylindrical disc portion 570 having upper and lower circular surfaces 572, 574 and an outer edge 576 which connects the upper and lower surfaces 572, 574. The dial member 568 further includes an alignment member 578 which extends outwardly from the outer edge 576 and which is also preferably connected to the upper surface 572. The alignment member 578 is generally configured in an arrow shape such that a free end 580 thereof generally comes to a point.

The dial member 568, which is best illustrated in FIGS. 33-38, includes a plurality of arcuate wall members 582 which extend downwardly from the lower surface 572 of the disc portion 570 to free ends 584 thereof, inward of the outer edge 576. A wedge-shaped flange 586 extends outwardly from an outer surface 588 of each of the arcuate wall members 582 at the free ends 584 thereof. Each wedge-shaped flange 586 has a first surface 590 which extends angularly outwardly and upwardly from the free end 584, and a second surface 592 which extends horizontally back to the outer surface 588. The second surface 592 acts as a support ledge. Preferably, four (4) arcuate wall members 582 are provided and are generally positioned in the outline of a circle, such that gaps 594 are provided between adjacent arcuate wall members 582. One of the arcuate wall members 582 has a flange member 596 extending outwardly therefrom toward the outer edge 576 which is in alignment with the pointed free end 580 of the alignment member 578.

The dial member 568 includes a cam post member 598, which has a generally cylindrical outer surface 600, extends downwardly from the lower surface 572 of the disc portion 570 to a free end 602 thereof. The free end 602 is provided at a further distance from the lower surface 572 than are the free ends 584 of the arcuate wall members 582. The cam post member 598 preferably has an aperture 604 extending therein from the free end 602, but the aperture 604 preferably does not extend all the way to the lower surface 572. The cam post member 598 is not provided at a center of the lower circular surface 572 of the disc portion 570, but rather is preferably offset from the center of the lower circular surface 572. As viewed in FIG. 34, the cam post member 598 is offset upwardly toward the alignment member 578, and to the left.

The dial member 568 may include wedge-shaped reinforcing members 606 which connect the lower surface 572 of the disc portion 570 to the outer cylindrical surface 600 of the cam post member 598. Preferably, four (4) wedge-shaped reinforcing members 606 are provided which are equidistantly separated from one another about the cam post member 598. The wedge-shaped reinforcing members 606 do not extend to the free end 602 of the cam post member 598, and preferably do not extend as far from the lower surface 572 as do the free ends 584 of the arcuate wall members 582.

Operation of the Feeder Assembly 100

Assembly of the Feeder Assembly 100

In order to utilize the feeder assembly 100, the individual parts of the feeder assembly 100 must first be assembled to that as best illustrated in FIGS. 39-50. It should be noted that the assembly of the individual parts of the feeder assembly 100 may take place in any order as desired and, as such, may take place in an order different than as described hereinbelow.

The outer grill member 184 is secured to the pan member 104 by inserting the hook members 175, 175' through the slots 236, 236' provided between the extensions 234, 234' and the bottom edges 208, 208' of the side rim portions 198, 198'. The provision of the notches 238, 238' provided through the fifth surfaces 222, 222' of the outer walls 202, 202' facilitates the insertion of the hook members 175, 175' through the slots 236, 236'.

With the hook members 175, 175' inserted through the slots 236, 236', the first and second portions 192, 192' of the rim member 186 of the outer grill member 184 and the outer rim members 152, 152' of the pan member 104 are moved toward one another until the top edges 158, 158' of the outer rim members 152, 152' are positioned against the ends 232, 232' of the sealing members 230, 230' of the first and second portions 192, 192' of the rim member 186, in order to provide a seal between the pan member 104 and the outer grill member 184.

Prior to the sealing between the pan member 104 and the outer grill member 184, the top surfaces 181, 181' and then the outer edges 183, 183' of flanges 180, 180' are moved against the angled surfaces 252, 252' of the wedge-shaped flanges 248, 248' on the tongue extensions 240, 240' of the rim member 186, until the wedge-shaped flanges 248, 248' are positioned below the flanges 180, 180' with the bottom surfaces 182, 182' of the flanges 180, 180' being positioned against the flat surfaces 250, 250' of the wedge-shaped flanges 248, 248' and with the outer edges 183, 183' of the flanges 180, 180' being generally positioned against the inner surfaces 242, 242' of the wedge-shaped flanges 248, 248'. Thus, the pan member 104 and the outer grill member 184 are releasably secured to one another by the interaction between the flanges 180, 180' and the wedge-shaped flanges 248, 248', and by the hook members 175, 175' being secured within the slots 236, 236'. The elongated apertures 254, 254' provided through the first and second portions 192, 192' of the rim member 186 allow for visual inspection of the interaction between the flanges 180, 180' and the wedge-shaped flanges 248, 248'. The pan member 104 may be removed from its securement with the outer grill member 184 by pulling the tongue extensions 240, 240' outwardly such that the interaction between the flanges 180, 180' and the wedge-shaped flanges 248, 248' is removed, and thereafter removing the hook members 175, 175' from the slots 236, 236'.

The first drop tube member 482 is secured to the outer grill member 184 by inserting the first and second extension members 494, 496 through the fourth and fifth apertures 350, 352 provided through the top member 190 of the outer grill member 184. The first and second flange members 514, 516 extend into the notches 354, 356 provided in the fourth and fifth apertures 350, 352. The notches 518, 520 provided on the first and second flange members 514, 516 allow for the top member 190 to be positioned in one of each of the notches 518, 520 in order to hold a position of the first drop tube member 482 relative to the top member 190.

Likewise, the second drop tube member 482' is secured to the outer grill member 184 by inserting the first and second extension members 494', 496' through the sixth and seventh apertures 350', 352' provided through the top member 190 of the outer grill member 184. The first and second flange members 514', 516' extend into the notches 354', 356' provided in the sixth and seventh apertures 350', 352'. The notches 518', 520' provided on the first and second flange members 514', 516' allow for the top member 190 to be positioned in one of each of the notches 518', 520' in order to hold a position of the second drop tube member 482' relative to the top member 190.

The first cutout 522 of the first drop tube member 482 is positioned and configured such that the first drop tube member 482 can be positioned around the ramp portion 338 of the first feed directing extension 316 of the first fill port 312 defined in the outer grill member 184, such that the second, lower opening 340 of the first fill port 312 opens into the aperture 488 provided through the first drop tube member 482. Likewise, the first cutout 522' of the second drop tube member 482' is positioned and configured such that the second drop tube member 482' can be positioned around the ramp portion 338' of the second feed directing extension 316' of the second fill port 312' defined in the outer grill member 184, such that the second, lower opening 340' of the second fill port 312' opens into the aperture 488' provided through the second drop tube member 482'.

The second cutout 524 of the first drop tube member 482 is positioned and configured such that the first drop tube member 482 can be positioned over the first and second surfaces 140, 142 and the first edge 132 of the upstanding portion 128 of the pan member 104. Likewise, the second cutout 524' of the second drop tube member 482' is positioned and configured such that the second drop tube member 482' can be positioned over the third and fourth surfaces 144, 146 and the second edge 134 of the upstanding portion 128 of the pan member 104.

The first drop tube member 482 is positioned such that the first upstanding cone portion 106 extends upwardly into the aperture 488. A first lower feed gate G-1 is defined between the lower edge 486 of the first drop tube member 482 and the inner feeding surface 114 of the pan member 104. Likewise, the second drop tube member 482' is positioned such that the second upstanding cone portion 106' extends upwardly into the aperture 488'. A second lower feed gate G-1' is defined between the lower edge 486' of the second drop tube member 482' and the inner feeding surface 114' of the pan member 104.

The first inner grill member 408 is positioned inside of the outer grill member 184, with the first arcuate ring portion 410 being positioned generally inside of the first portion 192 of the rim member 186 and generally above the first base portion 112 of the pan member 104. The lower edge 450 of the top portion 438 is positioned against and on top of the support ledges 368 of the wedge-shaped second portions 366 of the support flanges 360 extending downwardly from the top member 190 of the outer grill member 184 such that the flanges 360 support the top portion 438, and thus the first inner grill member 408. The tenth apertures 370 provided through the top member 190 of the outer grill member 184 allow for visual inspection of the engagement of the support flanges 360 with the top portion 438. The lower edge 418 of the first arcuate ring portion 410 is also positioned against and on top of the shelf portions 179 defined by the notches 178 of the reinforcement/support members 176 of the pan member 104 such that the reinforcement/support members 176 support the first arcuate ring portion 410, and thus the first inner grill member 408. The first end 412 of the first arcuate ring portion 410 is provided proximate to the first end 160 of the outer rim member 152, and the second end 414 of the first arcuate ring portion 410 is provided proximate to the second end 162 of the outer rim member 152. The apertures 456 provided through the first inner grill member 408 are configured to be generally in alignment and communication with the apertures 286 provided through the outer grill member 184.

Likewise, the second inner grill member 408' is positioned inside of the outer grill member 184, with the first arcuate ring portion 410' being positioned generally inside of the second portion 192' of the rim member 186 and generally above the second base portion 112' of the pan member 104. The lower edge 450' of the top portion 438' is positioned against and on top of the support ledges 368' of the wedge-shaped second portions 366' of the support flanges 360' extending downwardly from the top member 190 of the outer grill member 184 such that the flanges 360' support the top portion 438', and thus the second inner grill member 408'. The eleventh apertures 370' provided through the top member 190 of the outer grill member 184 allow for visual inspection of the engagement of the support flanges 360' with the top portion 438'. The lower edge 418' of the first arcuate ring portion 410' is also positioned against and on top of the shelf portions 179' defined by the notches 178' of the reinforcement/support members 176' of the pan member 104 such that the reinforcement/support members 176' support the first arcuate ring portion 410', and thus the second inner grill member 408'. The first end 412' of the second arcuate ring portion 410' is provided proximate to the first end 160' of the outer rim member 152', and the second end 414' of the first arcuate ring portion 410' is provided proximate to the second end 162' of the outer rim member 152'. The apertures 456' provided through the second inner grill member 408' are configured to be generally in alignment and communication with the apertures 286 provided through the outer grill member 184.

With the first and second inner grill members 408, 408' being supported by the reinforcement/support members 176, 176' of the pan member 104, the fingers 474 provided on the outer wall 446 of the top portion 438 of the first inner grill member 408 are configured to be positioned within the notches 476' provided between the fingers 474' that are provided on the outer wall 446' of the top portion 438' of the second inner grill member 408'. Likewise, the fingers 474' of the second inner grill member 408' are configured to be positioned within the notches 476 provided between the fingers 474 of the first inner grill member 408. The interengagement of the fingers 474, 474' of the first and second inner grill members 408, 408' effectively secures the first and second inner grill members 408, 408' together and allows for rotation of the second inner grill member 408' upon rotation of the first inner grill member 408, or vice versa. The twelfth aperture 372 through the top member 190 of the outer grill member 184 allows for visual inspection of the interengagement of the fingers 474, 474'.

The arcuate wall members 568 of the dial member 568 are inserted into the third aperture 342 of the top member 190 of the outer grill member 184 such that a portion of the lower circular surface 574 of the cylindrical disc portion 570 provided between the outer edge 576 and the arcuate wall members 582 is positioned on the exterior surface 304 of the top member 190. The outer surface 582 of each of the arcuate wall members 568 are configured to act against the aperture wall 344 of the third aperture 342. The flange member 596 provided on one of the arcuate wall members 568 is configured to be positioned within one of the notches 346 defined in the aperture wall 344, and upon rotation of the dial member 568, is configured to be repositioned in any one of the other notches 346 defined in the aperture wall 344. Depending upon which notch 346 the flange member 596 is positioned in, the alignment member 578 of the dial member 568 is configured relative thereto to be pointing at one of the indicators 348 provided on the exterior surface 304 of the top member 190.

With the arcuate wall members 582 inserted into the third aperture 342, the cam post member 598 of the dial member 568 is also inserted into the third aperture 342 and is fit within the aperture 478 of the first inner grill member 408, thus effectively securing the dial member 568 to the first inner grill member 408.

The outer ring member 526 is positioned around the fourth portions 284 of the spoke members 256 of the outer grill member 184. The outer ring member 526 is secured to the outer grill member 184 by positioning the reinforcing members 298 extending outwardly from the fourth portions 284 of the spoke members 256 into the slots 556 defined by the track members 554 of the upstanding member 528 of the outer ring member 526. The tab members 558 of the outer ring member 526 are aligned with those reinforcing members 298 having the notches 300 provided therein. The inner tab portions 560 of the tab members 558 are configured to be positioned in any one of the notches 300 provided along the reinforcing members 298 in order to secure the outer ring member 526 to the outer grill member 184. The outer tab portions 562 are configured to be moved upwardly to release the inner tab portions 560 from extending into the notches 300, in order to allow for upward or downward movement of the outer ring member 526 relative to the outer grill member 184.

With the feeder assembly 100 thus formed, the feeder assembly 100 is configured to be secured to the feed supply conduit 102, which has a plurality of apertures (not shown)

provided therethrough along a bottom thereof. The feeder assembly 100 is positioned below the feed supply conduit 102 such that one of the apertures of the feed supply conduit 102 is provided above the first top opening 328 of the first fill port 312 and such that another one of the apertures of the feed supply conduit 102 is provided above the first top opening 328' of the second fill port 312'. As such, feed flowing through the feed supply conduit 102 is allowed to flow out of the feed supply conduit 102 through the apertures, and into the first top openings 328, 328' of the first and second fill ports 312, 312'.

The feed supply conduit 102 is positioned to rest on the curved top surfaces of the second and third extending legs 320, 322 of the first feed pipe supporting base 314, between the free ends 324, 326 of the second and third extending legs 320, 322 and the first base leg 318 of the first feed pipe supporting base 314. Likewise, the feed supply conduit 102 is positioned to rest on the curved top surfaces of the second and third extending legs 320', 322' of the second feed pipe supporting base 314', between the free ends 324', 326' and the first base leg 318'.

The first feed supply conduit securement member 374 is configured to secure the feed supply conduit 102 in place relative to the first fill port 312. The first portion 376 of the first feed supply conduit securement member 374 is positioned on and against the exterior surface 304 of the top member 190 of the outer grill member 184. The lower arcuate surface 386 of the second portion 378 of the first feed supply conduit securement member 374 is positioned over and against the feed supply conduit 102. The first, second, third and fourth extensions 400, 402, 404, 406 extending downwardly from the second portion 378 of the first feed supply conduit securement member 374 are configured to be inserted into, and secured within, the first, second, third and fourth apertures 330, 332, 334, 336 of the first feed pipe supporting base 314. The securement of the first feed supply conduit securement member 374 to the first feed pipe supporting base 314 thus secures the feed supply conduit 102 to the feeder assembly 100 such that feed flowing through the feed supply conduit 102 can be moved into the first top opening 328 of the first fill port 312. The first and second extension members 494, 496 of the first drop tube member 482 extend through the first and second apertures 379, 380 of the first feed supply conduit securement member 374.

Likewise, the second feed supply conduit securement member 374' is configured to secure the feed supply conduit 102 in place relative to the second fill port 312'. The first portion 376' of the second feed supply conduit securement member 374' is positioned on and against the exterior surface 304 of the top member 190 of the outer grill member 184. The lower arcuate surface 386' of the second portion 378' of the second feed supply conduit securement member 374' is positioned over and against the feed supply conduit 102. The first, second, third and fourth extensions 400', 402', 404', 406' extending downwardly from the second portion 378' of the second feed supply conduit securement member 374' are configured to be inserted into, and secured within, the first, second, third and fourth apertures 330', 332', 334', 336' of the second feed pipe supporting base 314'. The securement of the second feed supply conduit securement member 374' to the second feed pipe supporting base 314' thus secures the feed supply conduit 102 to the feeder assembly 100 such that feed flowing through the feed supply conduit 102 can be moved into the first top opening 328' of the second fill port 312'. The first and second extension members 494', 496' of the second drop tube member 482' extend through the first and second apertures 379', 380' of the second feed supply conduit securement member 374'.

Thus, with the positioning of the first and second feed pipe supporting bases 314, 314', the feed supply conduit 102 extends at an angle relative to a longitudinal length of the feeder assembly 100, and thus relative to the longitudinal length of the pan member 104 and thus relative to the longitudinal length of the outer grill member 184. Preferably, the feed supply conduit 102 extends at a forty-five degree angle relative to the longitudinal length of the feeder assembly 100, but it is to be understood that the feeder assembly 100 could be configured such that the feed supply conduit 102 extends at another angle relative the longitudinal length of the feeder assembly 100 as desired.

Unique Shape of the Feeder Assembly 100

The pan member 104 and the rim member 186 of the outer grill member 184 are both uniquely shaped in the form of two intersecting circles, such that the feeder assembly 100 is uniquely shaped in the form of two intersecting circles. Round/circular feeders have been used for years in connection with the feeding of various types of poultry as it has been found that such a configuration was capable of providing an appropriate amount of feed to birds feeding therefrom, and provided sufficient space for a desired number of birds, namely fourteen (14), to feed therefrom in a comfortable manner.

The feeder assembly 100 incorporates the well-known and desired features of the round/circular prior art feeders, essentially combining two such round/circular feeders together. Thus, the feeder assembly 100 has all of the same advantages provided as do round/circular prior art feeders, but allows for more birds to comfortably feed therefrom, namely eighteen (18) such birds, without taking up too much more of the valuable floor space in the poultry house. A typical system has a building size of forty-two (42) feet by five hundred (500) feet which houses 11,872 birds. With the round/circular prior art feeders, this typical system would require approximately 848 round/circular prior art feeders to provide adequate feeding for each of the birds within the poultry house. With this new intersecting circle configuration of the feeder assembly 100, however, this same typical system would require only approximately 658 feeder assemblies 100 to provide adequate feeding for each of the birds within the poultry house. Of course, it is to be understood that the actual number of feeder assemblies 100 required for a specific poultry house will depend on bird density, building size, and the configuration of the feed supply conduit 102, e.g., the length and number of holes provided for providing feed to the feeder assemblies 100.

Thus, by using the concept of round/circular prior art feeders, and expanding on same by basically merging two round/circular prior art feeders, the use of the feeder assemblies 100 will drastically reduce the amount of feeders required for a typical system. This reduction in the amount of feeder assemblies 100 has also been found to increase the amount of available feed space within the poultry house (that portion of the poultry house not covered by feeders), by up to 30%. This increased feed space results in a number of benefits to the birds in the poultry house and to the grower which include, but are not limited to, better uniformity in the birds, less mortality to the birds, more eggs per hen, less stress to the birds, freedom of movement for the birds within the poultry house, and improved hatchability.

Figure 1A:
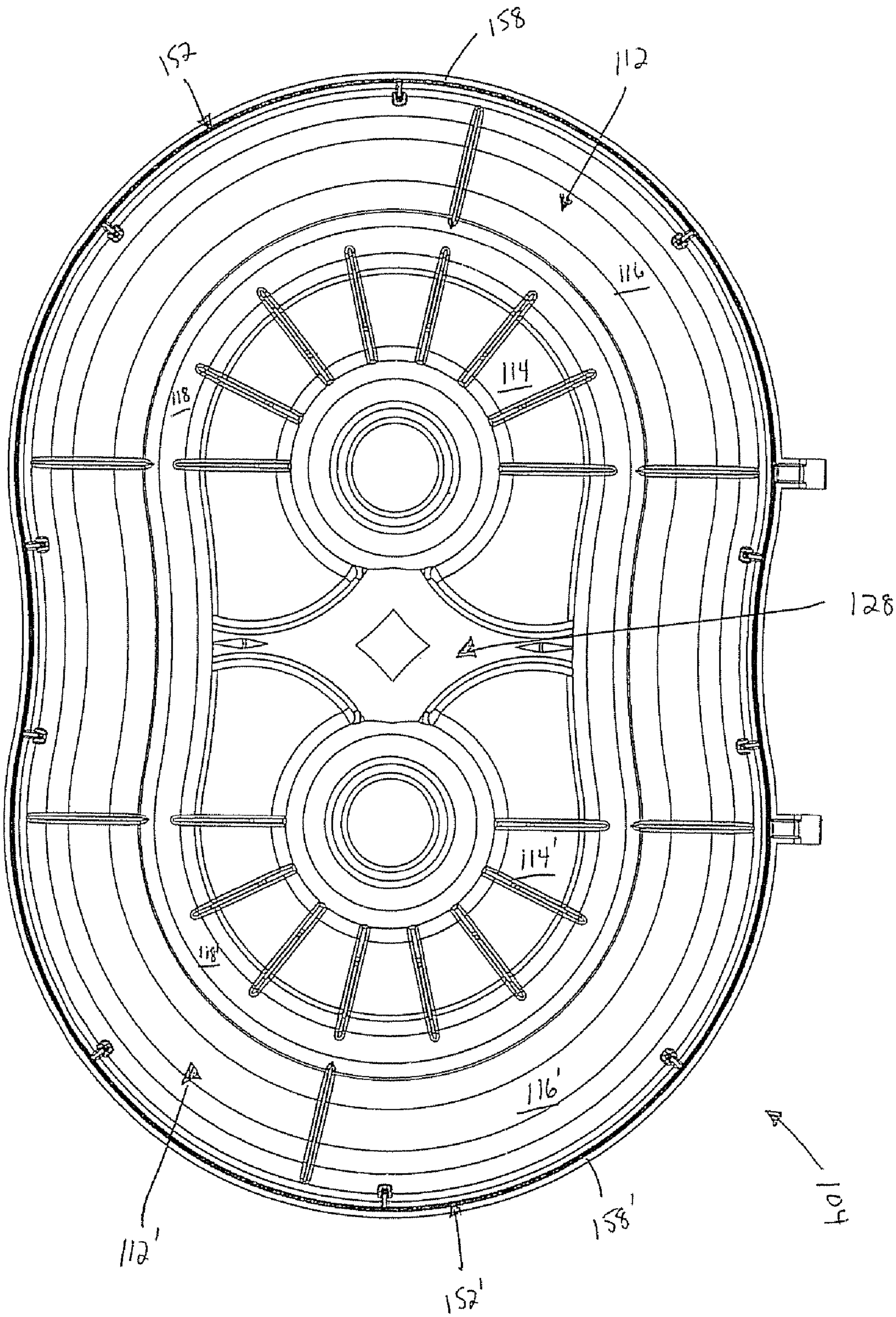
Figure 2:
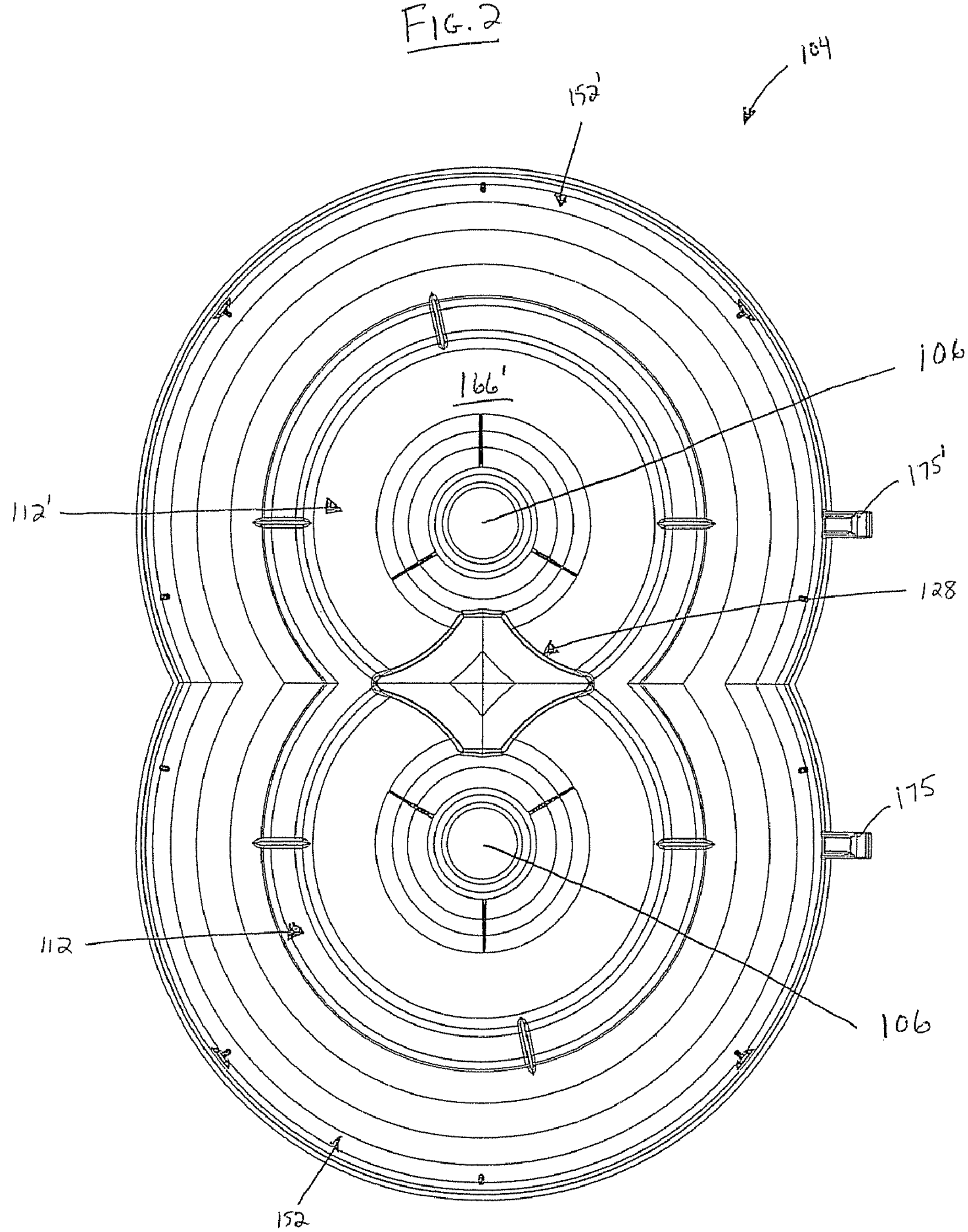
FIG. 2 is a bottom plan view of the pan member.
Figure 3:
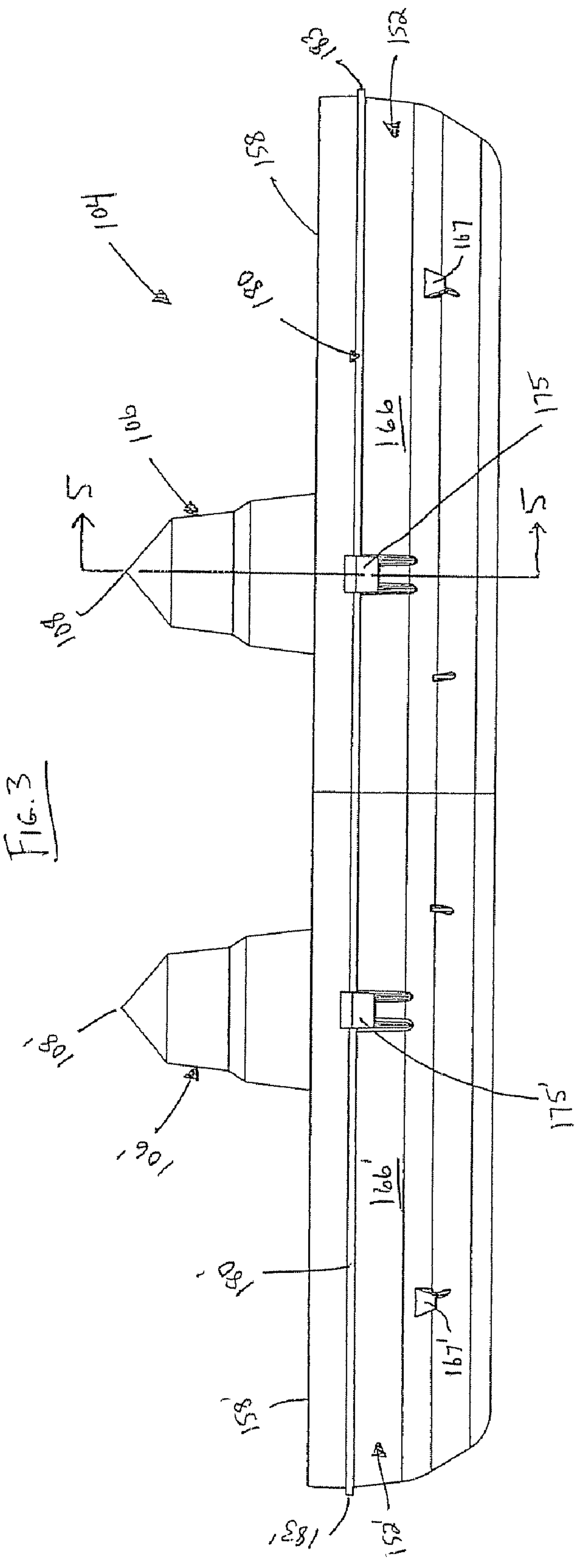
FIG. 3 is a side plan view of the pan member.
Figure 4:
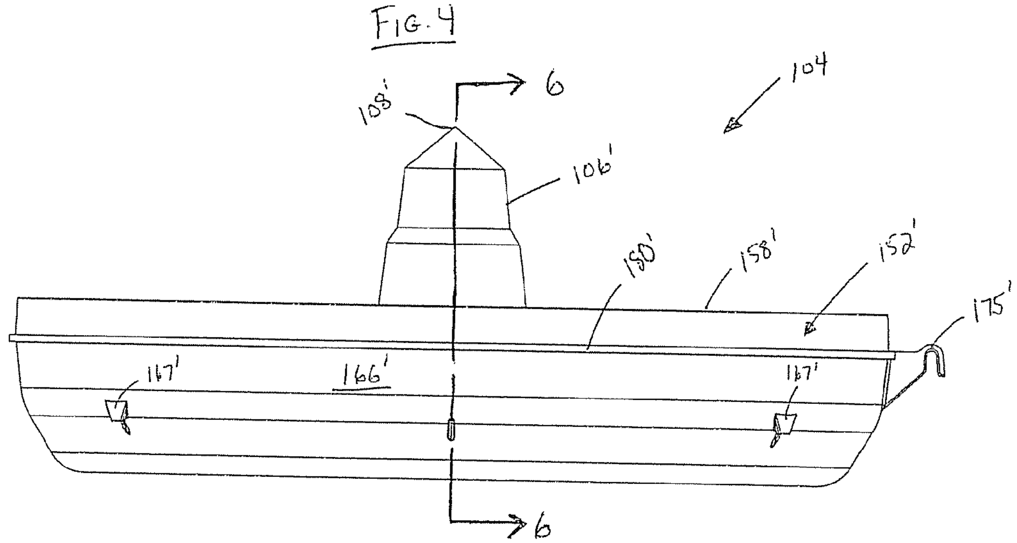
FIG. 4 is a front plan view of the pan member.
Figure 5:
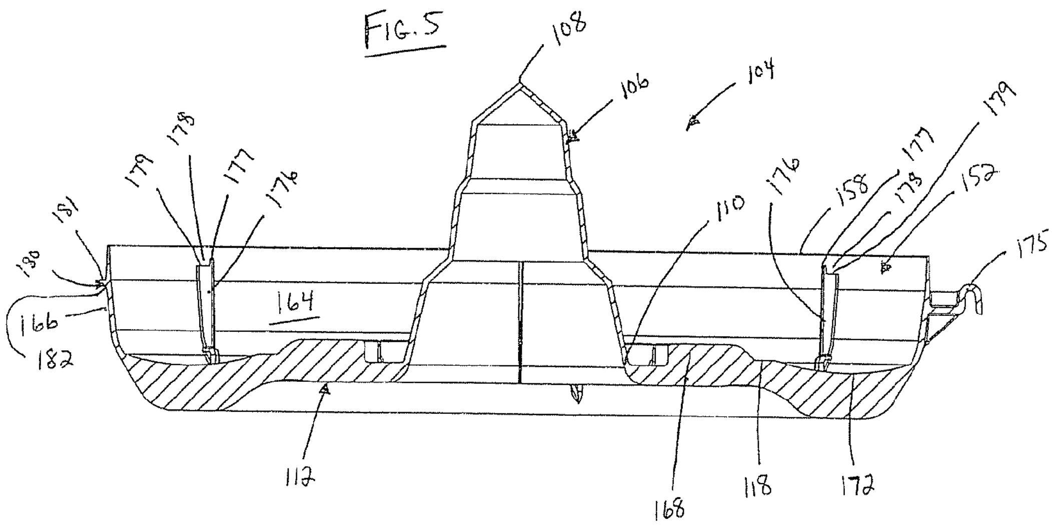
FIG. 5 is a cross-sectional view of the pan member taken along line 5-5 of FIG. 3.

It should be noted that, if desired, the shape of the inner feeding surfaces 114, 114', the outer feeding surfaces 116, 116' and the inner rim members 118, 118' of the first and second base portions 112, 112', as well as the shape of the top edges 158, 158' of the first and second outer rim members 152, 152' may be slightly altered as illustrated in FIG. 1*a*. As illustrated in FIG. 1*a*, the first and second base portions 112, 112' and the first and second outer rim members 152, 152' are still generally formed in the shape of two intersecting circles, but the connections between the first and second base portions 112, 112' and the connections between the first and second outer rim members 152, 152' are generally rounded or curved, thus providing a generally smooth transition between the first and second base portions 112, 112' and the first and second outer rim members 152, 152'. Such an intersecting circle configuration of the pan member 104 as illustrated in FIG. 1*a* provides for all of the same advantages as does the intersecting circle configuration of the pan member 104 illustrated in FIGS. 1-6. In view of the slight alterations to the first and second base portions 112, 112' and the first and second outer rim members 152, 152', the configuration of the upstanding portion 128 would also have to be slightly altered as illustrated in FIG. 1*a*.

Figure 7A:
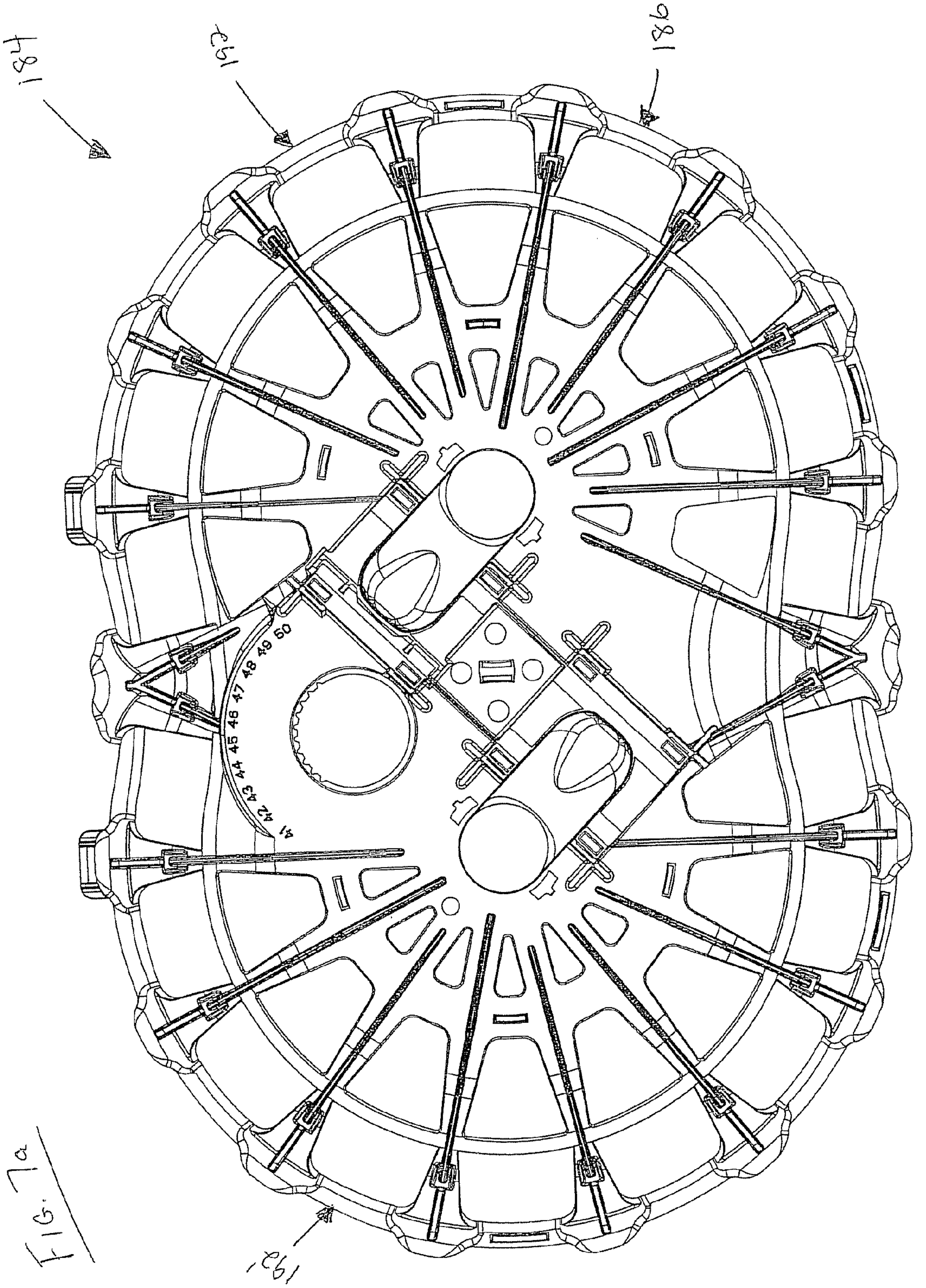
FIG. 7 is a top plan view of an outer grill member which incorporates features of the first embodiment of the feeder assembly.
Figure 8:
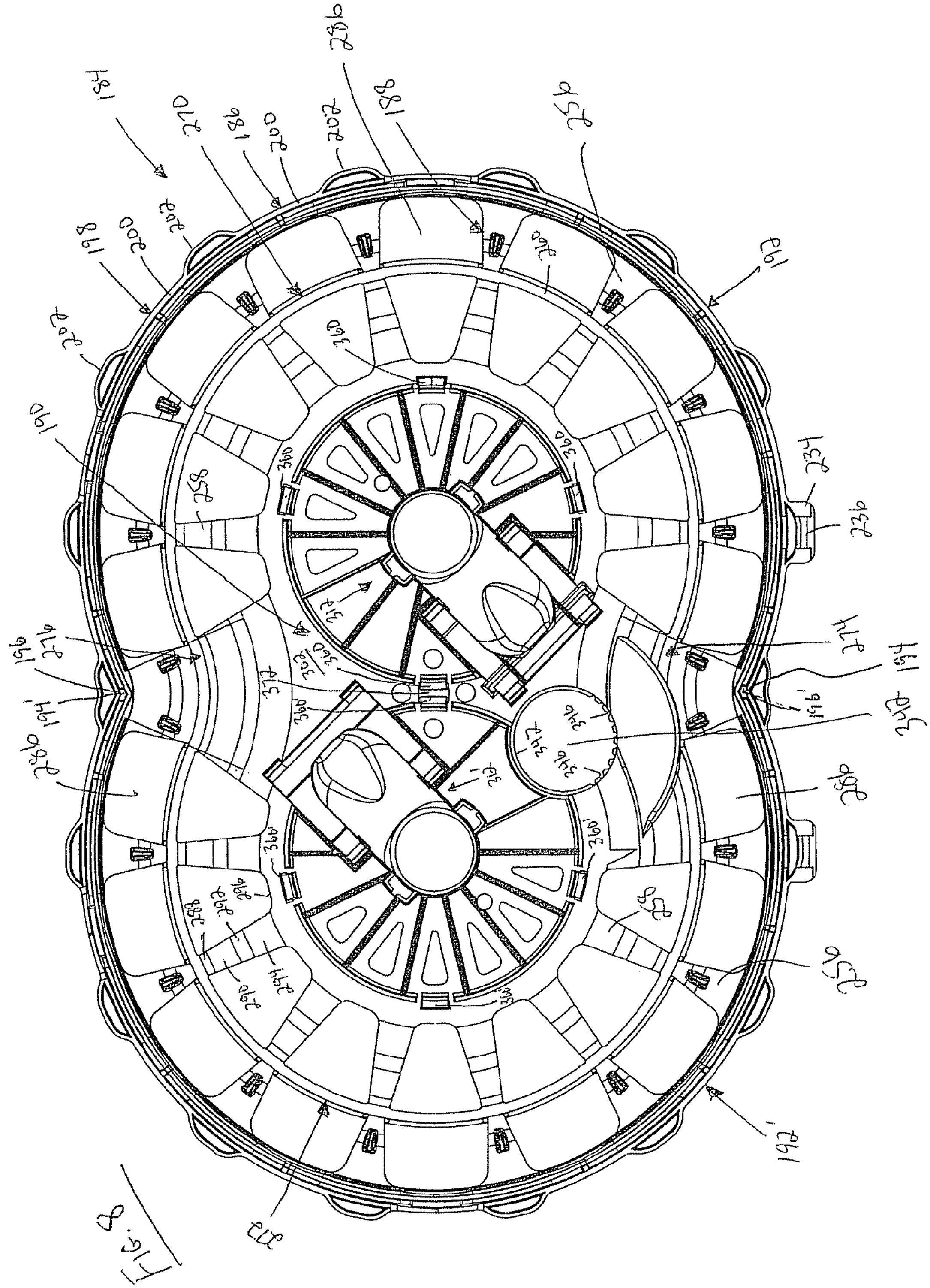
FIG. 8 is a bottom plan view of the outer grill member.
Figure 9:
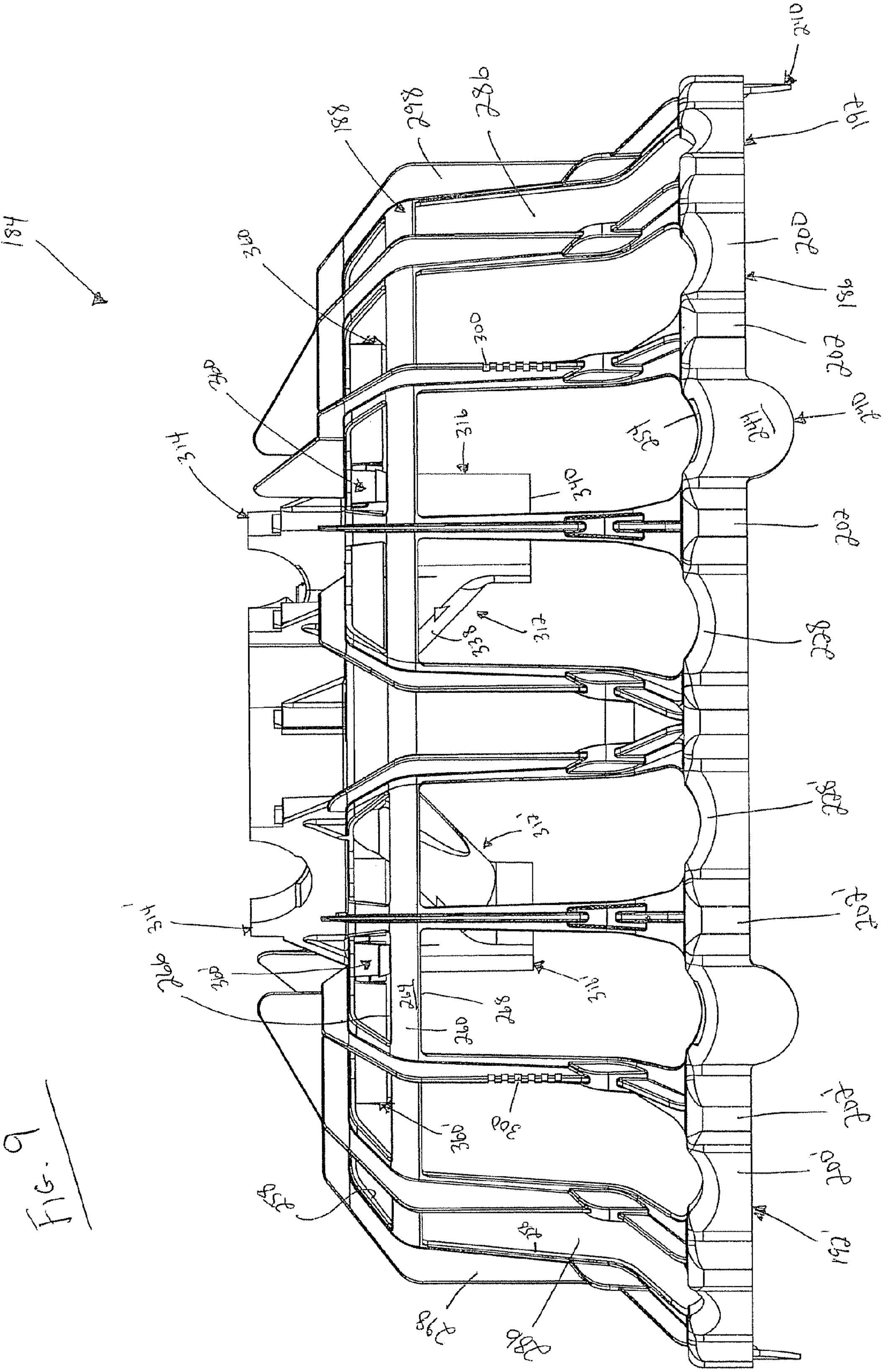
FIG. 9 is a first side plan view of the outer grill member.
Figure 1D:
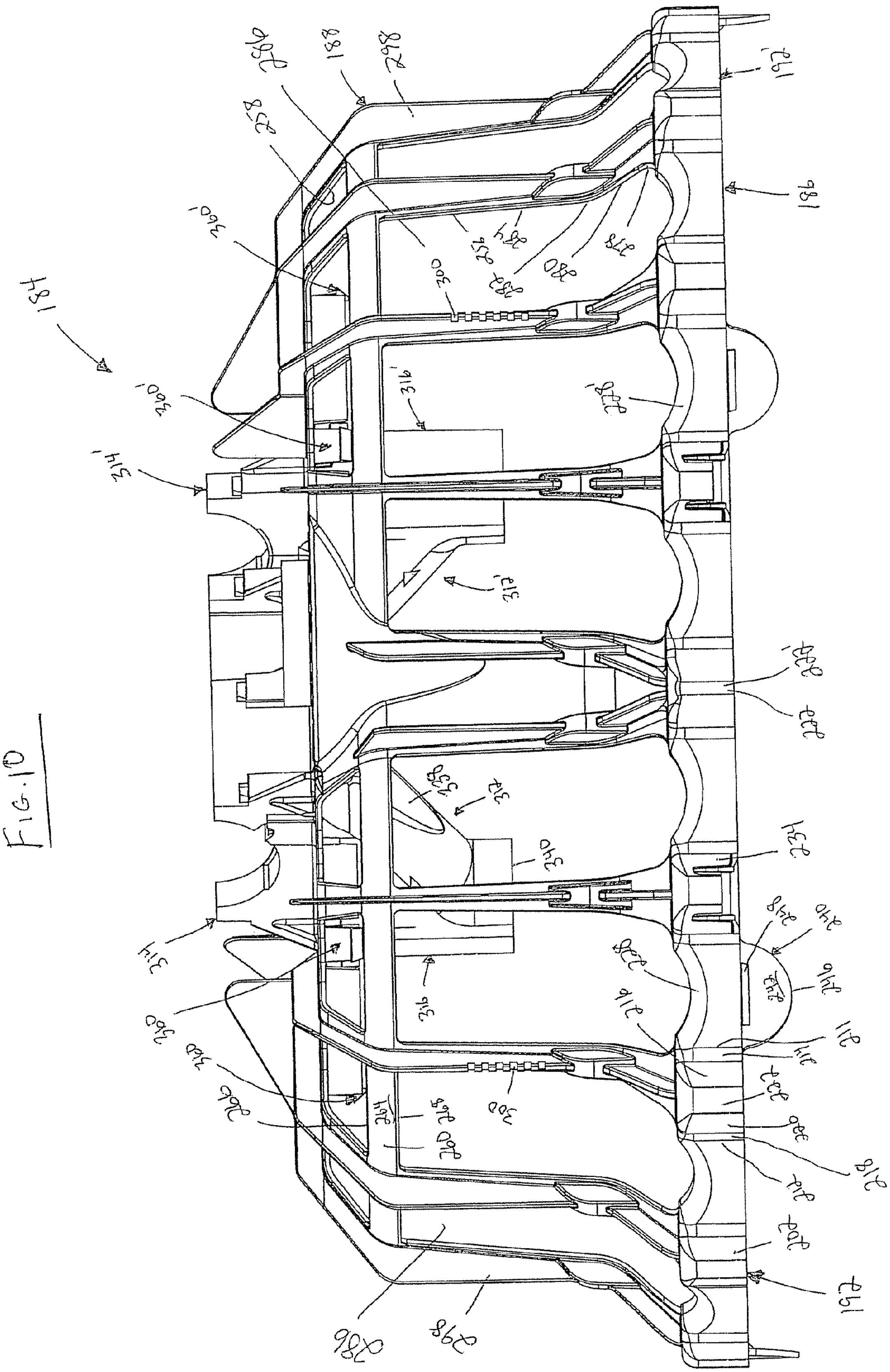
Figure 11:
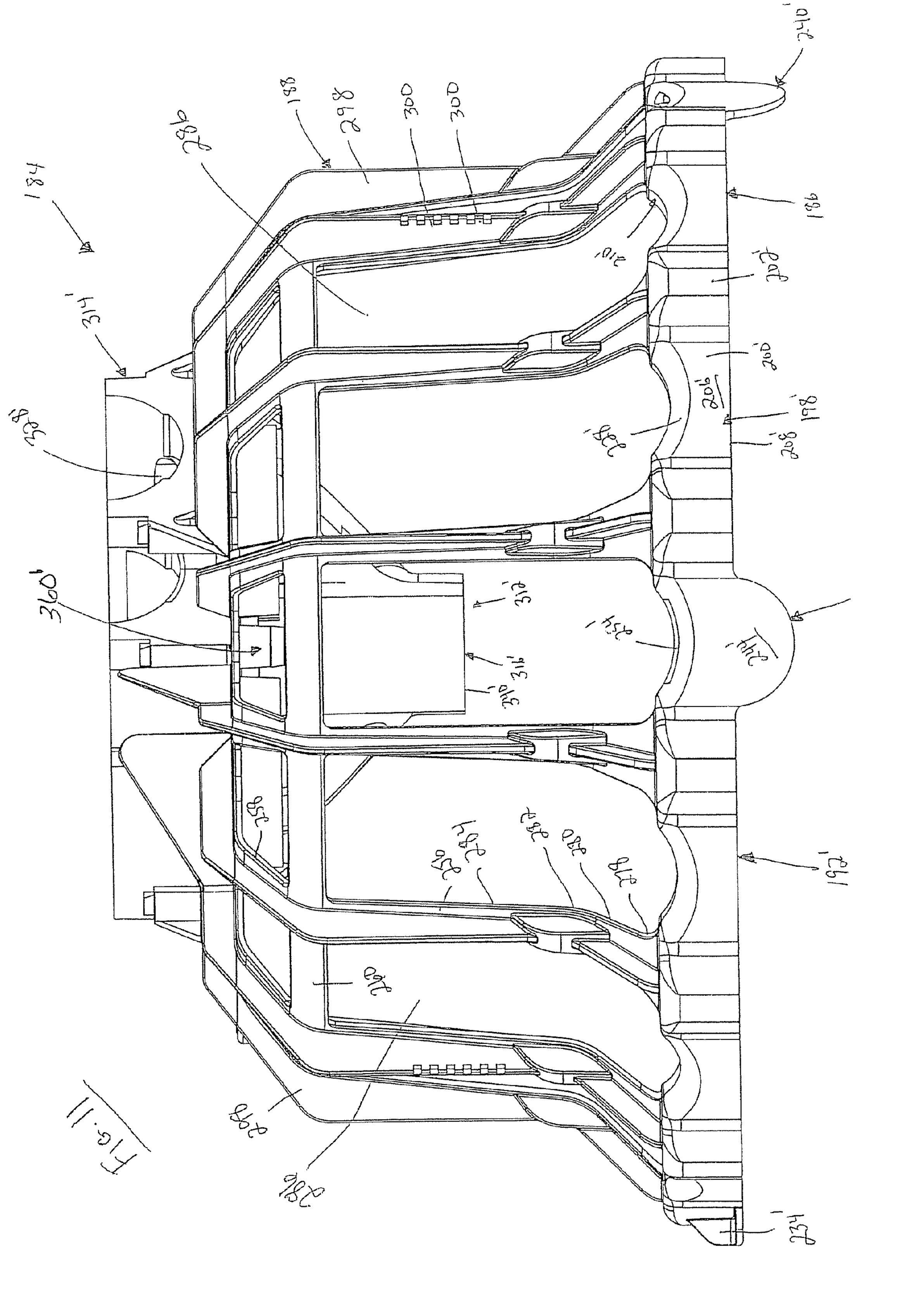
FIG. 11 a front plan view of the outer grill member.
Figure 13:
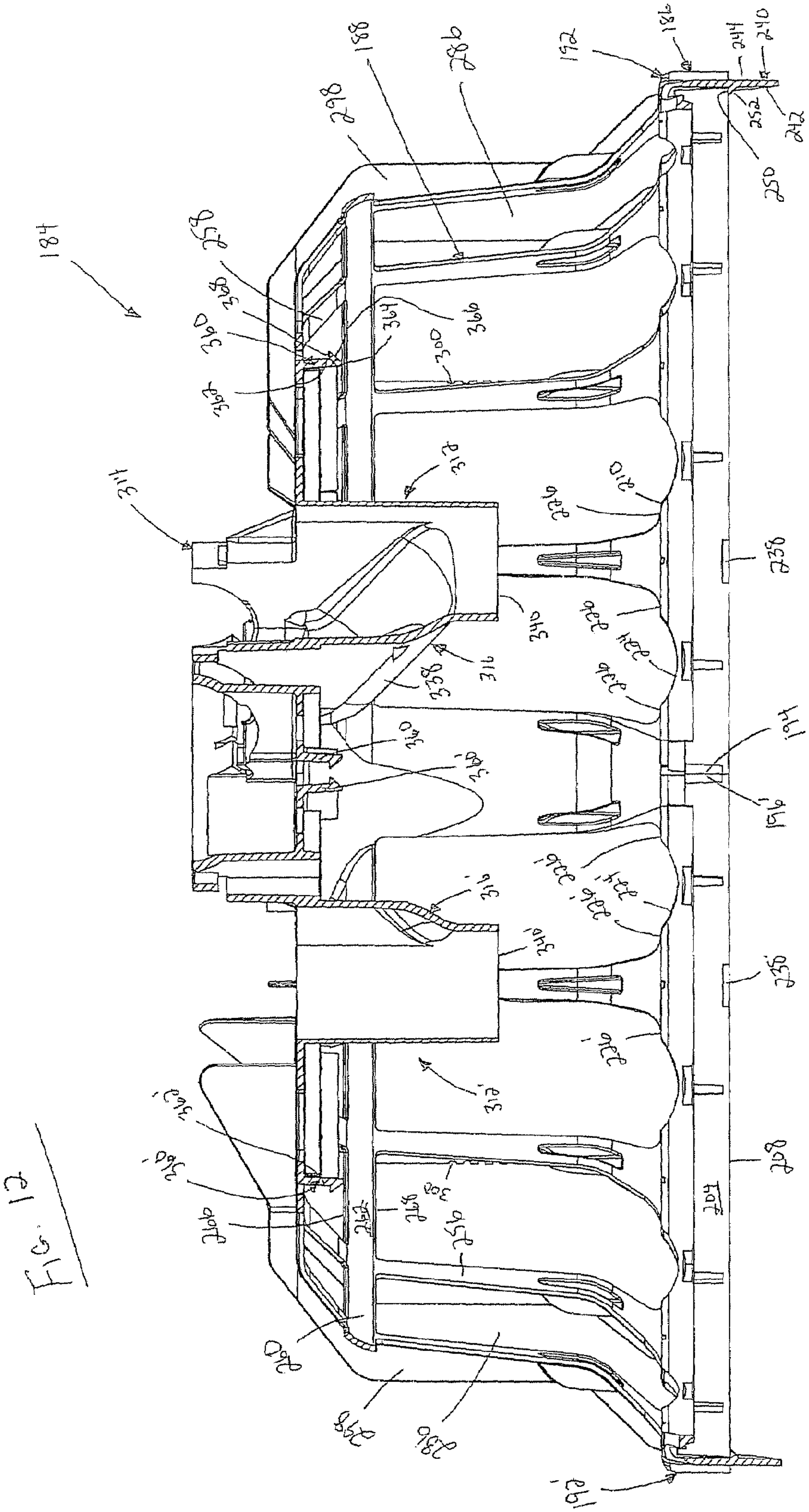
FIG. 13 is a cross-sectional view of the outer grill member taken along line W-W of FIG. 7.
Figure 13:
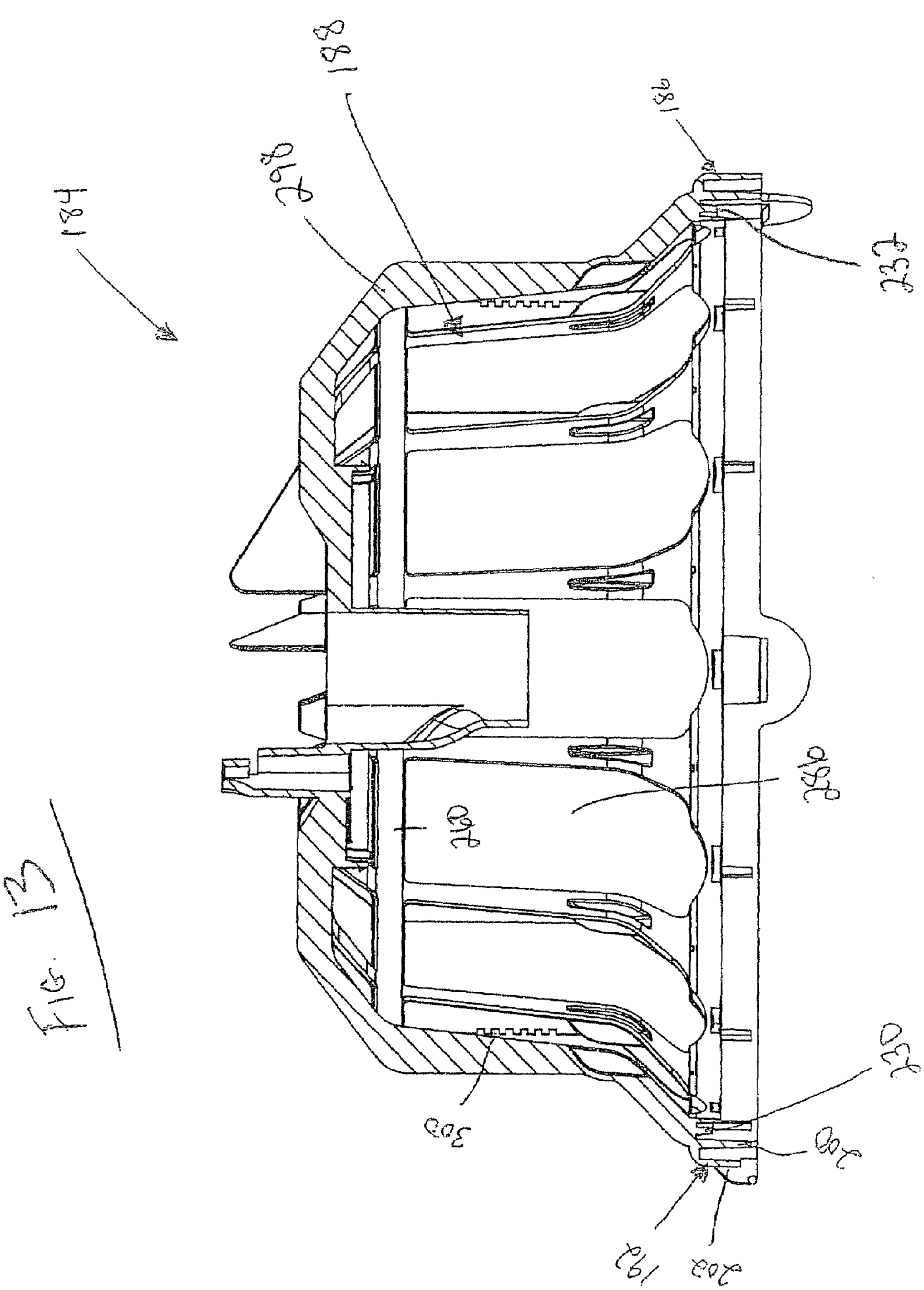
Figure 14:
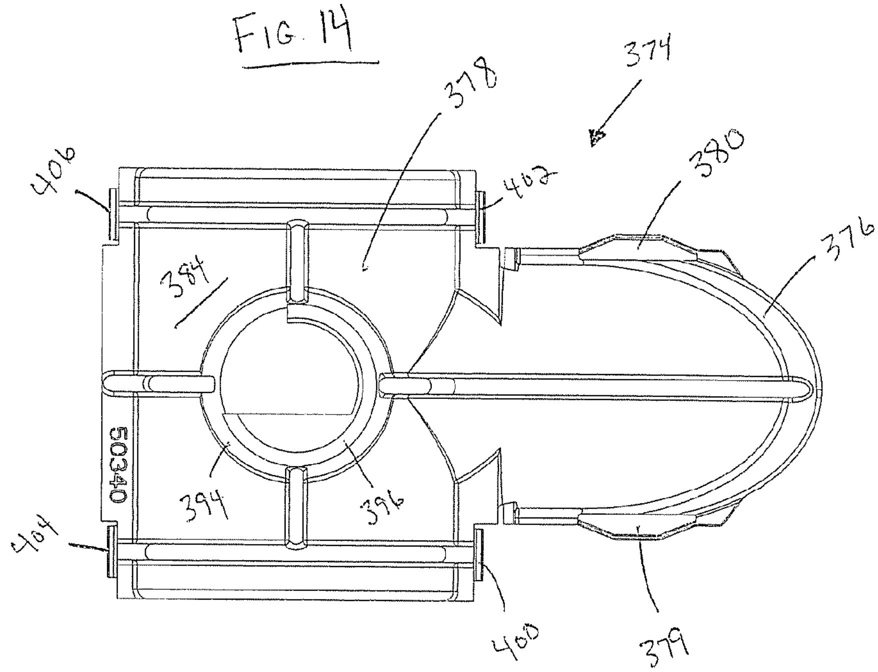
FIG. 14 is a top plan view of a feed supply conduit securement member which incorporates features of the first embodiment of the feeder assembly.
Figure 15:
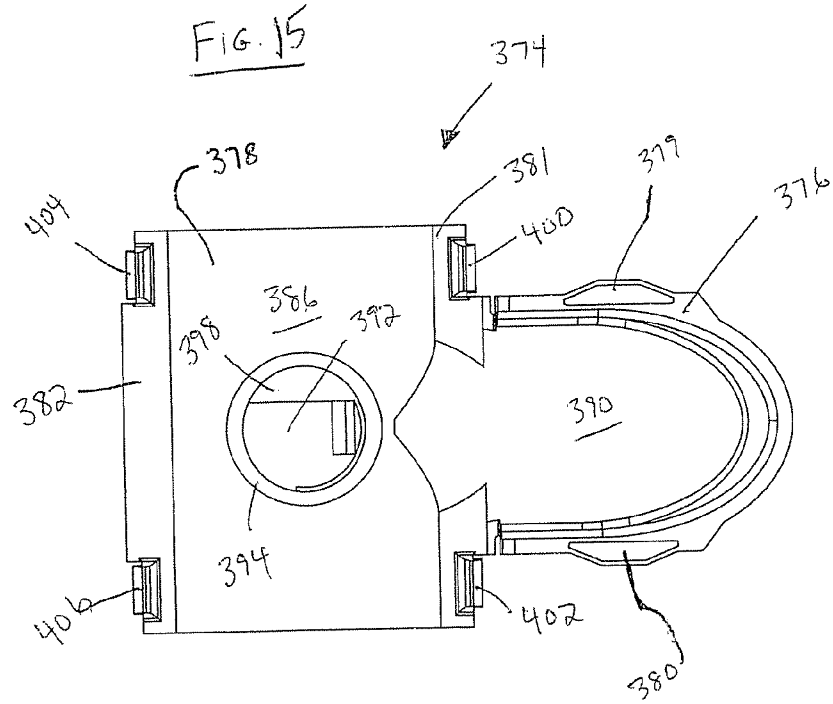
FIG. 15 is a bottom plan view of the feed supply conduit securement member.
Figure 16:
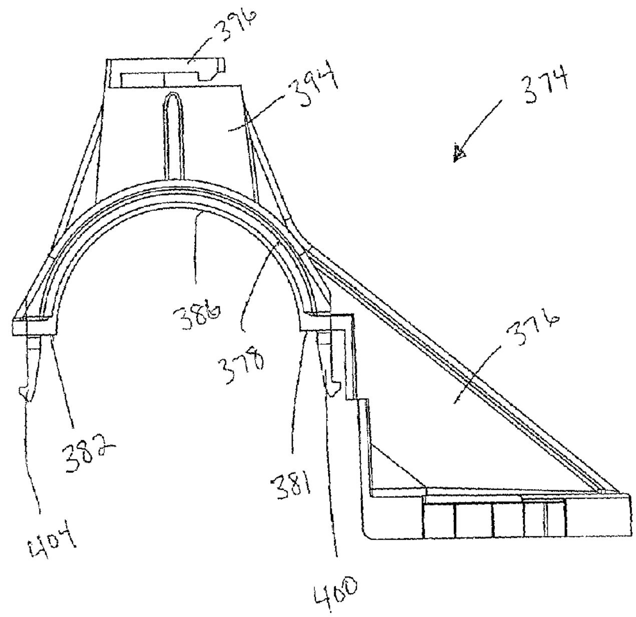
FIG. 16 is a side plan view of the feed supply conduit securement member.
Figure 18:
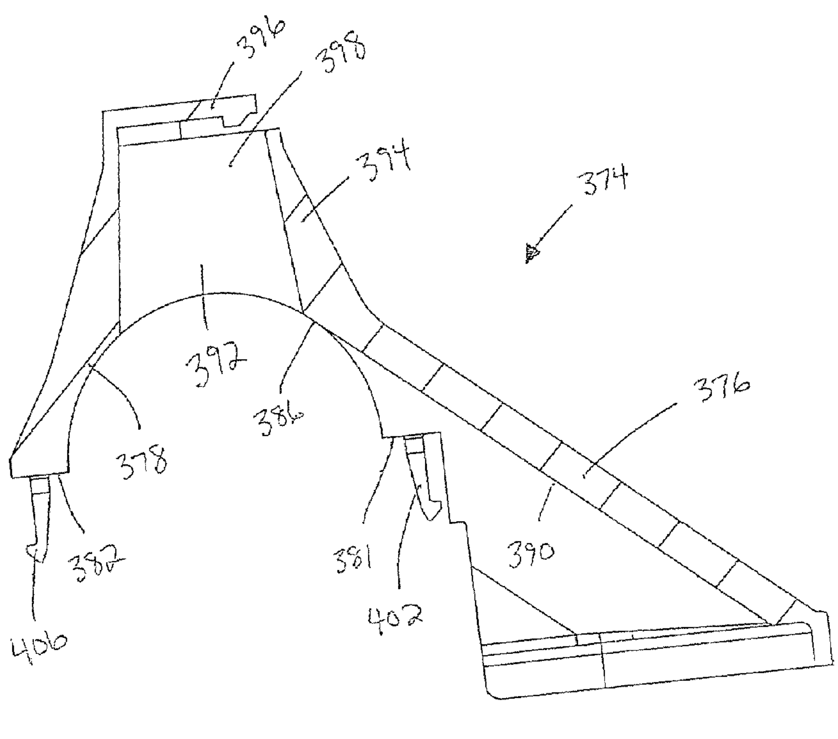
FIG. 18 is a cross-sectional view of the feed supply conduit taken along line 18-18 of FIG. 17.
Figure 17:
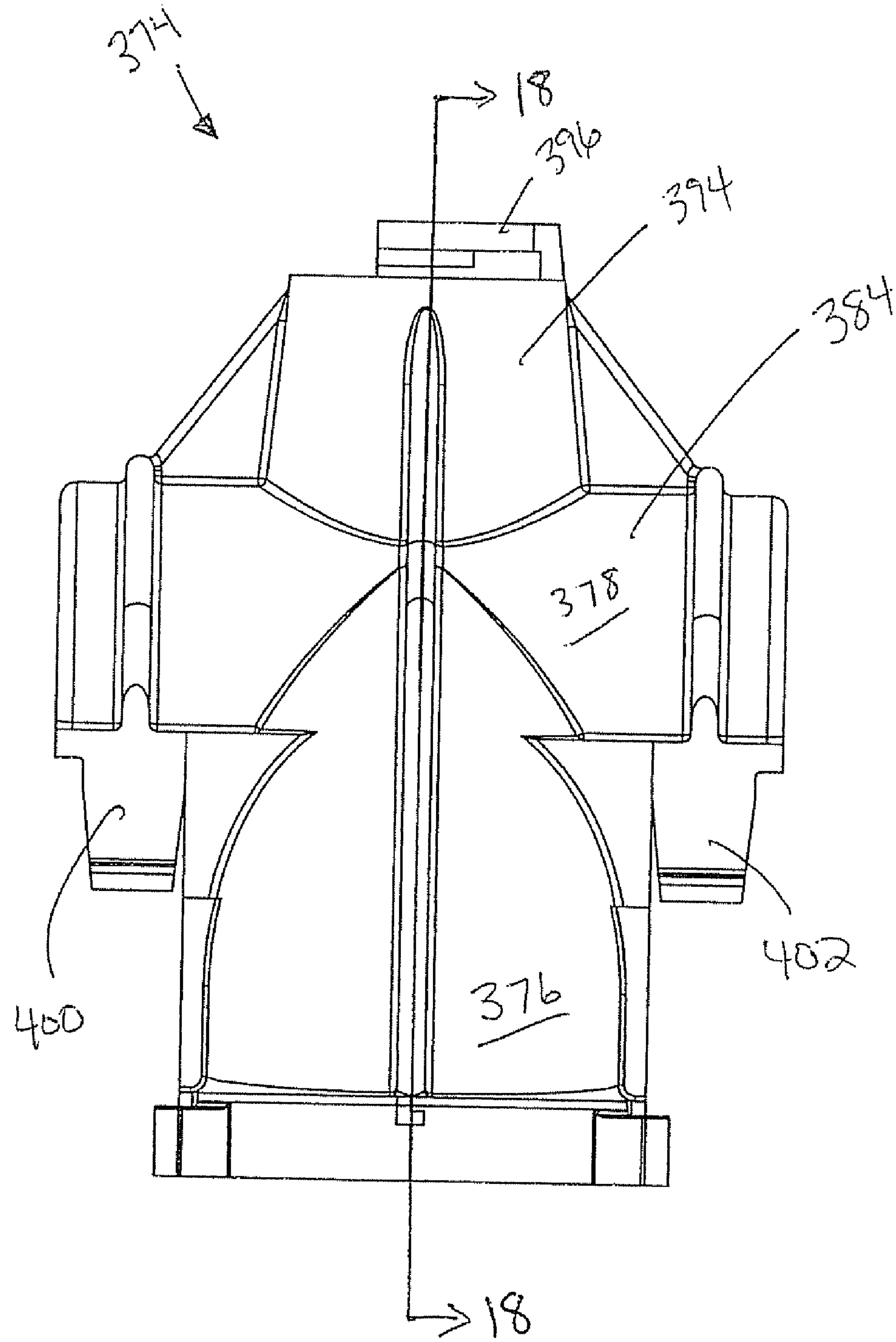
FIG. 17 is a front plan view of the feed supply conduit securement member.
Figure 19:
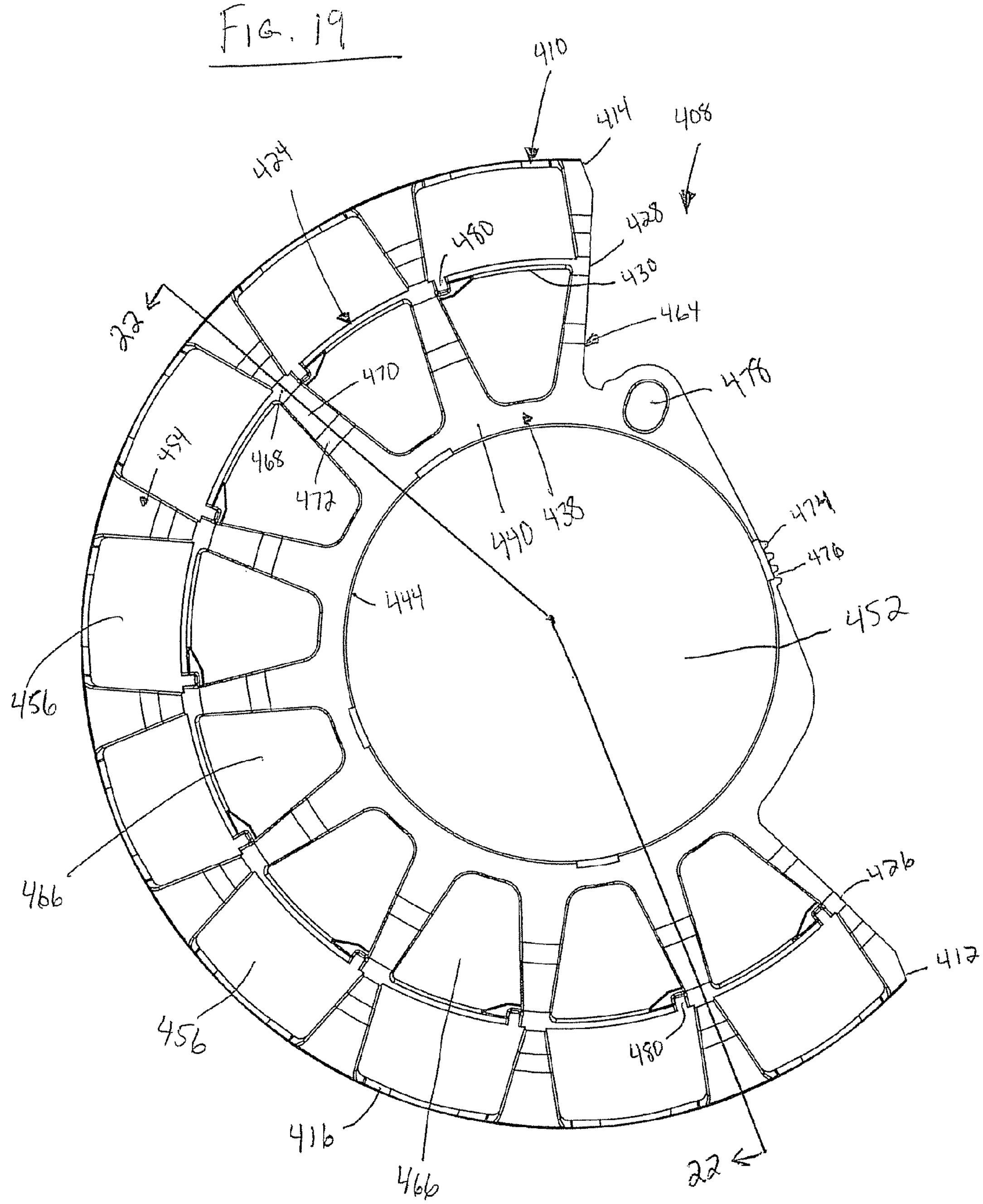
FIG. 19 is a top plan view of an inner grill member which incorporates features of the first embodiment of the feeder assembly.
Figure 20:
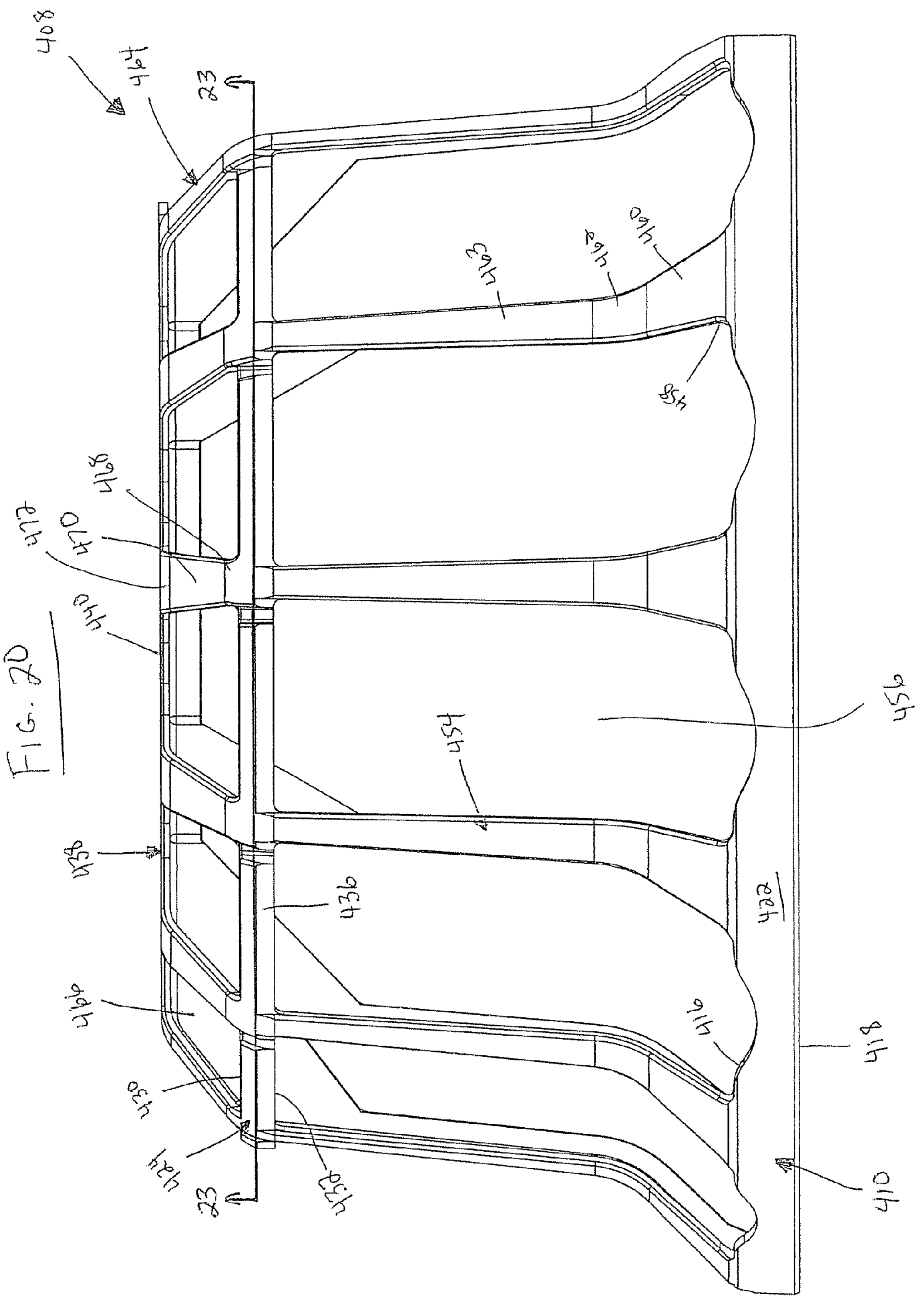
FIG. 20 is a first side plan view of the inner grill member.
Figure 21:
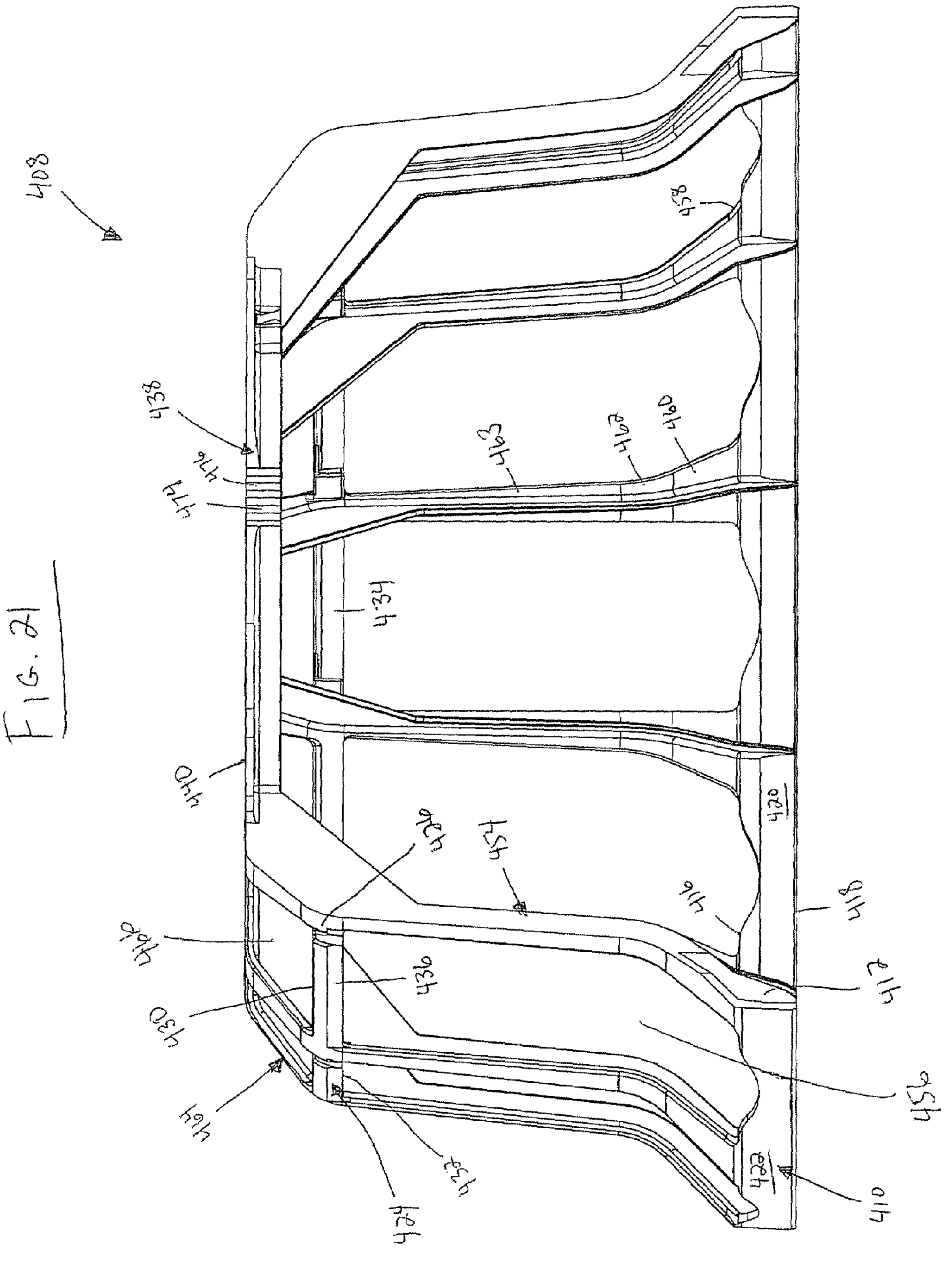
FIG. 21 is a second side plan view of the inner grill member.
Figure 22:
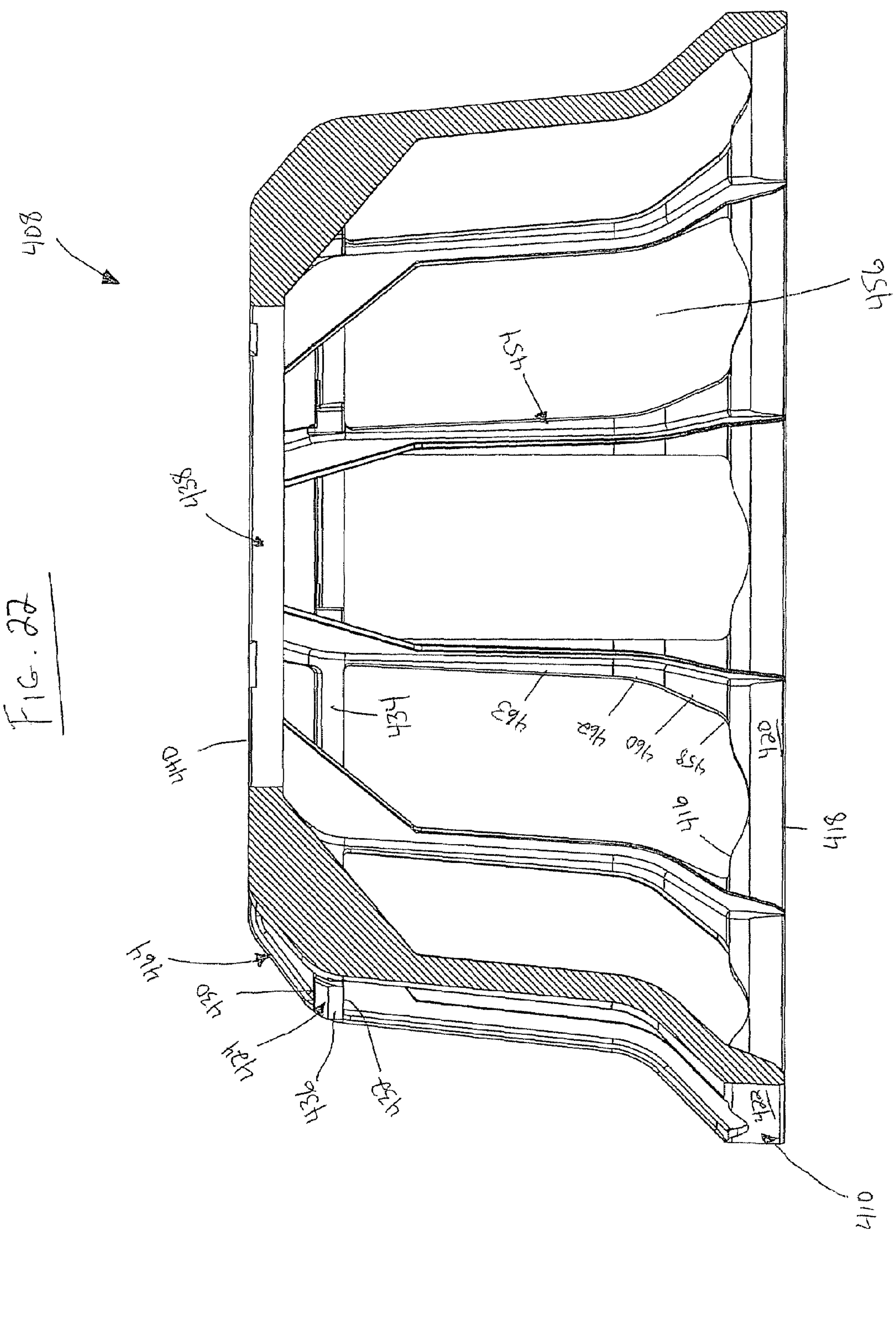
FIG. 22 is a cross-sectional view of the inner grill member taken along line 22-22 of FIG. 19.
Figure 23:
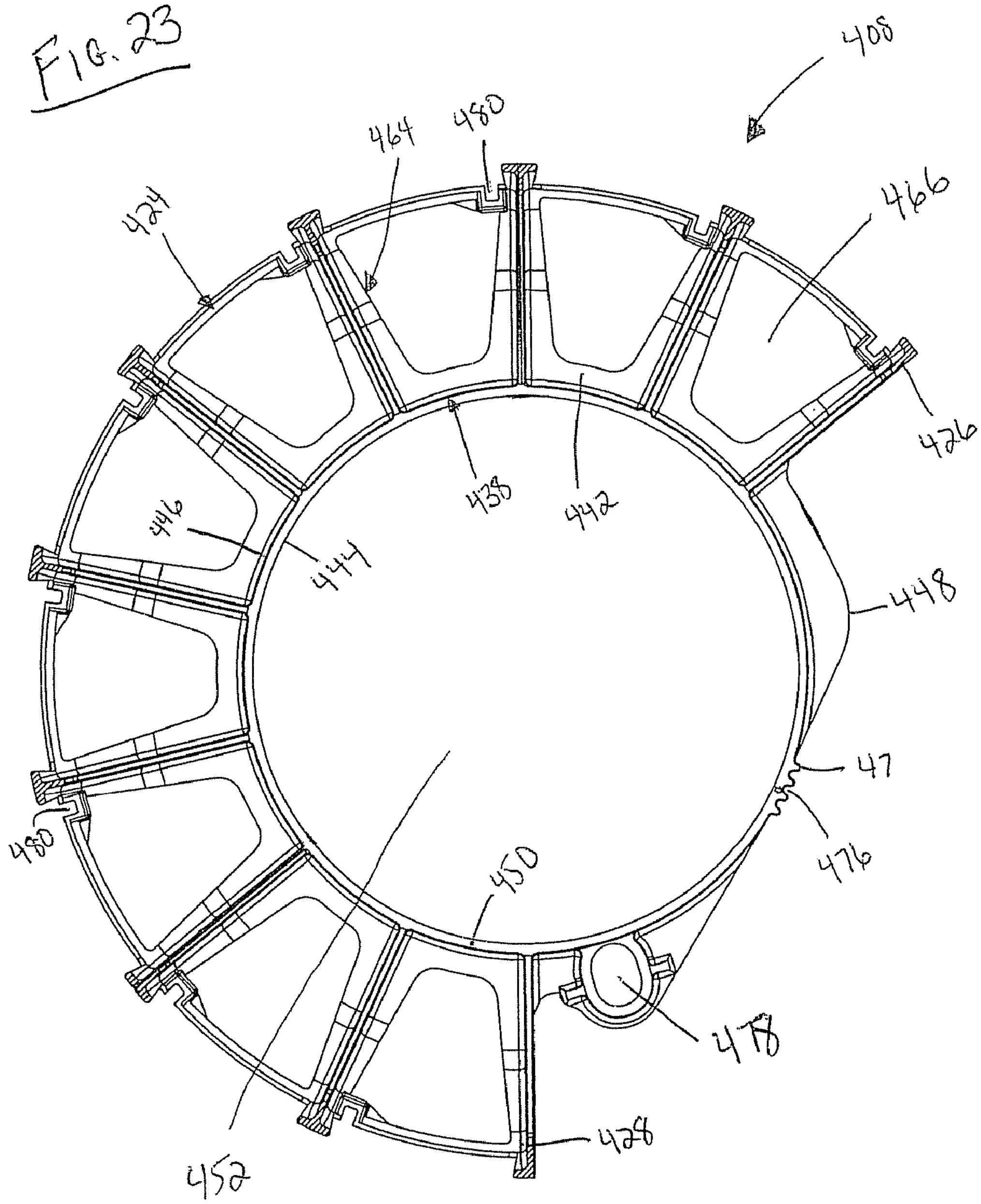
FIG. 23 is a cross-sectional view of the inner grill member taken along line 23-23 of FIG. 20.
Figure 24:
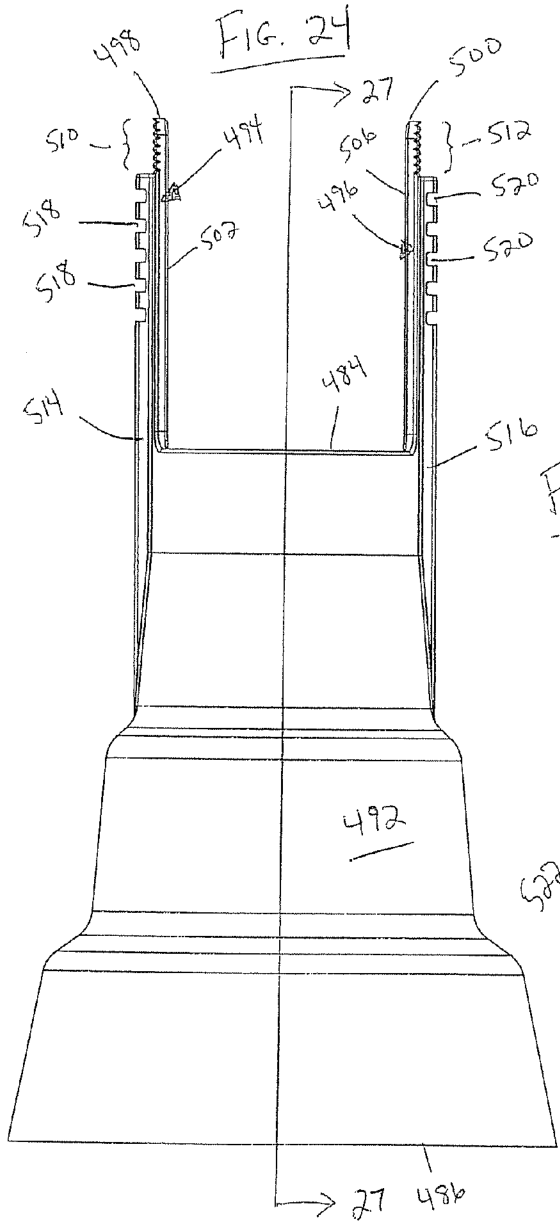
FIG. 24 is front side view of a drop tube member which incorporates features of the first embodiment of the feeder assembly.
Figure 25:
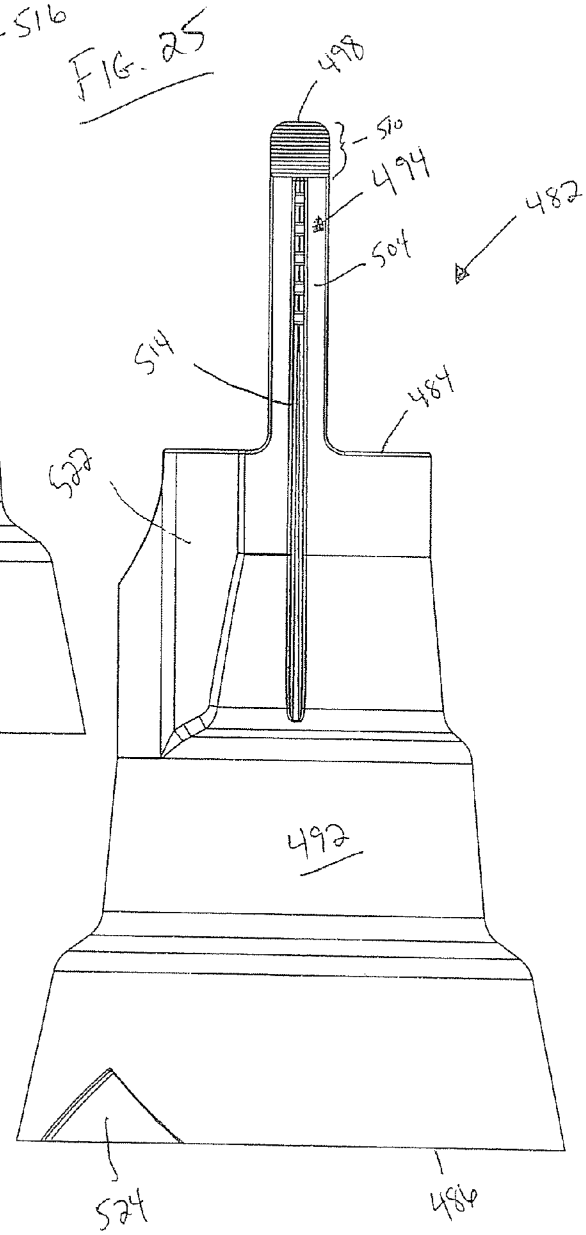
FIG. 25 is a first side plan view of the drop tube member.
Figure 26:
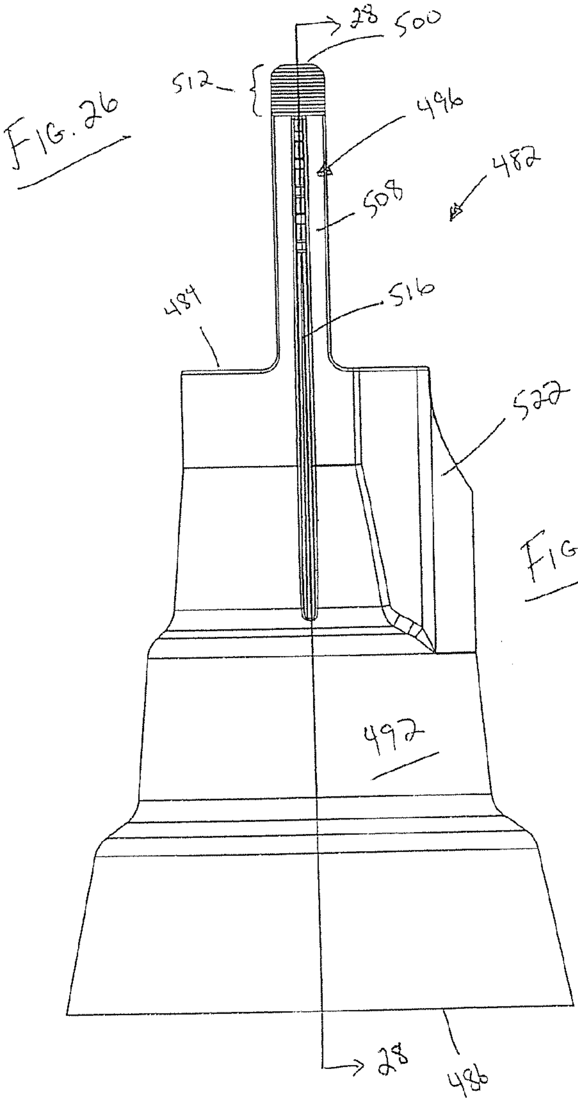
FIG. 26 is a second side plan view of the drop tube member.
Figure 27:
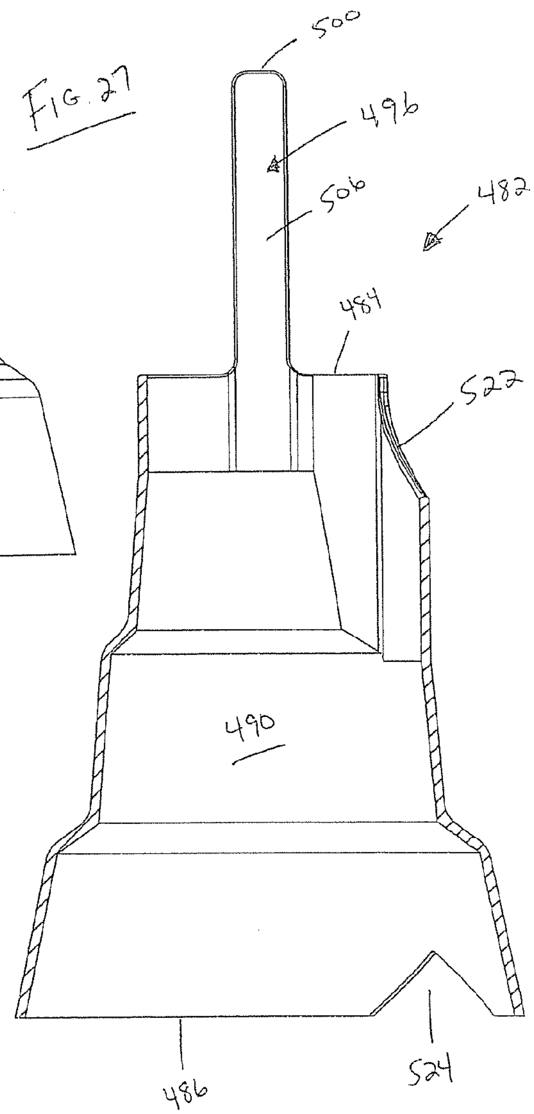
FIG. 27 is a cross-sectional view of the drop tube member taken along line 27-27 of FIG. 24.
Figure 28:
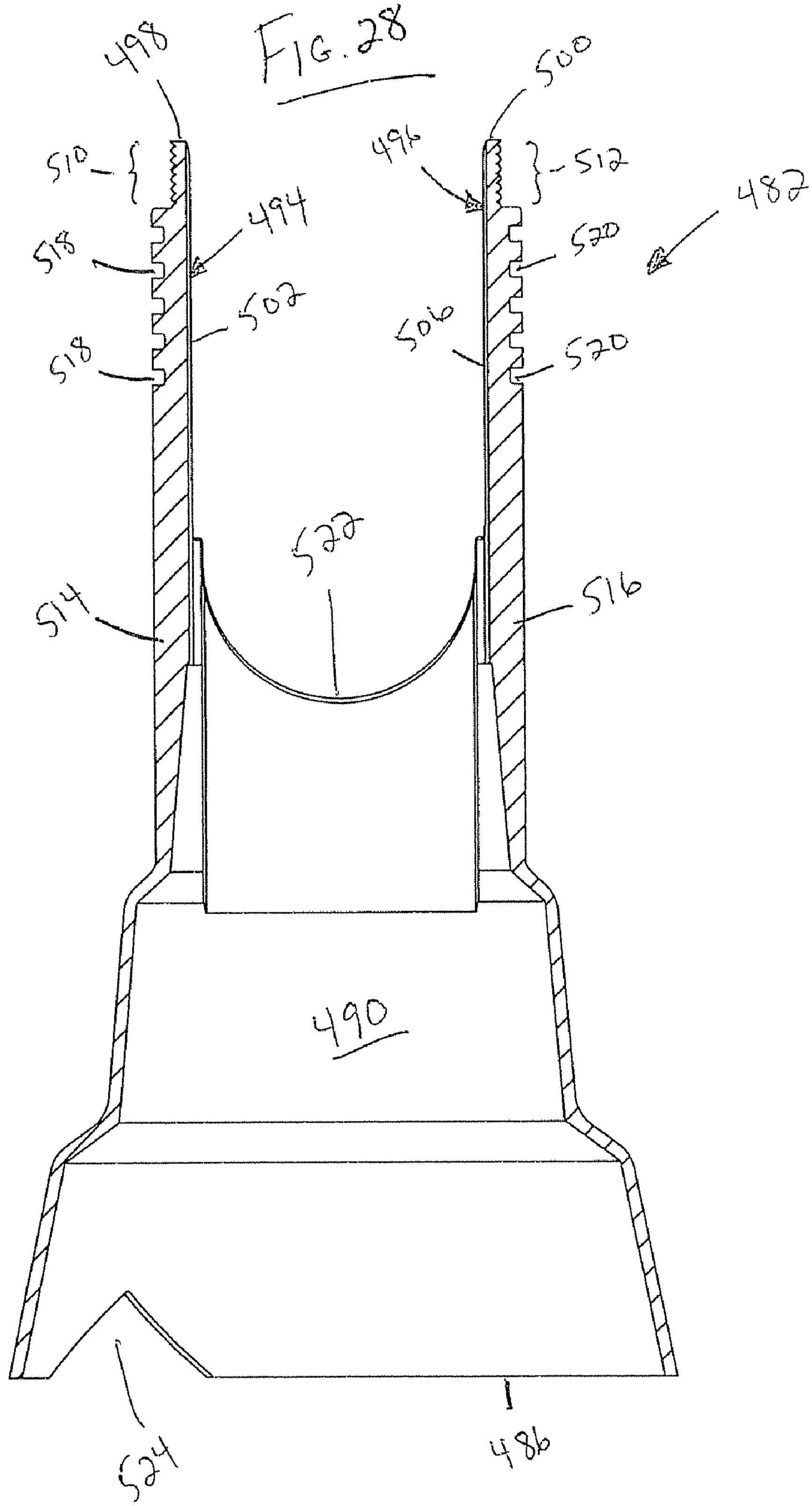
FIG. 28 is a cross-sectional view of the drop tube member taken along line 28-28 of FIG. 26.
Figure 29:
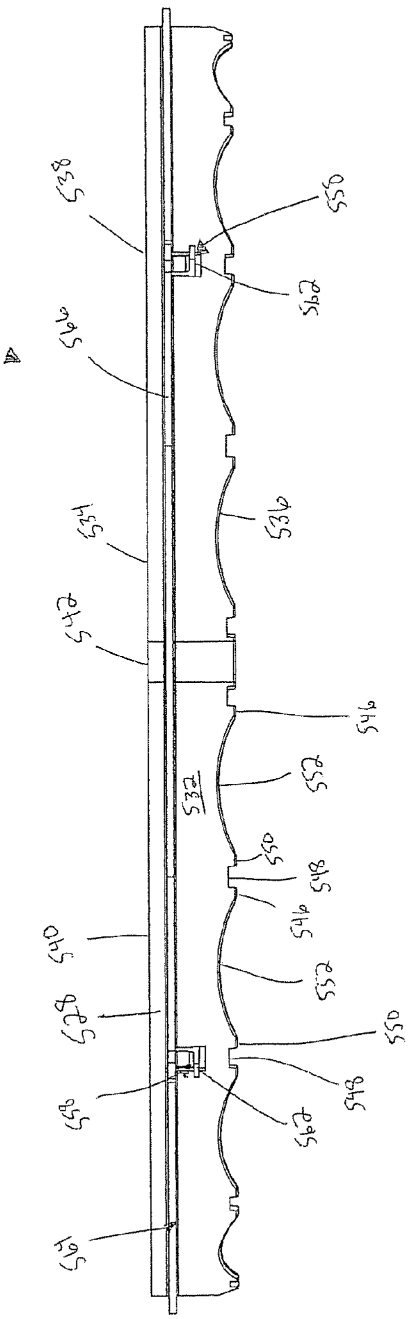
FIG. 29 is a side view of an outer ring member which incorporates features of the first embodiment of the feeder assembly.
Figure 30:
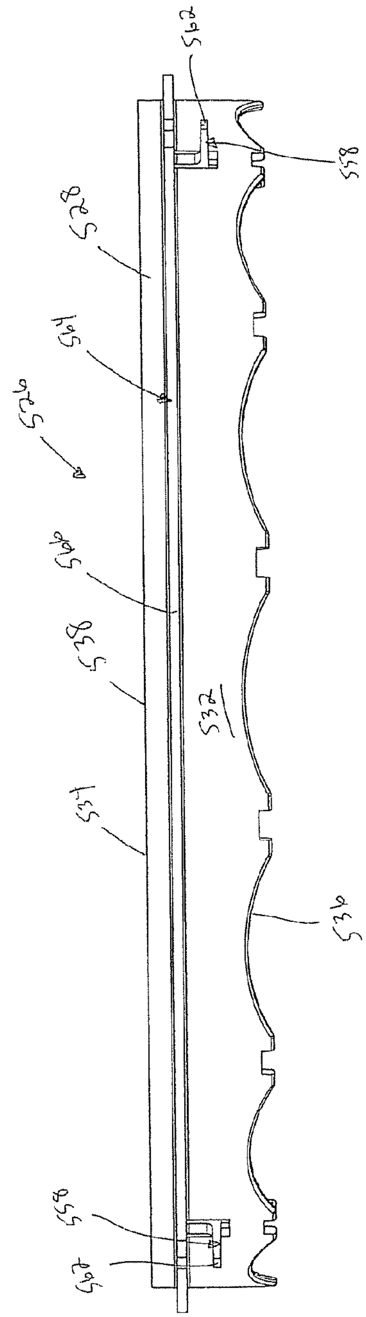
FIG. 30 is a front side view of the outer ring member.
Figure 31:
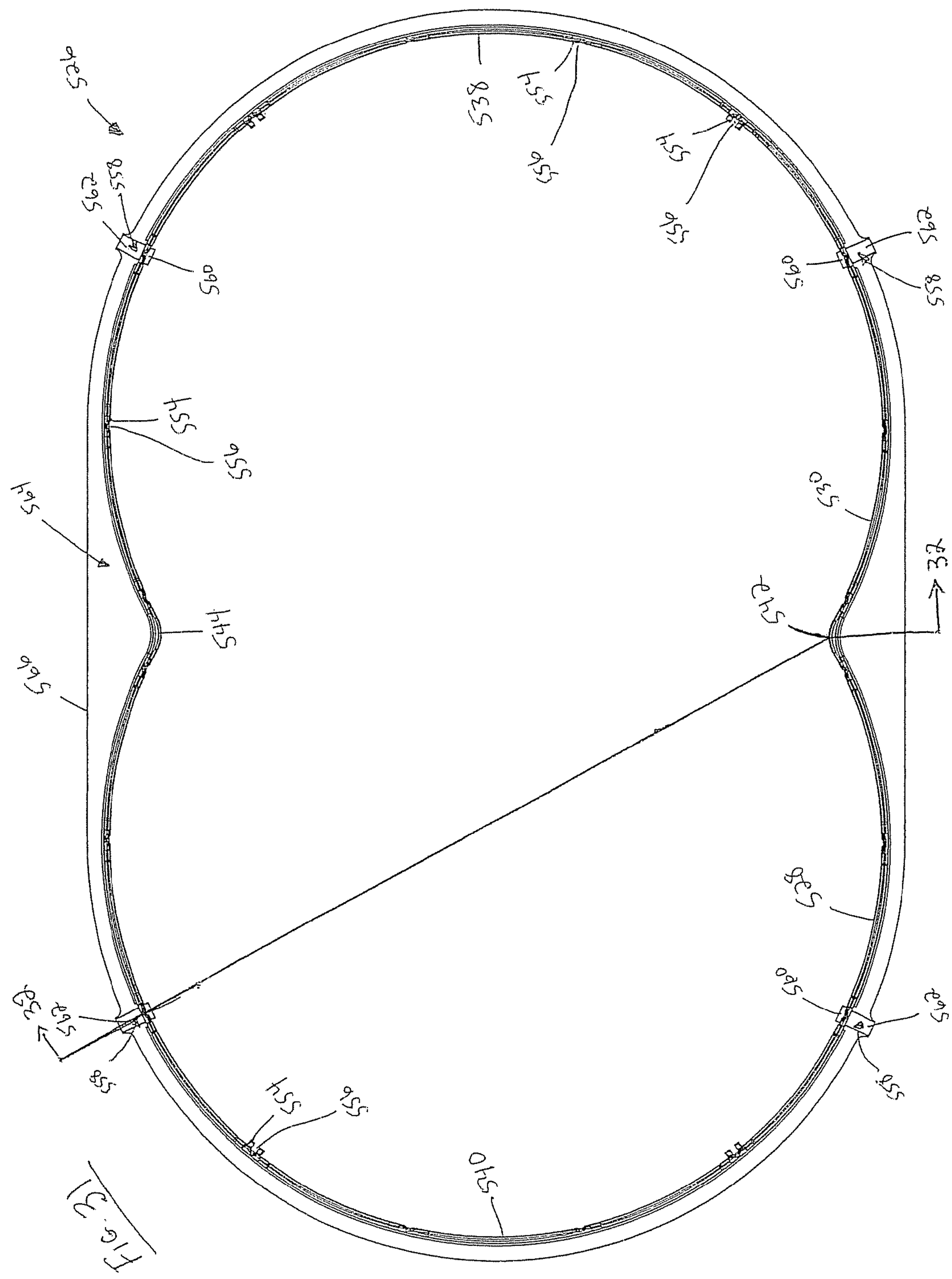
FIG. 31 is top view of the outer ring member.
Figure 32:
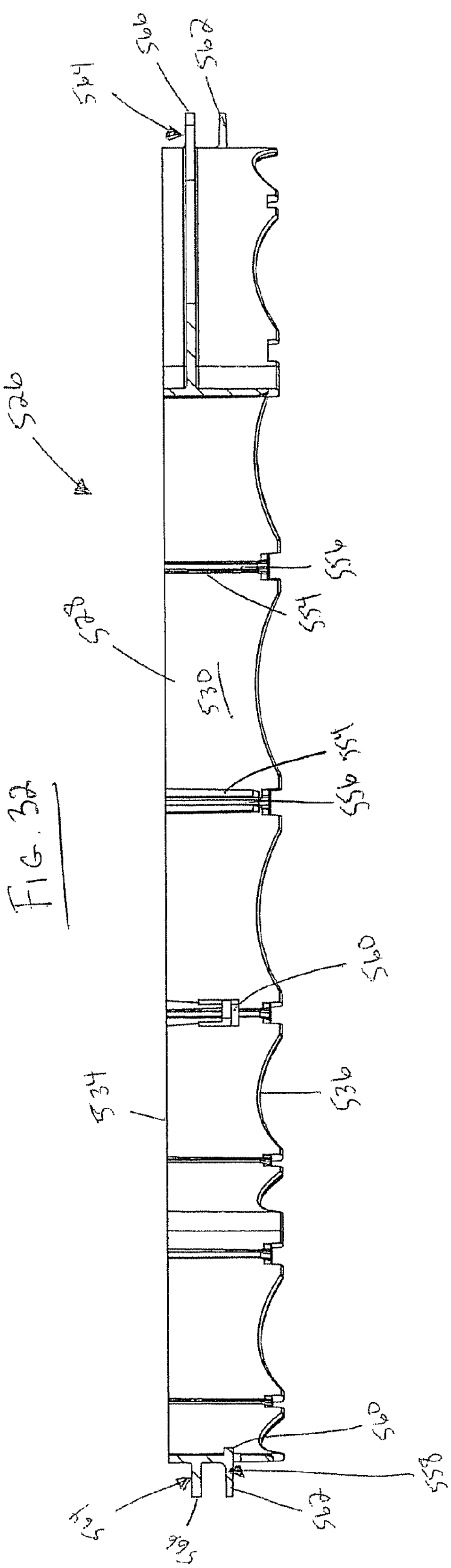
FIG. 32 is a cross-sectional view of the outer ring member taken along line 32-32 of FIG. 31.
Figure 34:
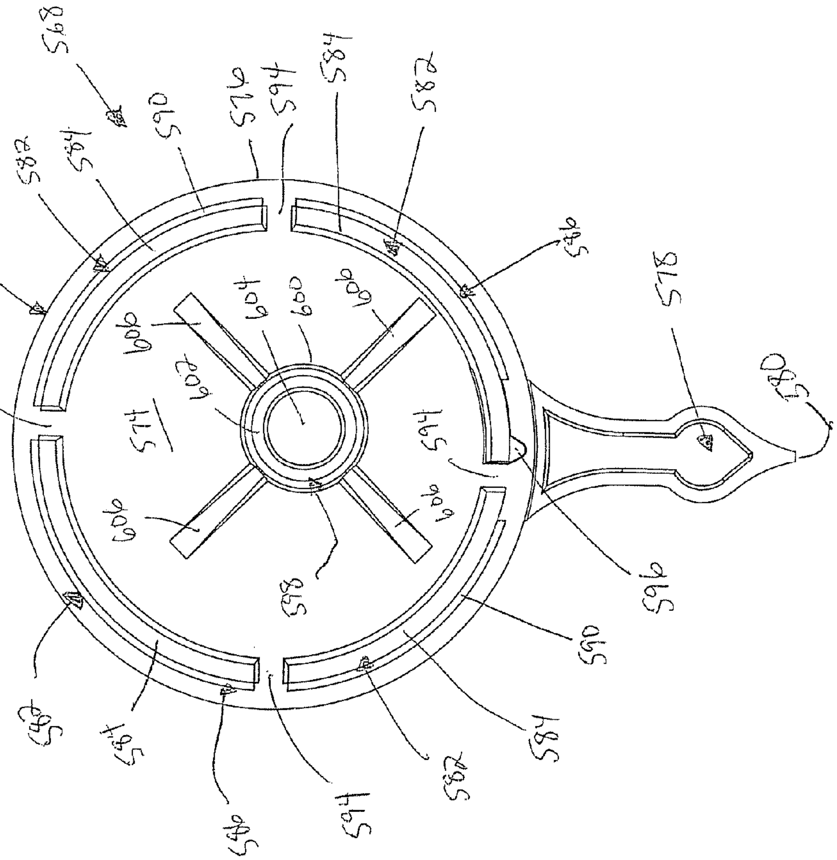
FIG. 34 is a bottom view of the dial member.
Figure 33:
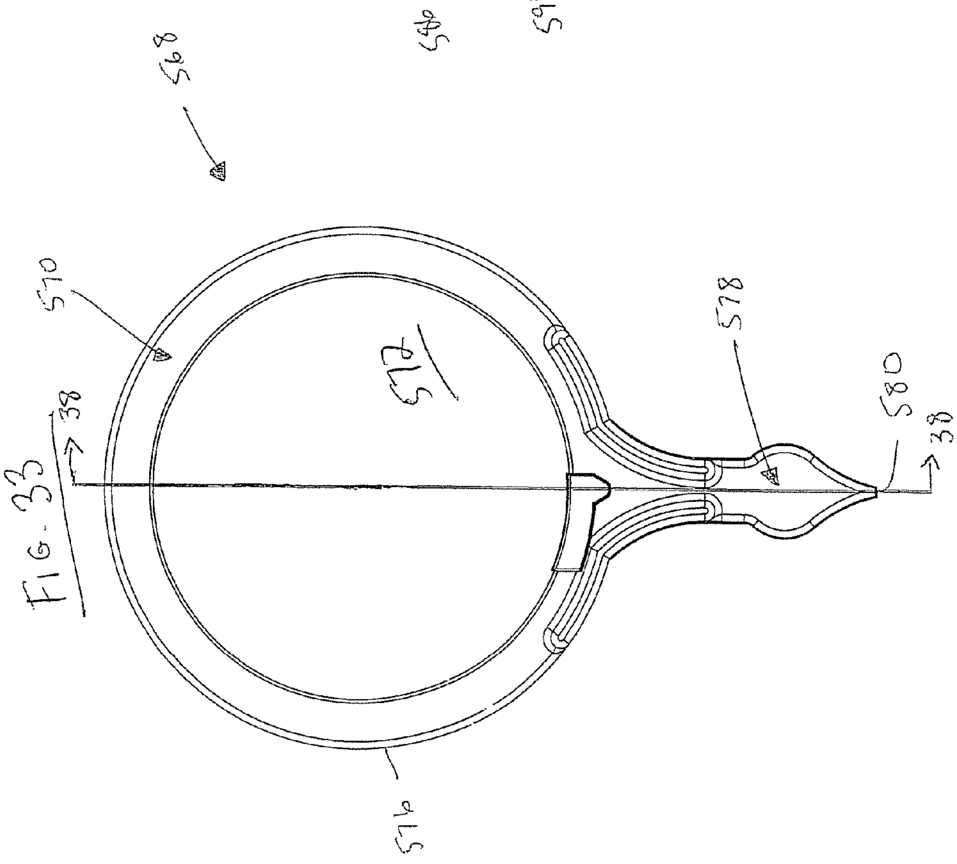
FIG. 33 is a top view of a dial member which incorporates features of the first embodiment of the feeder assembly.
Figure 35:
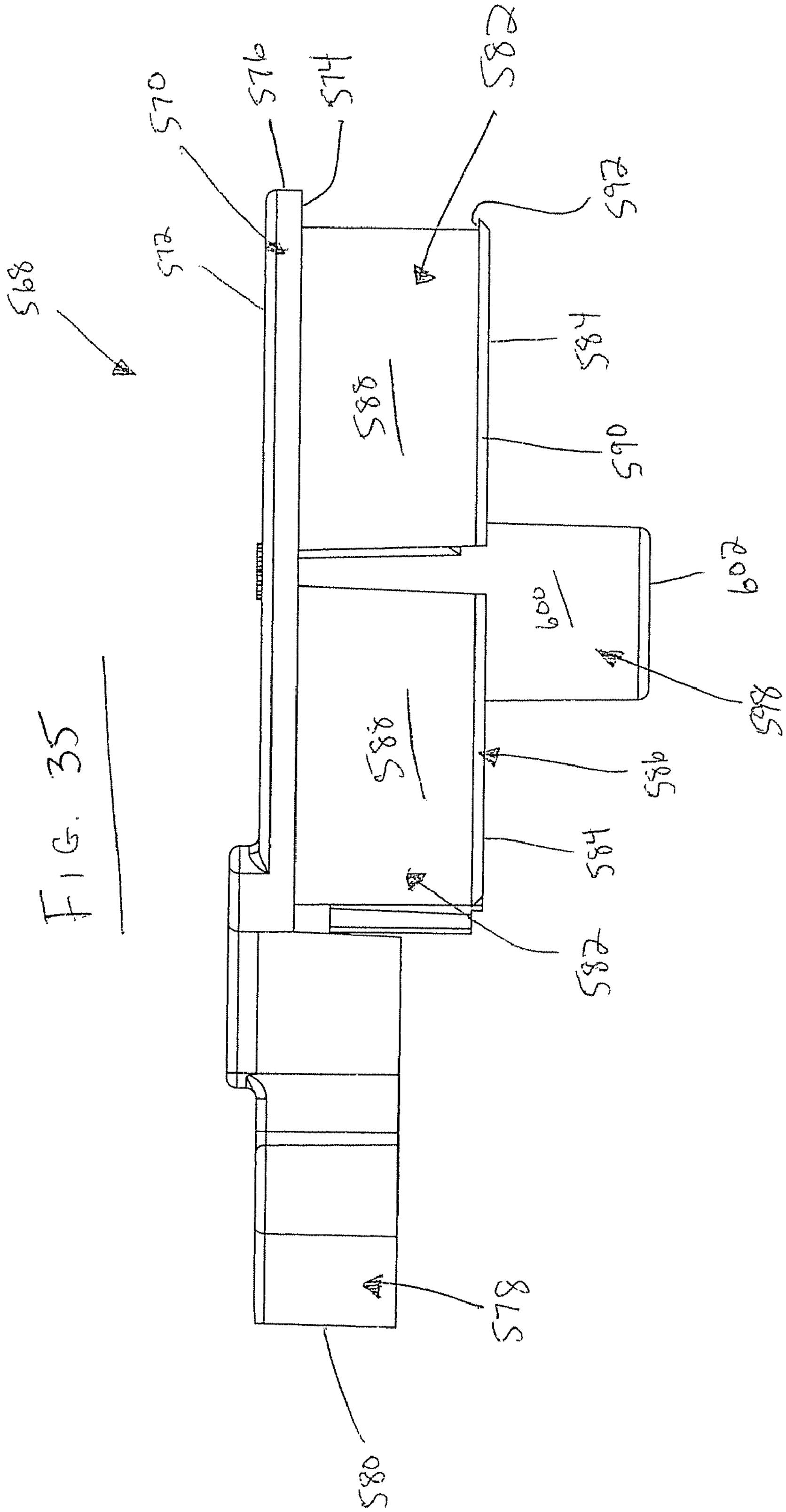
FIG. 35 is a front view of the dial member.
Figure 36:
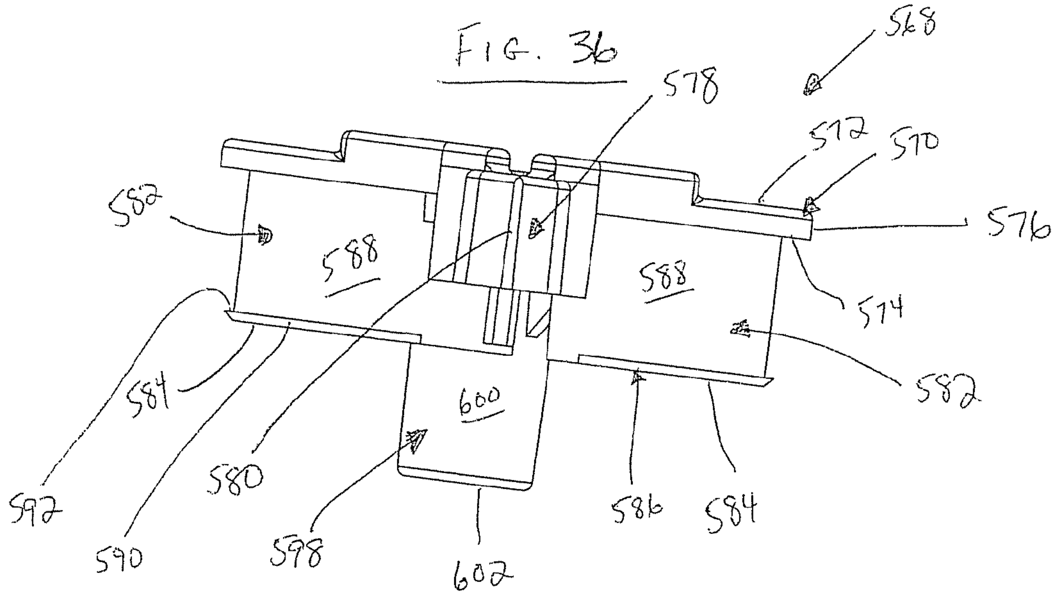
FIG. 36 is a first side view of the dial member.
Figure 37:
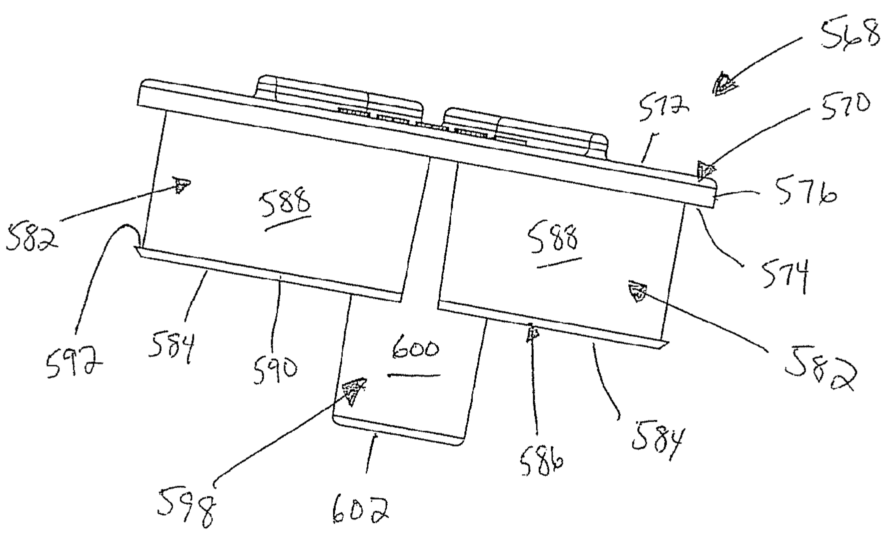
FIG. 37 is a second side view of the dial member.
Figure 38:
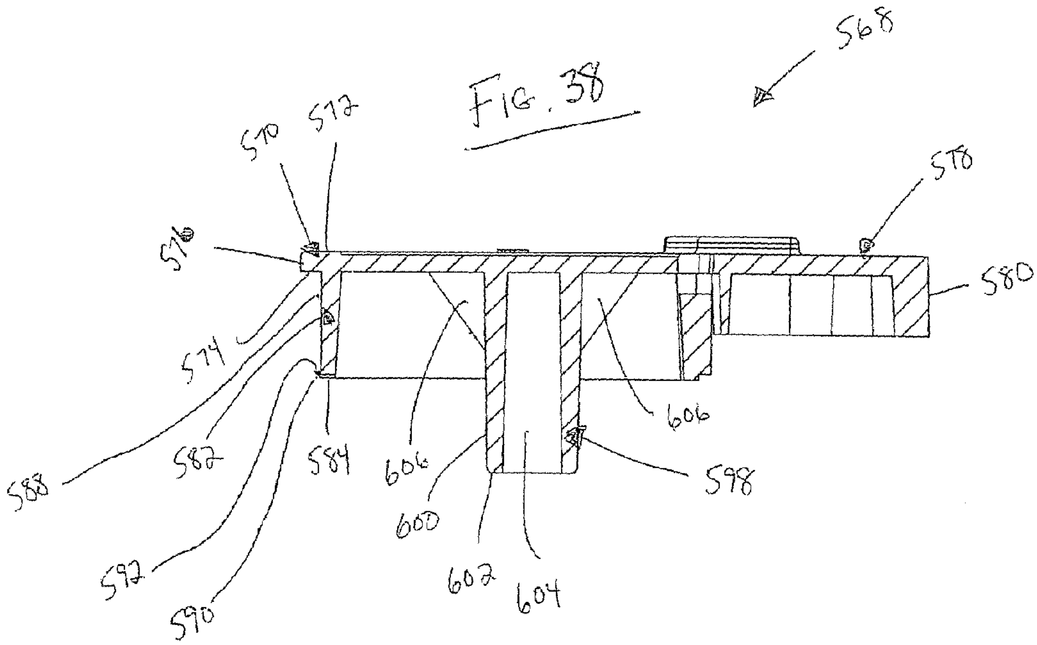
FIG. 38 is a cross-sectional view of the dial member taken along line 38-38 of FIG. 33.
Figure 39:
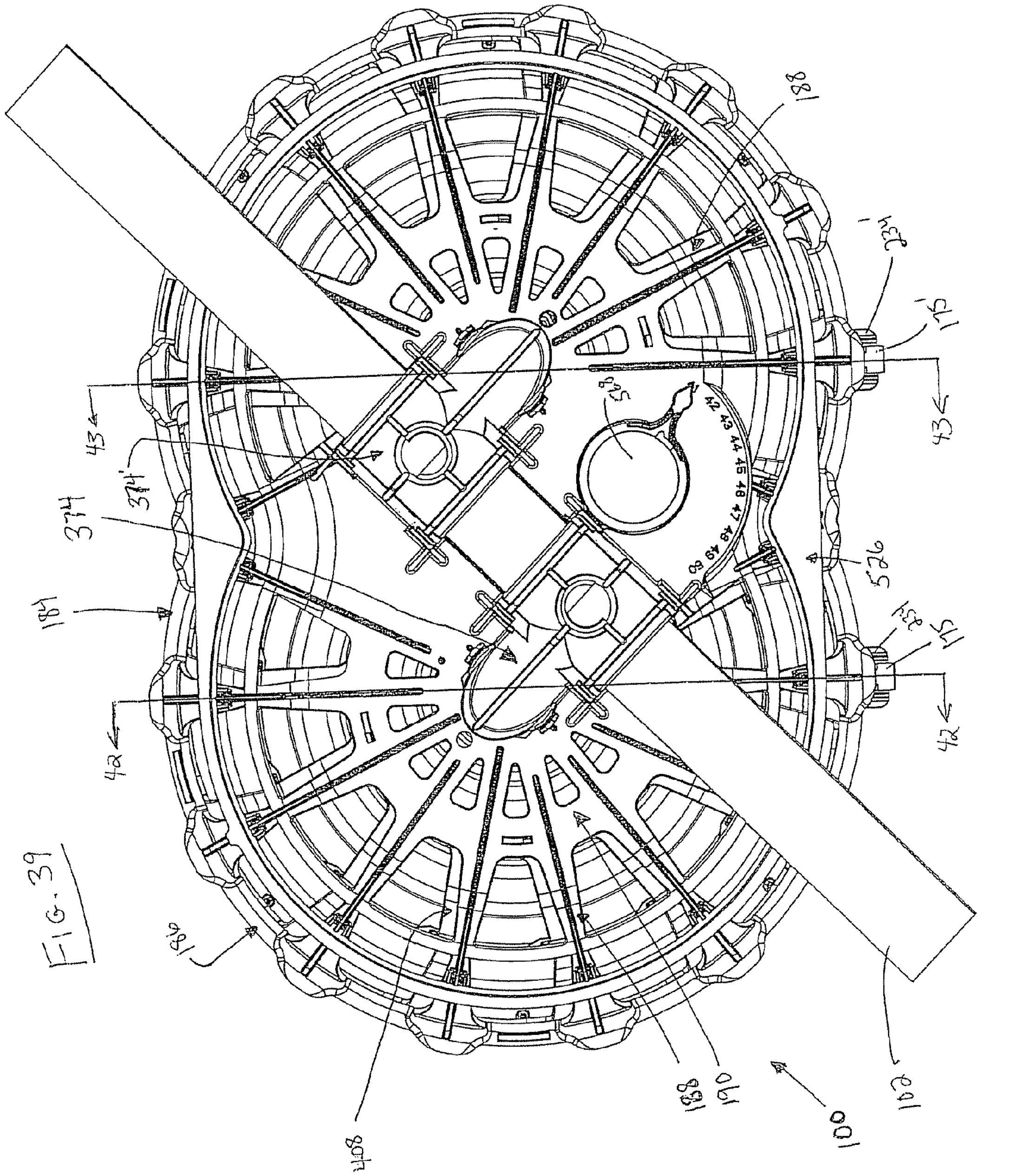
FIG. 39 is a top view of the first embodiment of the feeder assembly connected to the feed supply conduit.
Figure 4D:
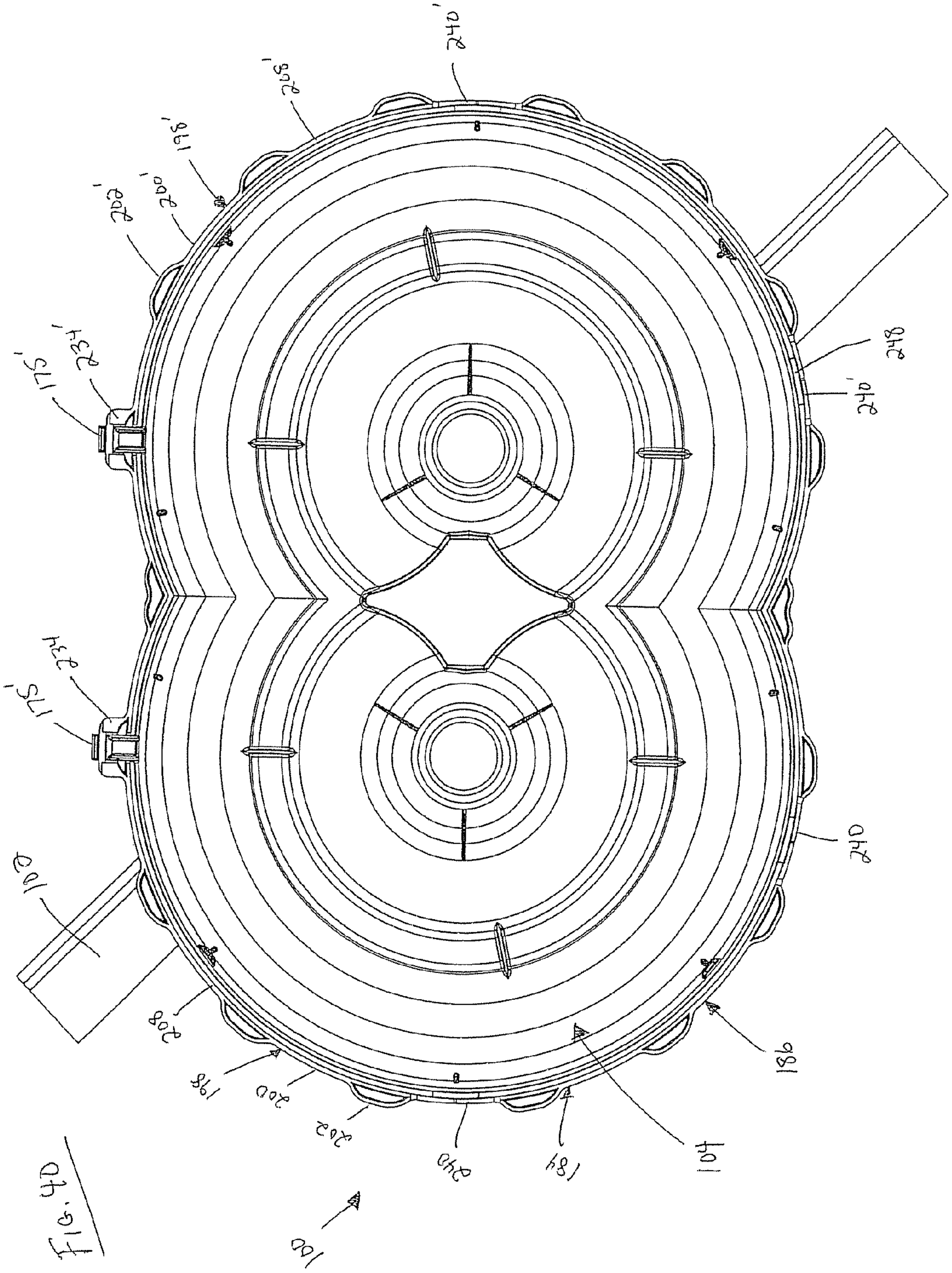
Figure 41:
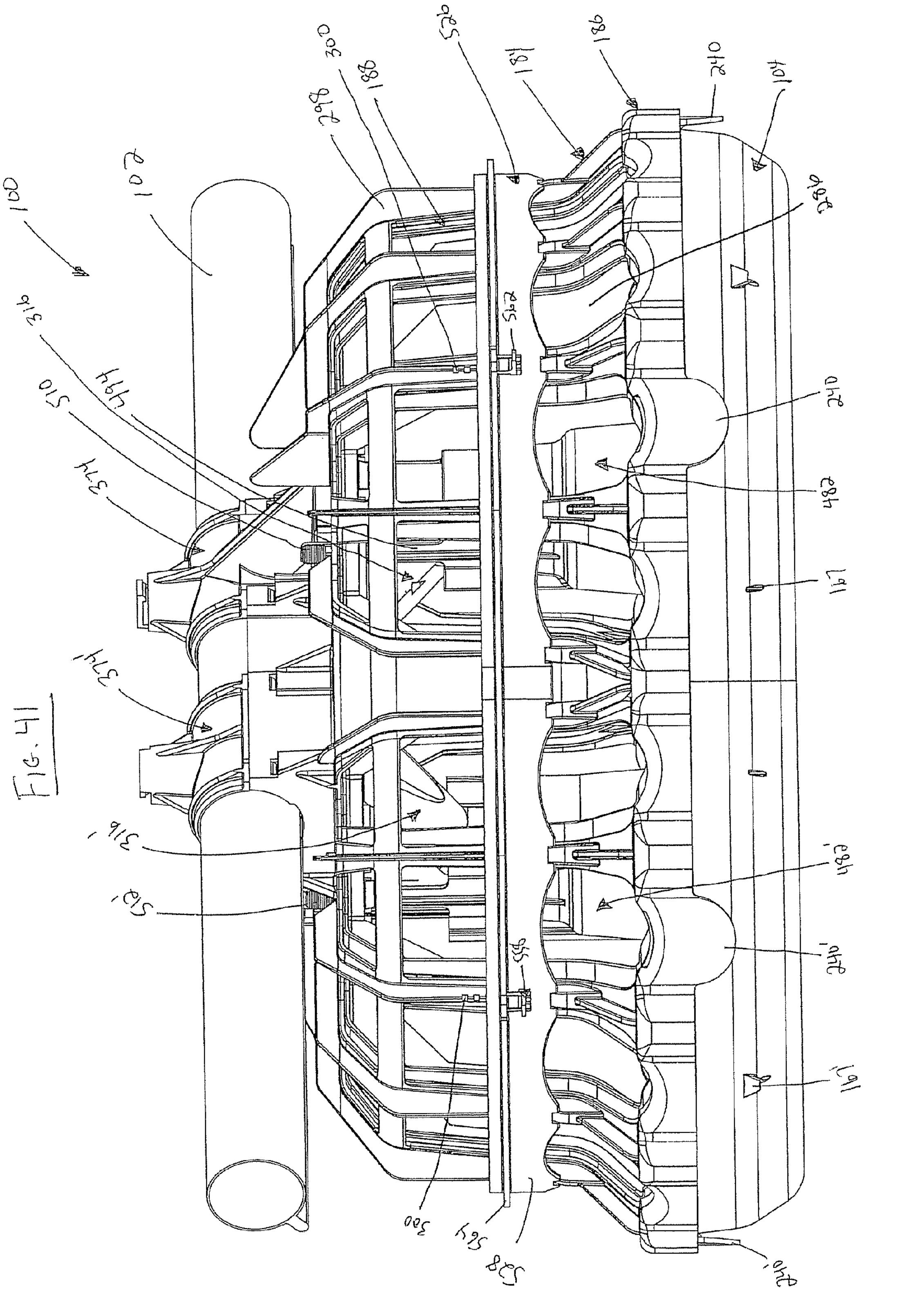
FIG. 41 is a side view of the first embodiment of the feeder assembly connected to the feed supply conduit.
Figure 42:
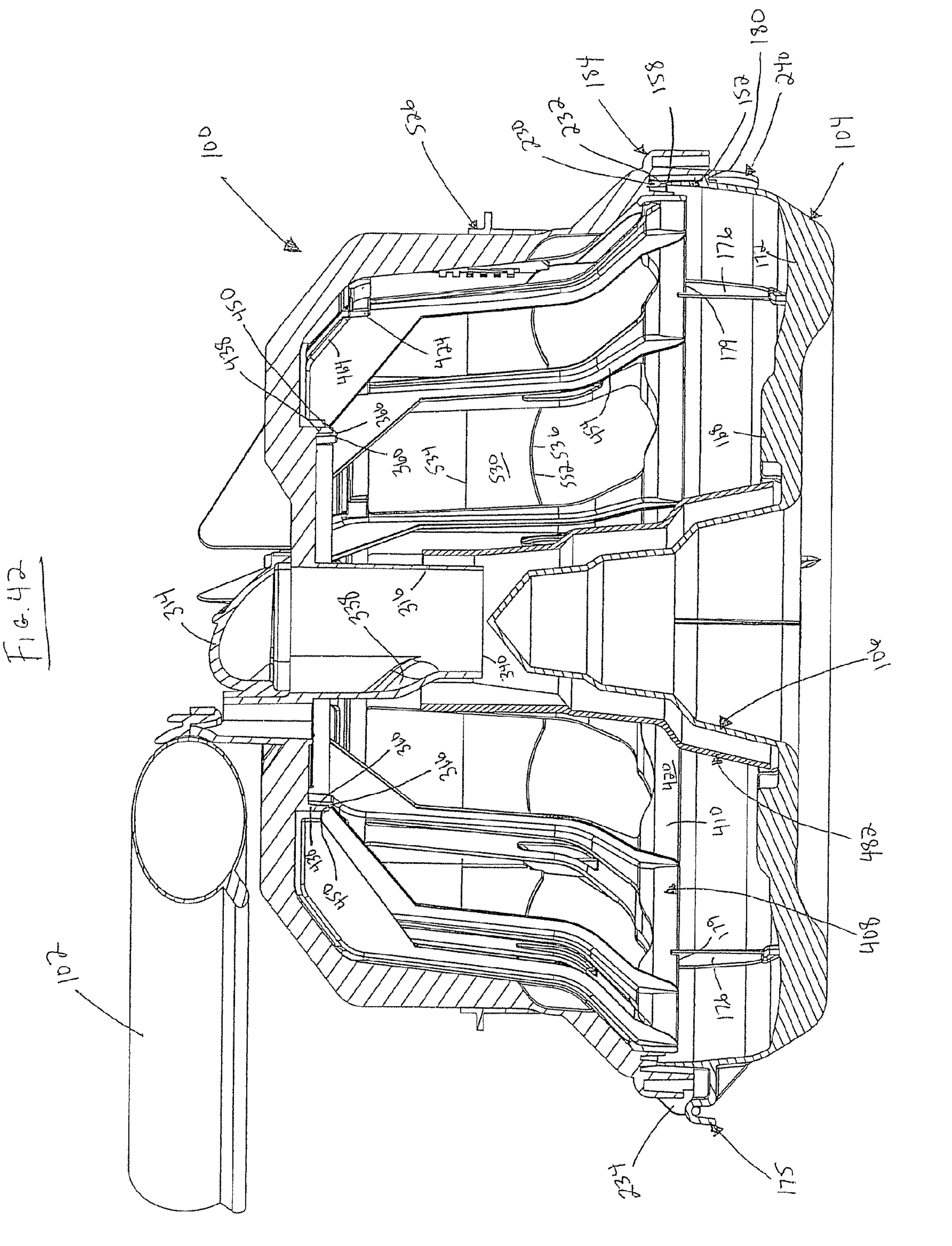
FIG. 42 is a cross-sectional view of the first embodiment of the feeder assembly taken along line 42-42 of FIG. 39.
Figure 43:
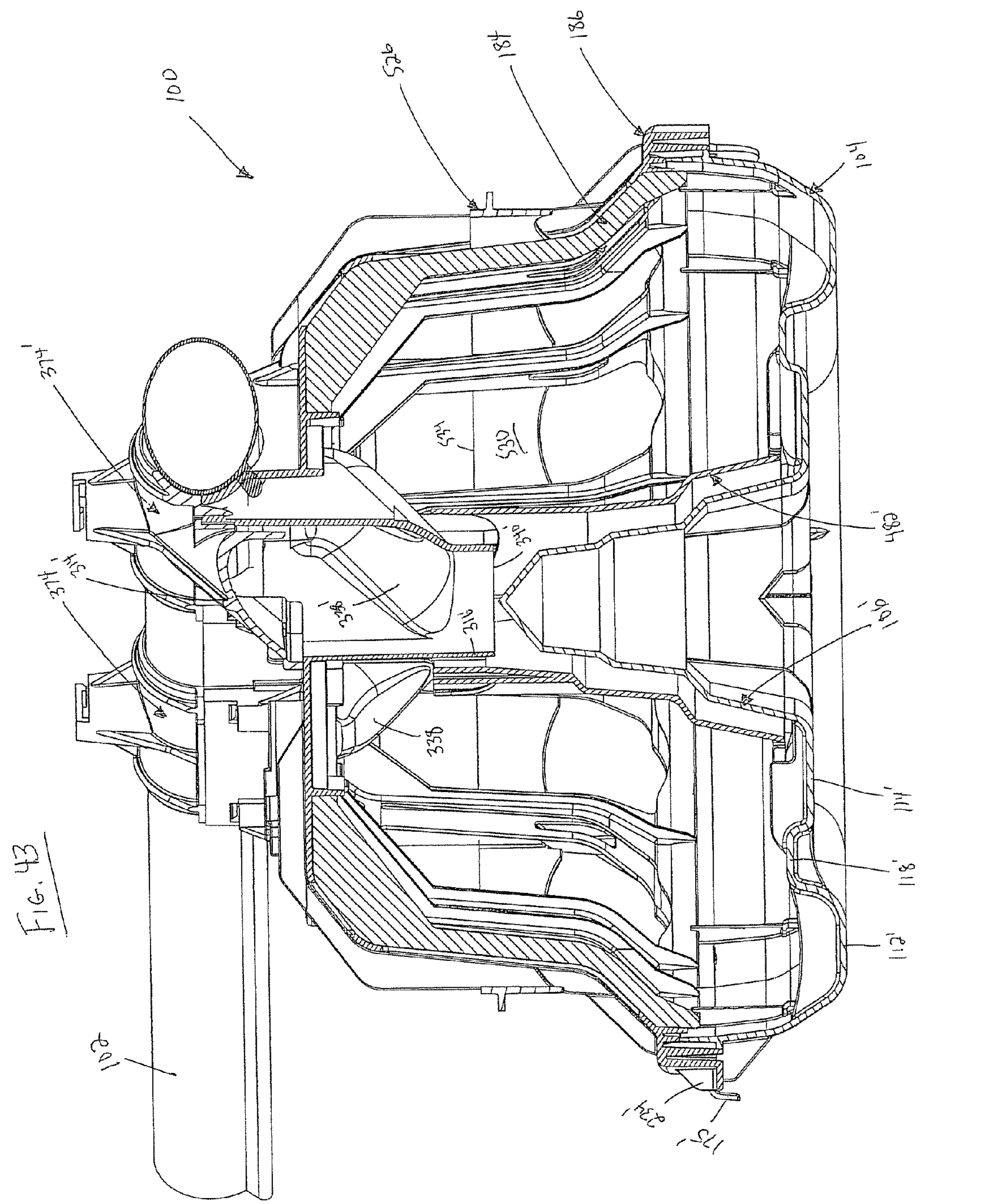
FIG. 43 is a cross-sectional view of the first embodiment of the feeder assembly taken along line 43-43 of FIG. 39.

Likewise, if the pan member 104 is altered as illustrated in FIG. 1*a* the rim member 186 of the outer grill member 184 would also have to be generally altered to match the shape in which the top edges 158, 158' of the outer rim members 152, 152' of the pan member 104 are formed. As such, the connections described between the first and second portions 192, 192' of the rim member 186 of the outer grill member 184 are generally rounded or curved as illustrated in FIG. 7*a*. Such an intersecting circle configuration of the rim member 186 of the outer grill member 184 as illustrated in FIG. 7*a* provides for all of the same advantages as does the intersecting circle configuration of the rim member 186 of the outer grill member 184 illustrated in FIGS. 7-13.

Double Fill Ports 312, 312'

The feeder assembly 100 is advantageously provided with double fill ports 312, 312', as opposed to a single fill port as has been used in every other feeder assembly of the prior art. For the round/circular prior art feeders, a single fill port was all that was needed to provide a consistent amount of feed across the feeding surface of the pan. Where the shape and configuration of the feeder assemblies is generally elongated (length greater than width), however, a single fill port does not adequately provide a consistent amount of feed across the feeding surface of the pan. Those portions of the pan which are provided at a further distance from the fill port will not receive as much feed, or receive feed on a consistent basis, as will those portions of the pan which are provided at a closer distance from the fill port. As noted in the Background, the Kixoo® Feeder, which is an elongated feeder, has encountered such problems in the field as it has only a single fill port.

The double fill ports 312, 312' of the feeder assembly 100 overcome the problems of providing adequate and consistent feed across the feeding surface of the pan member 104. The first double fill port 312 provides adequate and consistent feed across the first base portion 112 of the pan member 104, much like a single fill port of a round/circular feeder would provide adequate and consistent feed across the feeding surface of the pan, and the second double fill port 312' provides adequate and consistent feed across the second base portion 112' of the pan member 104, also much like a single fill port of a round/circular feeder would provide adequate and consistent feed across the feeding surface of the pan.

The double fill ports 312, 312' are also advantageously configured such that the second bottom openings 340, 340' of the fill ports 312, 312', through which feed is delivered onto the pan member 104, are positioned generally directly over the first and second upstanding cone portions 106, 106' of the pan member 104 such that the feed can flow around the conical/cylindrical portions of the first and second upstanding cone portions 106, 106' in an even and consistent manner.

The double fill ports 312, 312' are also advantageously configured such that the first top openings 328, 328' of the fill ports 312, 312', through which feed is received from the feed supply conduit 102, are not positioned generally directly over the second bottom openings 328, 328', but rather are offset therefrom, such that each of the first and second fill ports 312, 312' can receive feed from a single feed supply conduit 102, as opposed to two side by side feed supply conduits.

The double fill ports 312, 312' are also advantageously configured to be set at an angle, preferably forty-five degrees, relative to a longitudinal length of the feeder assembly 100. By the double fill ports 312, 312' being set at an angle, the feeder assemblies 100 provided along the length of the feed supply conduit 102 are also set at an angle, preferably forty-five degrees, relative to the feed supply conduit 102. By being set at such an angle, the feeder assemblies 100 are distanced from one another to provide appropriate space therebetween for birds to feed from adjacent feeder assemblies 100, but also do not take up as much of the valuable floor space of the poultry house as if the feeder assemblies 100 were set up with the longitudinal lengths of the feeder assemblies 100 not being at an angle relative to the feed supply conduit 102, or were set up with the longitudinal lengths of the feeder assemblies 100 being at a ninety (90) degree angle relative to the feed supply conduit 102. It should be noted, however, that if desired, the double fill ports 312, 312' could alternatively be configured such that the feeder assemblies 100 were set up with the longitudinal lengths of the feeder assemblies 100 not being at an angle relative to the feed supply conduit 102.

Capability of Effectively Changing a Width of the Apertures 286 through which Birds Eat Feed Presented on the Pan Member 104

Birds access and eat the feed presented on the pan member 104 by inserting their heads through the apertures 286 provided through the outer grill member 184. In many instances it is desired to have the apertures 286 provided at a width such that only certain birds within a poultry house, e.g., hens, can directly access the feed and such that other certain birds within the poultry house, e.g., roosters, cannot directly access the feed. This is because it may be important to feed the roosters different amounts and/or types of feed than the hens. As the roosters are typically larger than the hens, or at a minimum have larger heads than the hens, the feeder assembly 100 can be configured such that the width of the apertures 286 can effectively be changed to ensure that the hens within the poultry house can directly access the feed through the apertures 286 and to ensure that the roosters within the poultry house cannot directly access the feed through the apertures 286.

The effective changing of the width of the apertures 286 is performed by the rotational movement of the inner grill members 408, 408' relative to the outer grill member 184. The inner grill members 408, 408' may be moved rotationally left or right relative to the outer grill member 184 and held in position by the interlocking of the fingers 474, 474'. By rotating the inner grill members 408, 408' relative to the outer grill member 184, the spoke members 454, 454' may either be aligned with the spoke members 256 of the outer grill member 184, such that the width of the apertures 286 is unchanged, or the spoke members 454, 454' may be misaligned with the spoke members 256 of the outer grill member 184 such that the spoke members 454, 454' are masking a portion of the apertures 286, thus effectively changing the width of the apertures 286.

The inner grill members 408, 408' can be rotated relative to the outer grill member 184 by rotating the dial member 568 such that the alignment member 578 is aligned with different indicators 348 on the exterior surface 304 of the top member 190 of the outer grill member 184. Rotation of the dial member 568 causes the cam post member 598 to rotate. Rotation of the cam post member 598 causes the cam post member 598 to cam against the inner grill member 408 causing the inner grill member 408 to rotate. Rotation of the inner grill member 408 causes the inner grill member 408' to rotate in the opposite direction because of the meshing of the fingers 474, 474'.

The dial member 598 may be rotated such that the alignment member 578 is aligned between the ten (10) indicators 348 to effectively provide ten (10) different widths of the apertures 286 through which the birds can access feed on the pan member 104. When the desired width is selected, i.e., at the desired indicator 348, the dial member 598 is released.

Figure 47A:
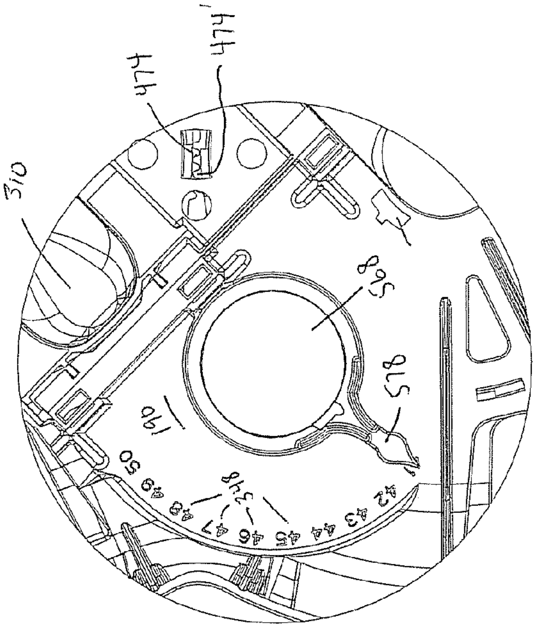
FIG. 47*a* illustrates a positioning of the dial member relative to the outer grill member to provide the smallest width of the apertures through which the poultry eat feed from the feeder assembly of the first embodiment.
Figure 47B:
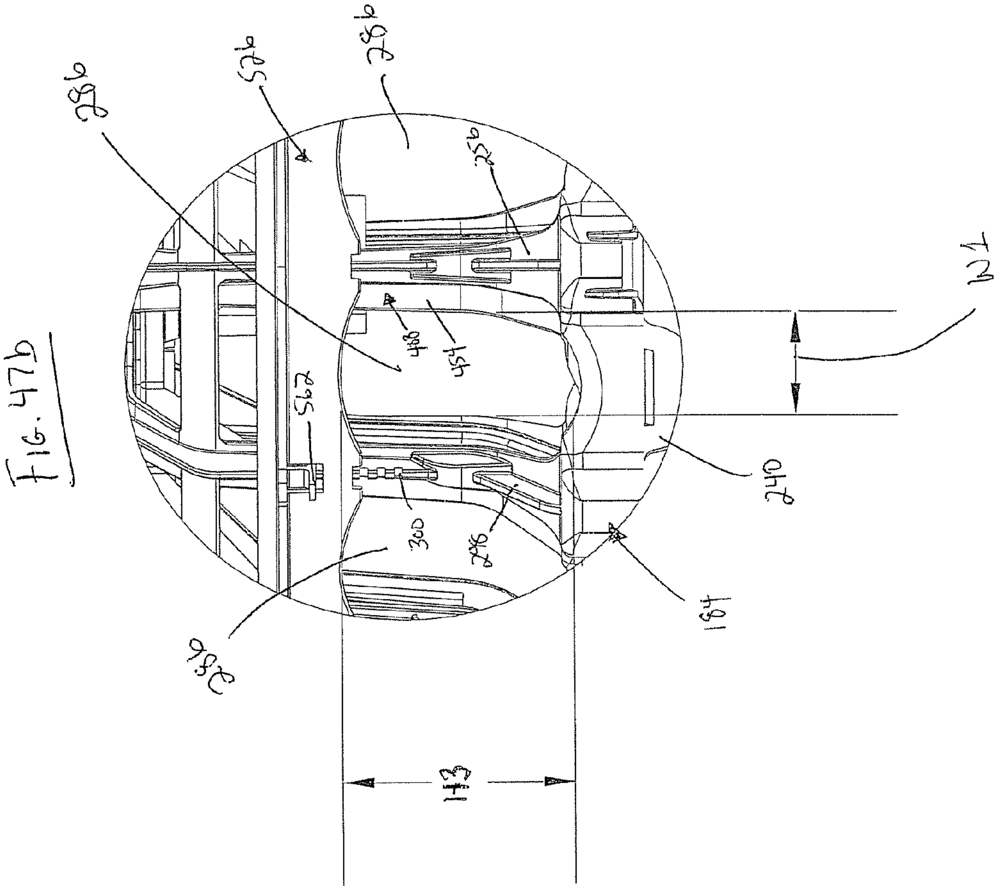
FIG. 47*b* illustrates the smallest width of the apertures through which the poultry eat feed from the feeder assembly and the largest height of the apertures through which the poultry eat feed from the feeder assembly of the first embodiment.
Figure 48A:
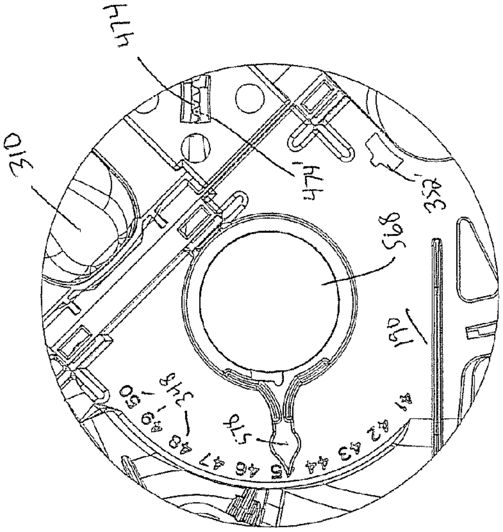
FIG. 48*a* illustrates a positioning of the dial member relative to the outer grill member to provide a middle range width of the apertures through which the poultry eat feed from the feeder assembly of the first embodiment.
Figure 48B:
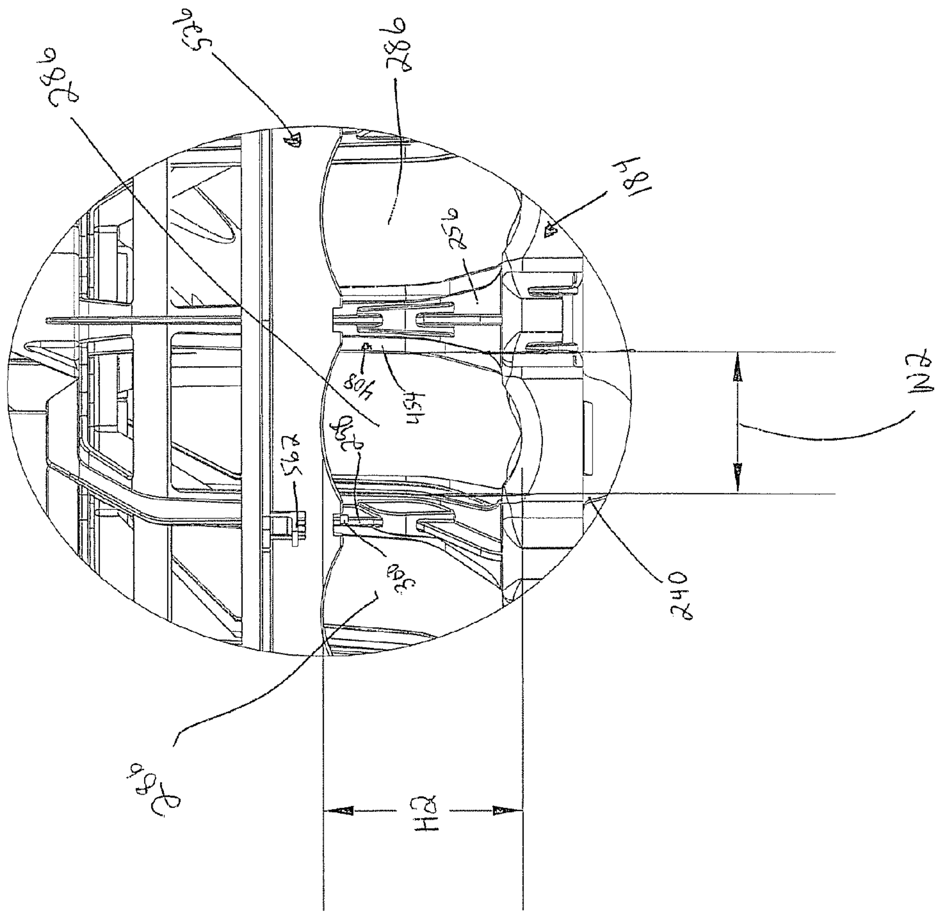
FIG. 48*b* illustrates the middle range width of the apertures through which the poultry eat feed from the feeder assembly and the middle range height of the apertures through which the poultry eat feed from the feeder assembly of the first embodiment.
Figure 49A:
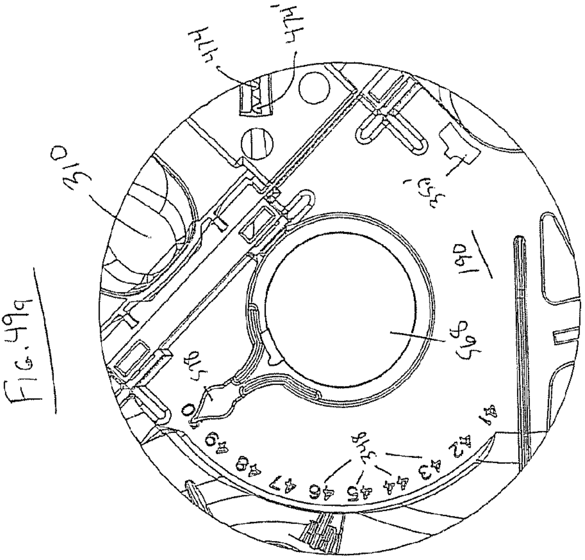
FIG. 49*a* illustrates a positioning of the dial member relative to the outer grill member to provide the largest width of the apertures through which the poultry eat feed from the feeder assembly of the first embodiment.
Figure 49B:
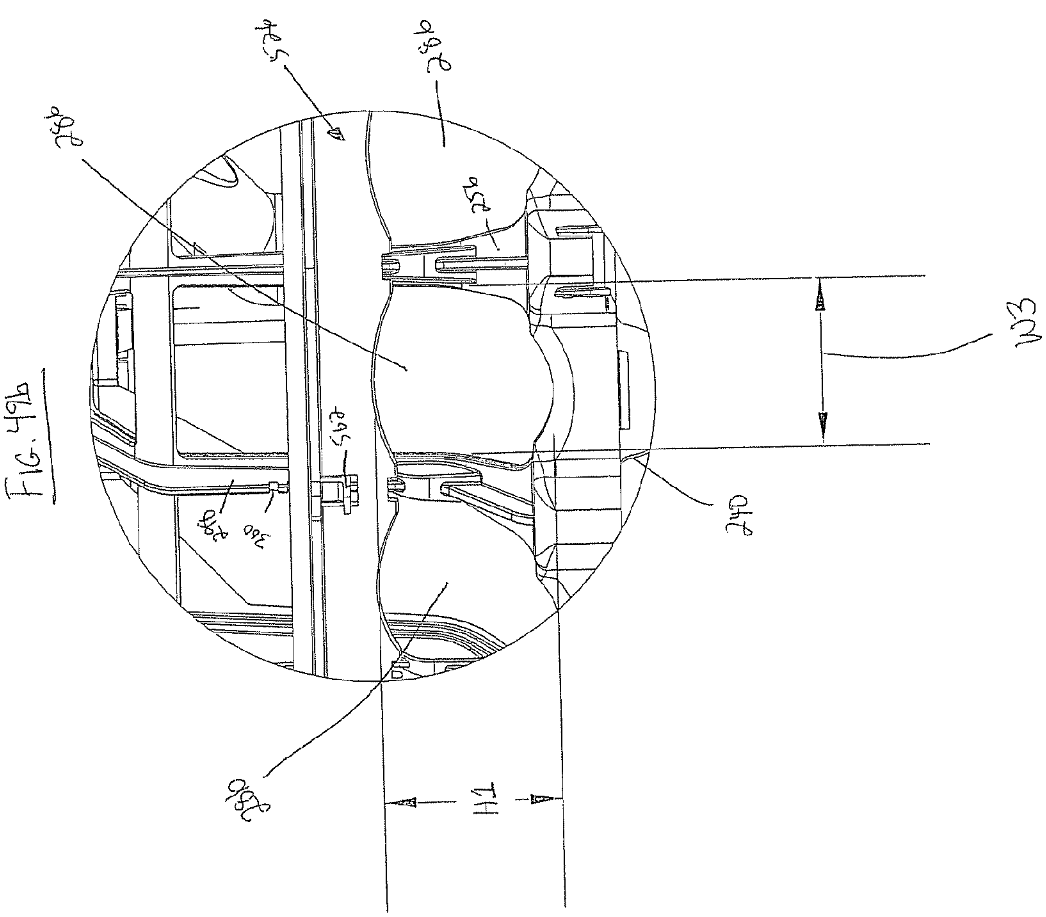
FIG. 49*b* illustrates the largest width of the apertures through which the poultry eat feed from the feeder assembly and the smallest height of the apertures through which the poultry eat feed from the feeder assembly of the first embodiment.
Figure 50:
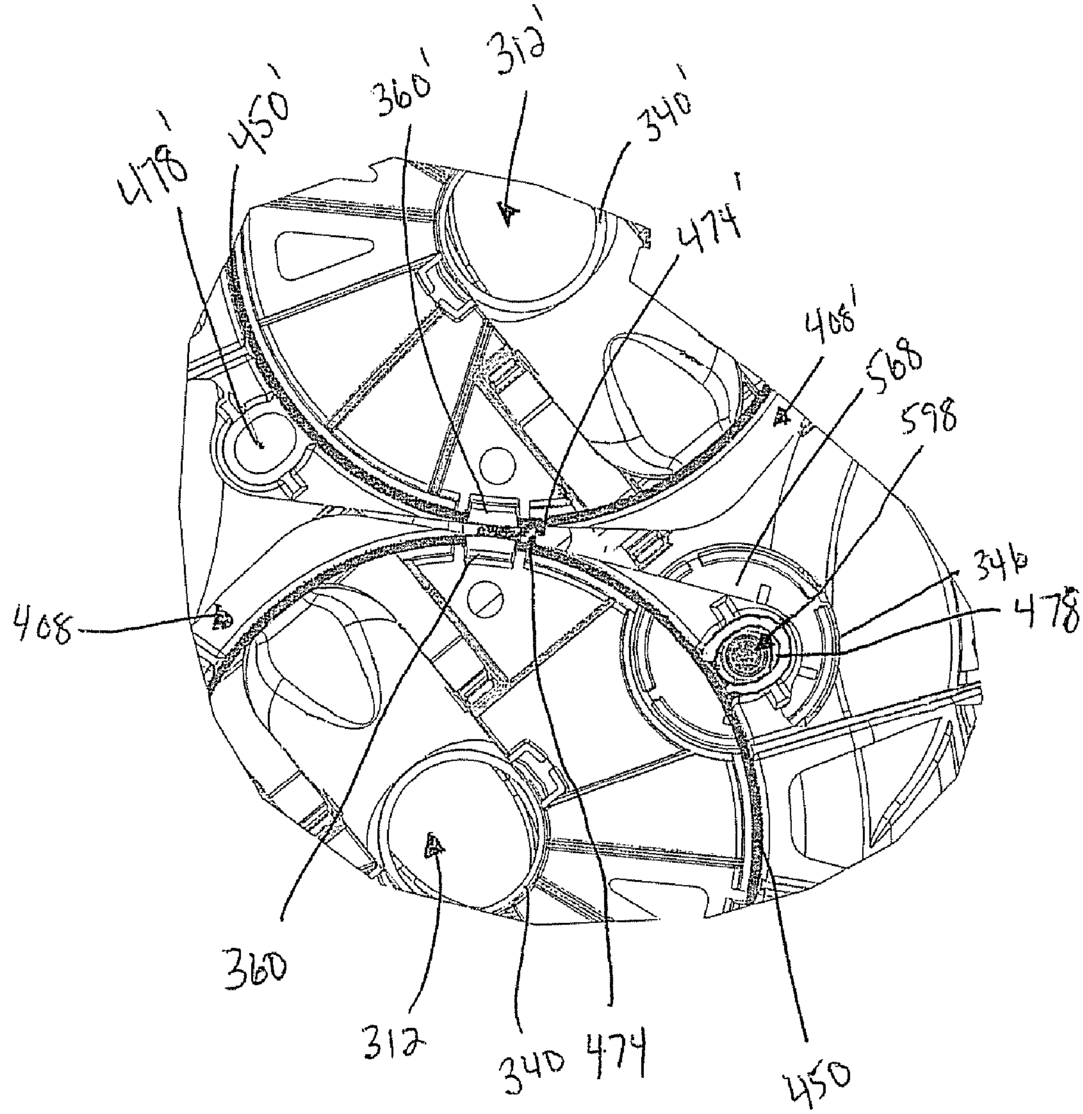
FIG. 50 illustrates a partial view of the first embodiment of the feeder assembly showing the engagement of the fingers of the inner grill members and the engagement of the cam post member of the dial member with one of the inner grill members.
Figure 53:
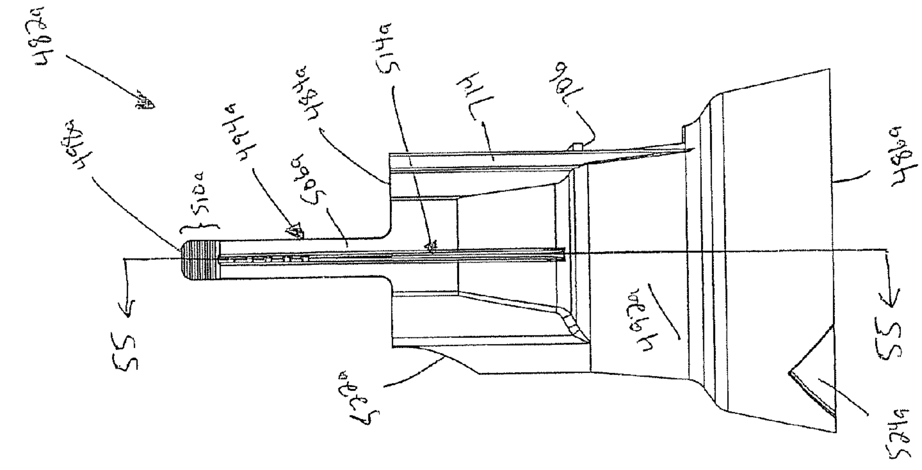
FIG. 53 is a side view of the drop tube member.
Figure 52:
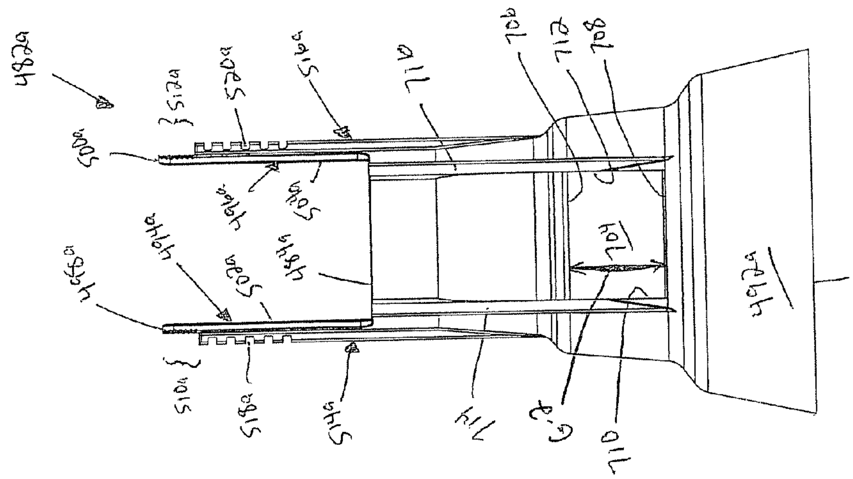
FIG. 52 is a front side view of the drop tube member.
Figure 51:
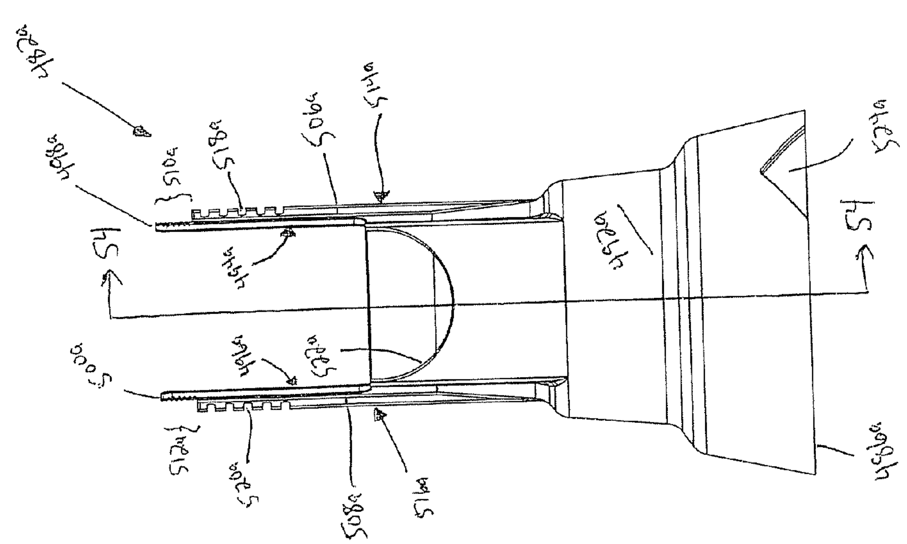
FIG. 51 is a back side view of a drop tube member which incorporates features of the second embodiment of the feeder assembly.
Figure 54:
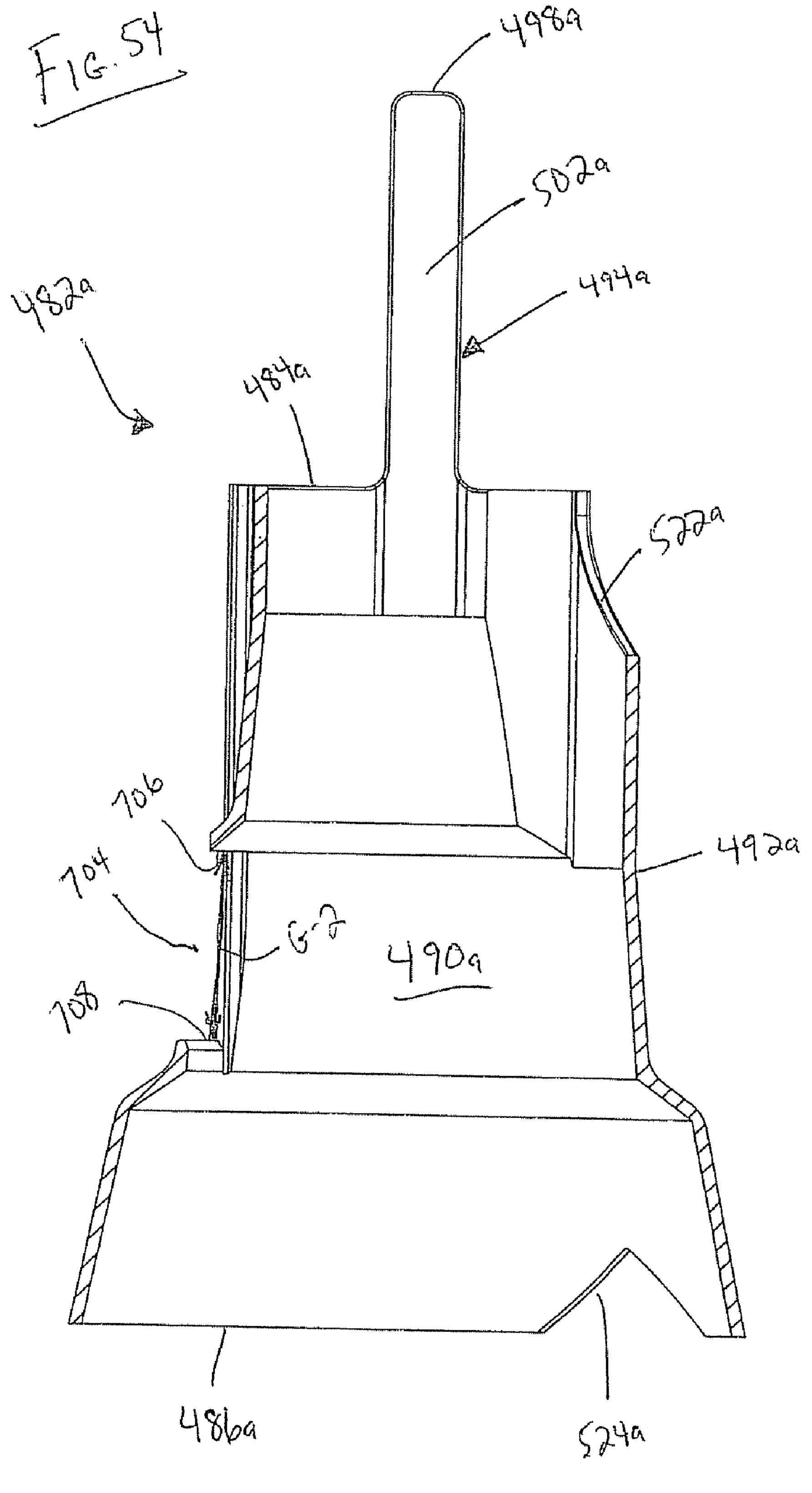
FIG. 54 is a cross-sectional view of the drop tube member taken along line 54-54 of FIG. 51.
Figure 55:
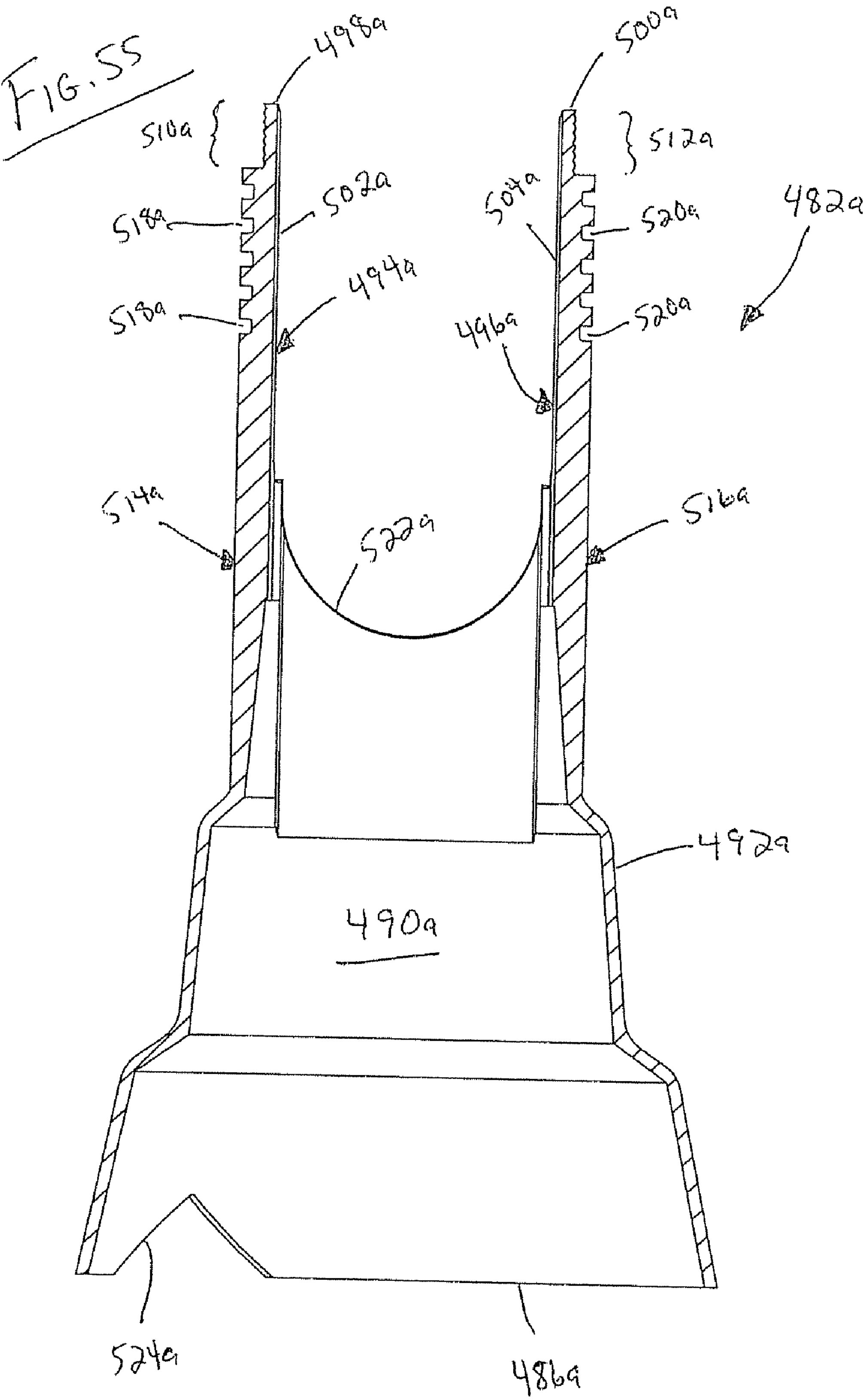
FIG. 55 is a cross-sectional view of the drop tube member taken along line 55-55 of FIG. 53.
Figure 56:
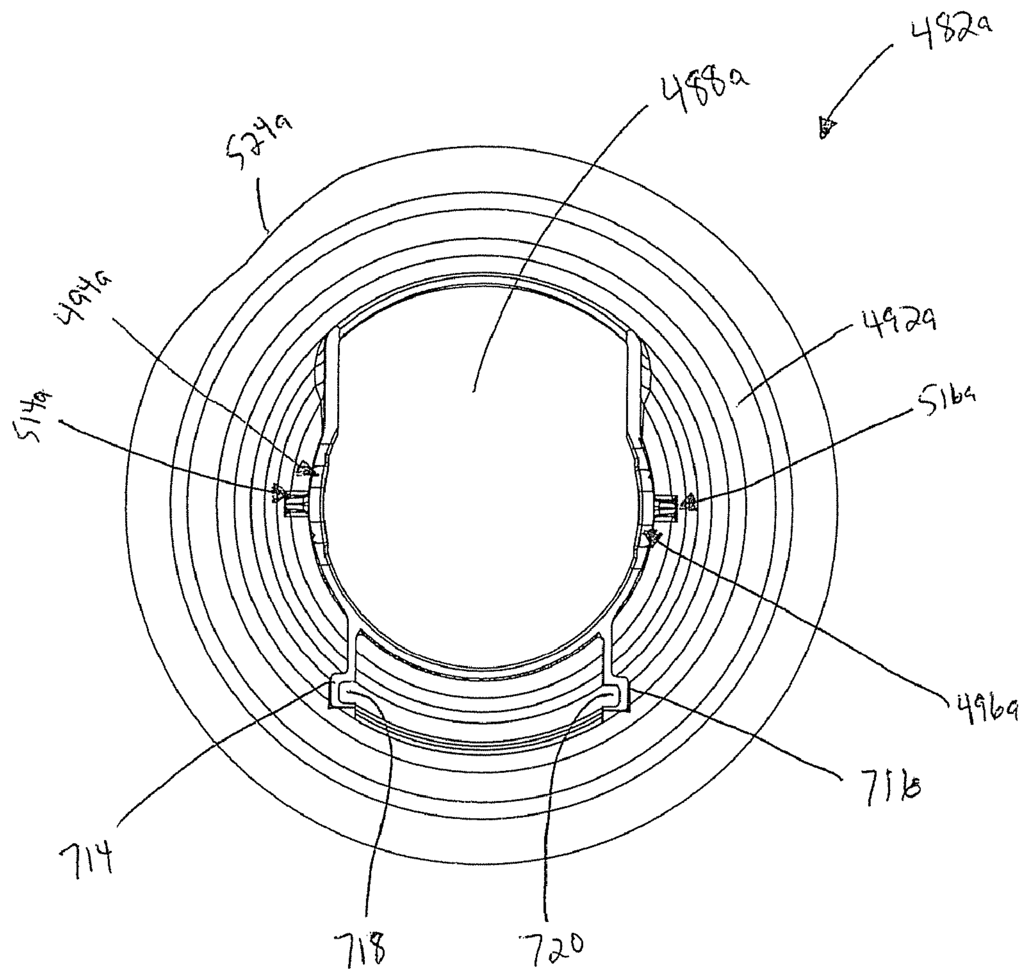
FIG. 56 is a top view of the drop tube member.
Figure 59:
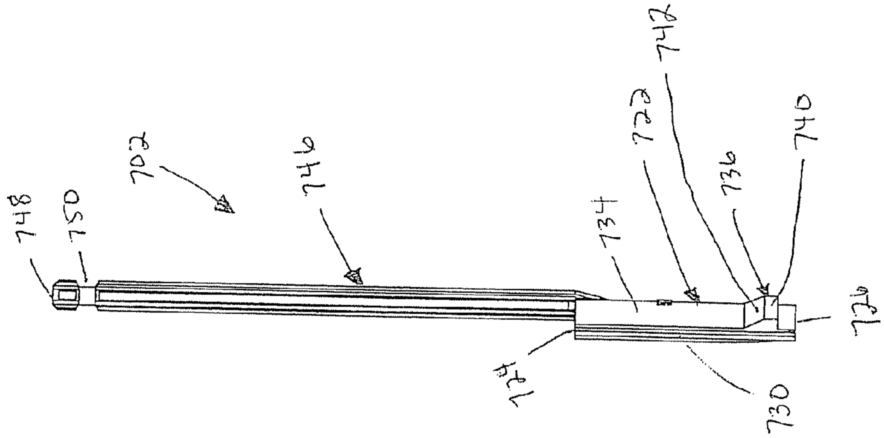
FIG. 59 is an opposite side view of the brood gate blocker.
Figure 58:
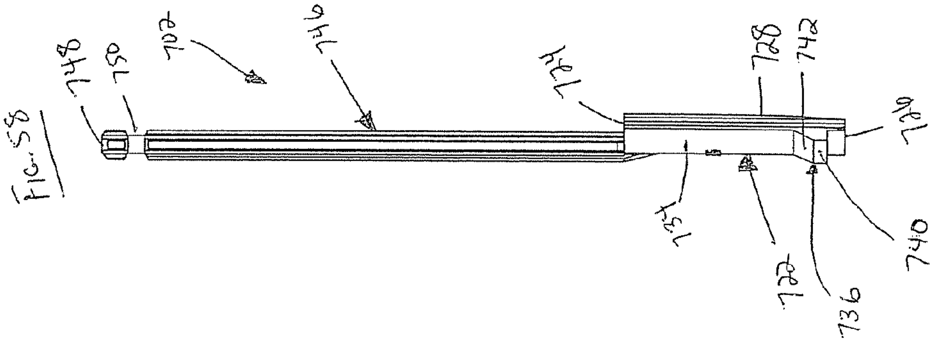
FIG. 58 is a side view of the brood gate blocker.
Figure 57:
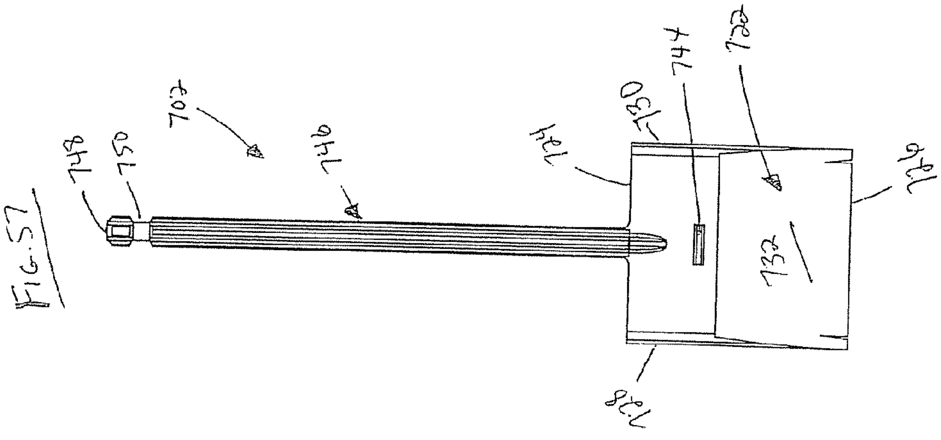
FIG. 57 is a front view of a brood gate blocker which incorporates features of the second embodiment of the feeder assembly.
Figure 61:
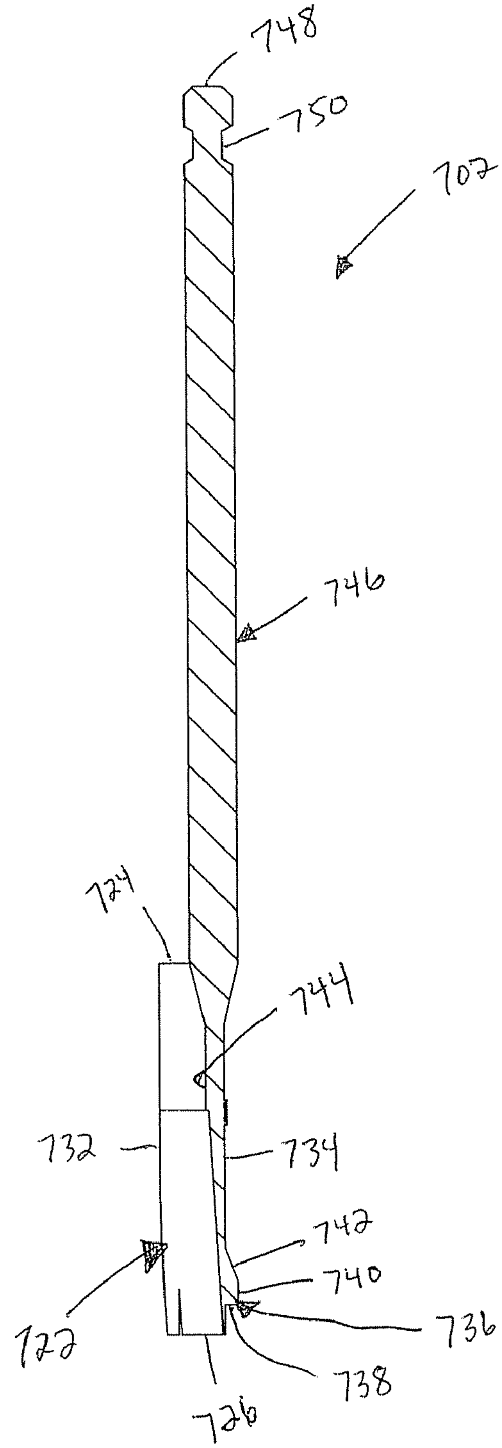
FIG. 61 is a cross-sectional view of the brood gate blocker.

In a preferred embodiment, a largest width W3 of the apertures 286 is fifty (50) millimeters, as illustrated in FIGS. 49*a* and 49*b*, and a smallest width W1 of the apertures 286 is forty-one (41) millimeters, as illustrated in FIGS. 47*a* and 47*b*. FIGS. 48*a* and 48*b* illustrate a middle range width W2 of the apertures 286 at forty-five (45) millimeters.

Capability of Effectively Changing a Height of the Apertures 286 through which Birds Eat Feed Presented on the Pan Member 104

Birds access and eat the feed presented on the pan member 104 by inserting their heads through the apertures 286 provided through the outer grill member 184. In many instances it is desired to have the apertures 286 provided at a height such that only certain birds within a poultry house, e.g., hens, can directly access the feed and such that other certain birds within the poultry house, e.g., roosters, cannot directly access the feed. This is because it may be important to feed the roosters different amounts and/or types of feed than the hens. As the roosters are typically larger than the hens, or at a minimum have larger heads than the hens, the feeder assembly 100 can be configured such that the height of the apertures 286 can effectively be changed to ensure that the hens within the poultry house can directly access the feed through the apertures 286 and to ensure that the roosters within the poultry house cannot directly access the feed through the apertures 286.

The effective changing of the height of the apertures 286 is performed by the vertical movement of the outer ring member 526 relative to the outer grill member 184. The outer ring member 256 may be moved upwardly or downwardly on the reinforcing members 298 of the outer grill member 184 and secured in position by securing the inner tab portions 560 of the tab members 558 within the appropriate notches 300 defined in the reinforcing members 298. The fourth edge portion 552 of the upstanding member 528 of the outer ring member 526 is curved to provide more room for the hens to access the feed through the apertures 286. By moving the outer ring member 526 downwardly toward the rim member 186 of the outer grill member 184, the outer ring member 526 is masking a portion of the apertures 286, thus effectively changing the height of the apertures 286.

The outer ring member 526 can be moved by pushing down on the outer tab portions 562 of the tab members 558 such that the inner tab portions 560 are not positioned in securement within the notches 300 of the reinforcing members 298. The outer ring member 526 may then be moved upwardly or downwardly between the six (6) notches 300 to effectively provide six (6) different heights of the apertures 286 through which the birds can access feed on the pan member 104. When the desired height is selected, i.e., at the desired notch 300, the outer tab portion 562 is released such that the inner tab portion 560 will be positioned in securement within the appropriate notch 300.

In a preferred embodiment, a largest height H3 of the apertures 286 is three (3) inches (77 millimeters), as illustrated in FIGS. 47*a* and 47*b*, and a smallest height H1 of the apertures 286 is two and a quarter (2.25) inches (57 millimeters), as illustrated in FIGS. 49*a* and 49*b*. FIGS. 48*a* and 48*b* illustrate a middle range height H2 of the apertures 286 at two and one-half (2.5) inches.

Adjustable First and Second Lower Feed Gates G-1, G-1'

Figure 44:
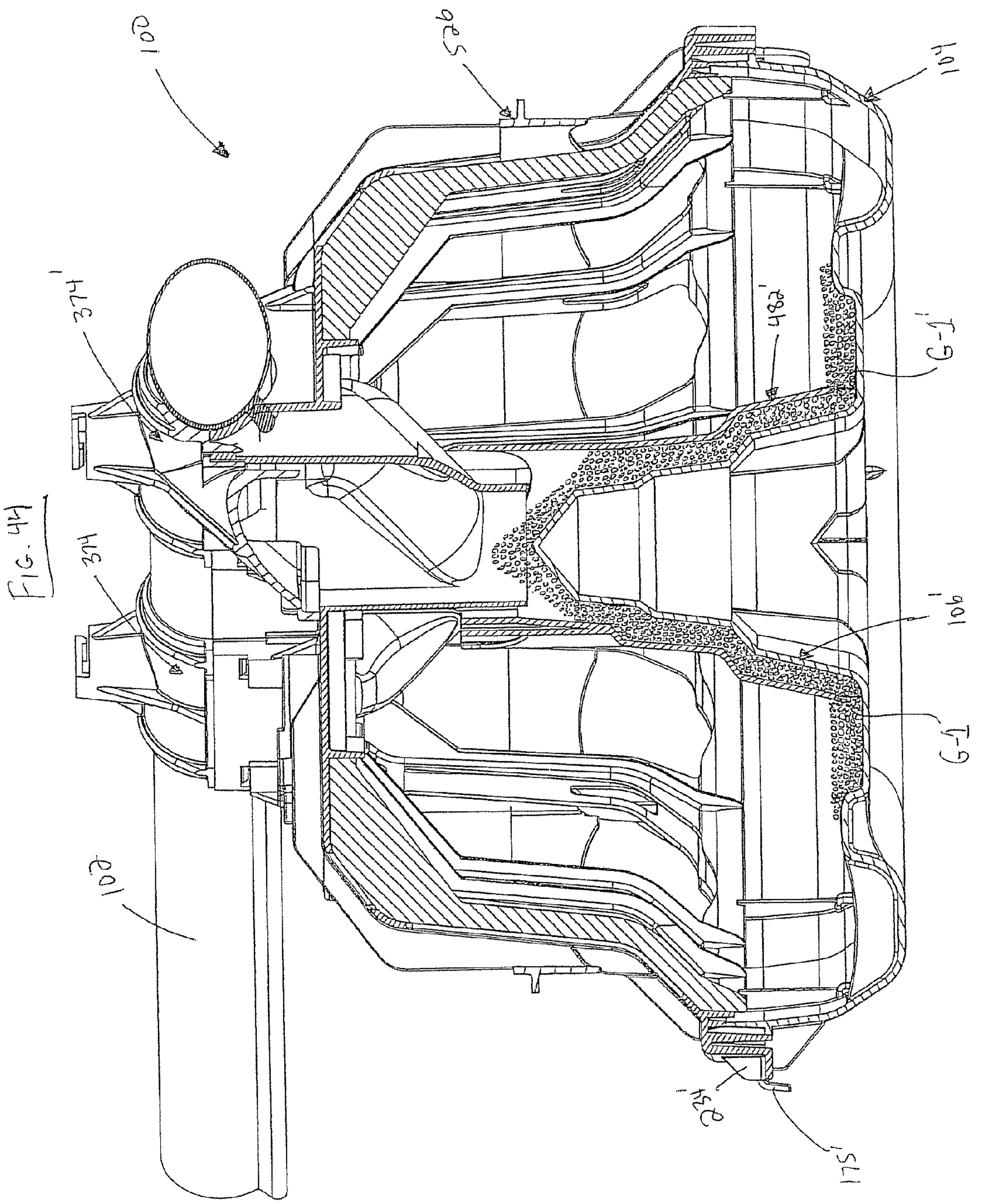
FIG. 44 is identical to FIG. 43, but shows feed flowing through the lower feed gate of the feeder assembly.
Figure 45:
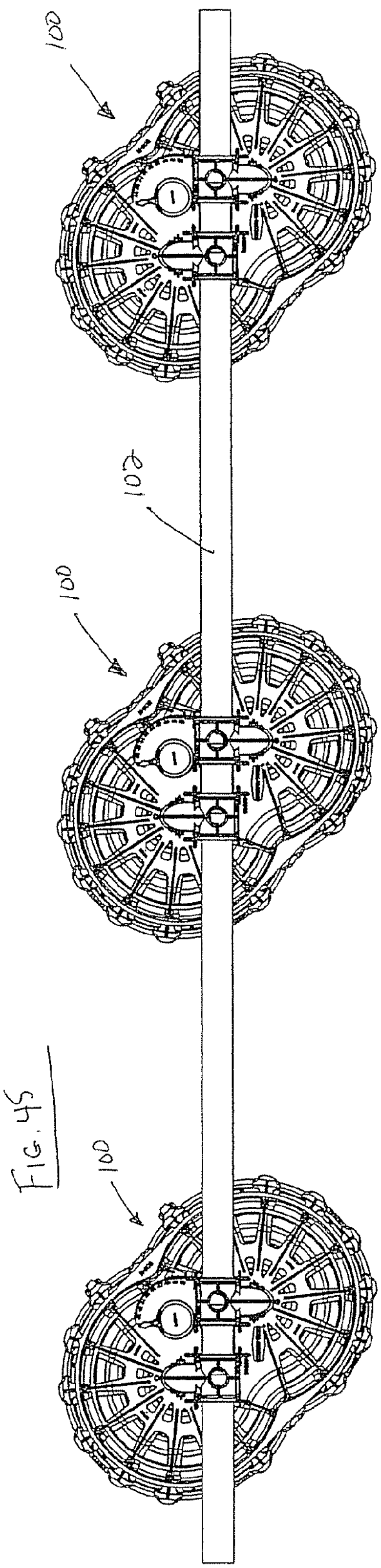
FIG. 45 is a top view of a plurality of adjacent feeder assemblies of the first embodiment connected to the feed supply conduit.
Figure 46:
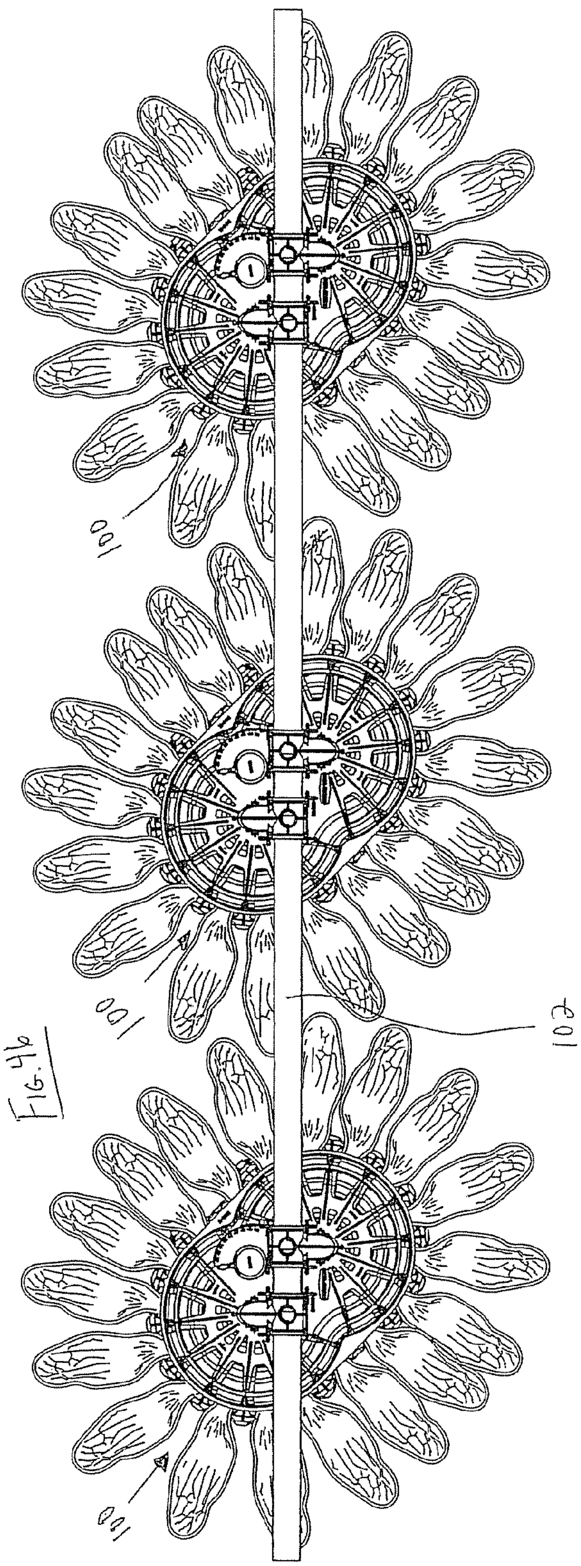
FIG. 46 is identical to FIG. 45, but shows poultry feeding from each of the feeder assemblies.

The heights of the first and second lower feed gates G-1, G-1' can each be independently adjusted, as desired, by the grower. As illustrated in FIG. 44, feed flows through the lower feed gates G-1, G-1' to provide a low level of feed in the feeder assembly 100.

Adjustment of the height of the first lower feed gate G-1 is preferably performed by gripping the serrated portions 510, 512 of the first drop tube member 482 and forcing the serrated portions 510, 512, and thus the first and second extension members 494, 496, toward one another. As such, the top member 190 of the outer grill member 184 is prevented from being positioned in one of each of the notches 518, 520, such that the first drop tube member 482 can be moved upwardly or downwardly as desired. The first drop tube member 482 can be positioned to provide a desired height of the first lower feed gate G-1 by aligning the top portion 190 with the desired notches 518, 520. As the first drop tube member 482 has six (6) separate spaced-apart notches 518, 520, the first lower feed gate G-1 can be adjusted between six (6) separate heights.

Likewise, adjustment of the height of the second lower feed gate G-1' is preferably performed by gripping the serrated portions 510', 512' of the second drop tube member 482' and forcing the serrated portions 510', 512', and thus the first and second extension members 494', 496', toward one another. As such, the top member 190 of the outer grill member 184 is prevented from being positioned in one of the each of the notches 518', 520', such that the second drop tube member 482' can be moved upwardly or downwardly as desired. The second drop tube member 482' can be positioned to provide a desired height of the second lower feed gate G-1' by aligning the top portion 190 with the desired notches 518', 520'. As the second drop tube member 482' has six (6) separate spaced-apart notches 518', 520', the second lower feed gate G-1' can be adjusted between six (6) separate heights.

If desired, the first and second lower feed gates G-1, G-1' may be provided at the same height, or, if desired, the first and second lower feed gates G-1, G-1' may be provided at different heights.

First and Second Upstanding Cone Portions 106, 106'

The first and second upstanding cone portions 106, 106' are configured to extend upwardly within the apertures 488, 488' of the first and second drop tube members 482, 482' in order to force feed flowing into the apertures 488, 488' from the first and second fill ports 312, 312' to flow downwardly and outwardly around the first and second upstanding cone portions 106, 106' and out of the first and second lower feed gates G-1, G-1'. The top ends 108, 108' of the cone portions 106, 106' are preferably pointed and are preferably positioned directly below a middle of the second bottom opening 340, 340' of the first and second fill portions 312, 312' such that feed is generally dispersed evenly about the cone portions 106, 106'.

Inner and Outer Feeding Surfaces 114, 114'; 116, 116'

The inner feeding surfaces 114, 114' are provided as the main eating areas of the feeder assembly 100 as the feed is moved out through the lower feed gates G-1, G-1' and onto the inner feeding surfaces 114, 114'. The fin members 168, 168' help control the feed level and control raking of the feed on the inner feeding surfaces 114, 114'. The inner rim members 118, 118' are raised above the inner feeding surfaces 114, 114' in order to try and keep as much of the feed on the inner feeding surfaces 114, 114' as possible, but is not raised to such a height that the birds have trouble eating the feed presented on the inner feeding surfaces 114, 114'. The outer feeding surfaces 116, 116' are provided to hold any feed that is pulled out of the inner feeding surfaces 114, 114' and over the inner rim members 118, 118', with the birds also able to eat the feed which has been moved to the outer feeding surfaces 116, 116'

Bird Welfare Features of the Feeder Assembly 100

The structure of the feeder assembly 100 also provides for the overall welfare of the birds as they are feeding from the feeder assembly 100 by being configured in such a manner that when the birds feed from the feeder assembly 100, the feeder assembly 100 does not cause as many detrimental physical effects to the birds, thus reducing the stress caused to the birds and, depending on the type of birds feeding from the feeder assembly 100, providing for a reduction of bird condemnation. Detrimental physical effects to the birds' front sides, such as bruising, can potentially cause health problems or stress for the birds and can potentially cause the birds to eat less than the poultry grower would desire as the birds would become uncomfortable resting their front sides or breasts against the pan or grill members. The detrimental physical effects could also cause bird condemnation because after the removal of the birds' feathers, depending on the type of birds feeding from the feeder assembly 100, visual inspection of the birds' front sides can detect the detrimental physical effects thereon and, for instance the effect on the color of the meat which is known to be a healthy color, thus possibly reducing the quality of grade given to the birds. Obviously, the lower quality of grade that is given to the birds, the less commercially valuable the birds become to the poultry grower. The feeder assembly 100 helps to prevent the foregoing by the configuration of the outer grill member 184 on both the rim member 186 and the spoke assembly 188.

The top rim portions 210, 210' and the rounded rim portions 228, 228' of the rim member 186 of the outer grill member 184 help to prevent the detrimental physical effects of the birds' front sides. The top rim portions 210, 210' have the concave surfaces 224, 224' to provide extra room for the birds' front sides to be positioned on or against when the birds eat feed from the pan member 104. The concave surfaces 224, 224' also more closely match the shape of the birds' front sides such that the top rim portions 210, 210' will not be forced against the birds' front sides in such an extreme manner that could potentially cause detrimental physical effects to the birds' front sides when the birds lean in to the feeder assembly 100 to eat the feed on the pan member 104. The rounded rim portions 228, 228' allow for a generally smooth transition from the side rim portions 198, 198' to the top rim portions 210, 210' such that the rim member 186 will not be forced against the birds' front sides in such an extreme manner that could potentially cause detrimental physical effects to the birds' front sides when the birds lean in to the feeder assembly 100 to eat the feed on the pan member 104.

The spoke members 256 help to further prevent detrimental physical effects on the birds' front sides by being set back on the top rim portions 210, 210' and by being configured to extend inwardly from the top rim portions 210, 210'. Such configuration allows the birds to more easily reach the feed within the pan member 104 such that the birds need not force their front sides as hard against the outer grill member 184 in order to reach the feed presented on the pan member 104.

The outer walls 202, 202' of the rim member 186 also provide for comfort of the birds during eating as the outer walls 202, 202', and the spoke members 256 which extend upwardly from the top portions 210, 210' above the outer walls 202, 202', create separate eating compartments for the birds, namely eighteen (18) such eating compartments. The provision of the separate eating compartments allows the birds to eat feed from the pan member 104 without much, if any, contact with the birds eating in adjacent feeding compartments, thus adding to the birds' comfort in feeding from the feeder assembly 100.

Thus, the configuration of the outer grill member 184 helps assist in the overall health and comfort of the birds, as the outer grill member 184 is designed to be comfortable to the birds which leads to the birds staying longer at the feeder assembly 100 and, consequently, eating more feed.

Shallow/Deep Pan Depth

It is an advantage that the feeder assembly 100 has both the capabilities of a shallow pan depth for young birds to have access to the feed in the pan member 104, and a deep pan depth for older birds to feed from the pan member 104.

The shallow and deep pan depths are provided by the rim member 186 of the outer grill member 184 when the feeder assembly 100 is positioned on the feeding surface. The concave surfaces 224, 224' of the top rim portions 210, 210' of the rim member 186 provide for the shallow pan depth. Young birds can see over the concave surfaces 224, 224' to see the feed and be attracted thereto. The young birds can also climb into the pan member 104 at the concave surfaces 224, 224' such that they can eat the feed provided within the pan member 104. The flat surfaces 226, 226' of the top rim portions 210, 210' of the rim member 186 provide for the deep pan depth. The deep pan depth is provided for the feeding of older, larger birds as this depth helps to prevent the larger birds from raking the feed presented in the pan member 104, or building high feed levels within the pan member 104, such that the amount of wasted or contaminated feed is minimized. Thus, the flat surfaces 226, 226' provide such a benefit when the feeder assembly 100 is utilized to feed larger birds.

Thus, feeder assembly 100 provides for the functionality of both a shallow pan depth feeder assembly necessary for younger birds and for a deep pan depth feeder assembly which is desirable for older, larger birds such that the poultry grower need not have two sets of feeder assemblies, one with a shallow pan depth and one with a deep pan depth. The shallow/deep pan depths also require no work of any kind by the poultry grower or vertical movement of the feeder assembly 100 to be effected. The pan depths are naturally provided by use of the feeder assembly 100, with only the size of the bird defining which pan depth the birds utilize. Thus, the top rim portions 210, 210' of the rim member 186 vary in vertical height relative to the first and second base portions 112, 112' of the pan member 104 without the need to adjust any portion of the feeder assembly 100.

Reduction of Birds Raking Feed within the Feeder Assembly 100

The positioning of the fin members 168, 168' which extend upwardly from the inner feeding surfaces 114, 114' of the pan member 104, and the positioning of the fin members 172, 172' which extend upwardly from the outer feeding surfaces 116, 116' of the pan member 104, as well as the provision of the inner rim members 118, 118' between the inner feeding surfaces 114, 114' and the outer feeding surfaces 116, 116', helps to reduce the amount of feed presented in the pan member 104 which the birds are capable of raking as the raking of feed can potentially cause the feed to become contaminated. Thus, because the birds cannot rake feed presented in the pan member 104 as freely as they could in some pan members of the prior art, the birds cannot rake the feed out of the pan member 104 onto the feeding surface of the poultry house where the feed will come into contact with waste and dirt, thus contaminating the feed.

Thus, the provision of the fin members 168, 168', 172, 172' and the inner rim members 118, 118' within the pan member 104 provides a number of advantages and benefits to the overall growth and health of the birds, and to the poultry grower's costs and expenses involved in growing the birds.

Prevention of Material Buildup in the Feeder Assembly 100

The outer grill member 184 and the first and second inner grill members 408, 408' have a plurality of apertures provided therethrough in order to allow dust, feed or other material to flow therethrough to prevent the buildup of excess material in the feeder assembly 100 which could potentially cause problems to the feeder assembly 100.

Cleaning of the Feeder Assembly 100

The feeder assembly 100 can be easily cleaned by the poultry grower. Prior to the cleaning of the feeder assembly 100, the poultry grower can pull the tongue extensions 240, 240' of the outer grill member 184 outwardly such that the pan member 104 is no longer supported by the tongue extensions 240, 240'. Thereafter, the hook members 175, 175' of the pan member 104 are allowed to rotate within the slots 236, 236' defined by the extensions 234, 234', such that the pan member 104 can be suspended from the outer grill member 184. Thus, once the pan member 104 is suspended from the outer grill member 184, the poultry grower can commence cleaning of the feeder assembly 100 as the suspending of the pan member 104 from the outer grill member 184 allows the poultry grower to easily access all parts of the feeder assembly 100.

With the pan member 104 suspended, the first and second drop tube members 482, 482', and the first and second inner grill members 408, 408', may also be removed from securement with the outer grill member 184 to allow for more thorough cleaning of the feeder assembly 100.

Anti-Roosting Feeder Assembly 100

The feeder assembly 100 deters roosting thereon by the birds by providing the roost extensions 394, 394' on the first and second feed pipe securement members 374, 374'. As discussed, the roost extensions 394, 394' are configured at or around the upper edges 396, 396' thereof to have a roost wire (not shown) secured thereto. Also, some of the reinforcement members 298 which extend onto the top member 190 of the outer grill member 184 may extend further off of the top member 190 than some of the other reinforcing members 298 in order to prevent roosting on the top member 190 of the outer grill member 184 by the poultry feeding from the feeder assembly 100.

Stacking of Pan Members 104

The tab members 167, 167' on the pan member 104 assist in the stacking of pan members 104 on top of one another, which assists in the shipping of pan members 104.

Structure of the Feeder Assembly 700

Attention is invited to the second embodiment of the feeder assembly 700 which is illustrated in FIGS. 51-67. The illustrated feeder assembly 700, like the feeder assembly 100, desirably is adapted to be used in connection with a poultry feed distribution system that includes a feed supply conduit 102. Desirably, the poultry feeder system includes a plurality of feeder assemblies 700, which can be vertically adjusted to either rest on the ground or be suspended above the ground by raising or lowering the feed supply conduit 102 or by other suitable means. The feeder assemblies 700 are preferably utilized in poultry houses used for housing and feeding poultry which are to be bred, commonly referred to as breeders. The feeder assemblies 700 are specifically designed to allow for the female breeders to eat therefrom, but to prevent the male breeders from eating therefrom. It is to be understood, however, that other types of animals and poultry, including chickens, turkeys and ducks, could also be fed with the feeder assemblies 700 of the invention.

The feeder assembly 700 is identical to the feeder assembly 100 except that the configuration of the first and second drop tube members 482, 482' has been altered (thus identified as **482*a*, 482*a*'), and that first and second brood gate blockers 702, 702' are provided. As such, the remainder of the feeder assembly 700 will not be described in detail herein with the understanding that the configuration and positioning of the elements of the pan member 104, the outer grill member 184, the first and second feed supply conduit securement members 374, 374', the first and second inner grill members 408, 408', the first and second drop tube member 482, 482', the outer ring member 526, and the dial member 568** have not changed, unless noted otherwise.

First and Second Drop Tube Members **482*a*, 482*a*'**

Attention is directed to the first and second drop tube members **482*a*, 482*a*'. The first and second drop tube members 482*a*, 482*a*' are identical to one another in configuration and, therefore, only the first drop tube member 482*a* will be described in detail with the understanding that the description of the second drop tube member 482*a*' would be identical. As such, the elements of the second drop tube member 482*a*'** are denoted with a prime (').

The first drop tube member **482*a*, which is best illustrated in FIGS. 51-56, has upper and lower edges 484*a*, 486*a* and an aperture 488*a* extending therethrough from the upper edge 484*a* to the lower edge 486*a* thereof. The aperture 488*a* defines an inner wall 490*a* of the first drop tube member 482*a*, which also has an outer wall 492*a***. The first drop tube member 482*a* is preferably configured to have cylindrical and conical portions such that the upper and lower edges 484*a*, 486*a* are preferably circular in configuration. An inner diameter of the aperture 488*a* at the lower edge 486*a* is preferably larger than the inner diameter of the aperture 488*a* at the upper edge 484*a*.

The first drop tube member 482*a* has first and second extension members 494*a*, 496*a* which extend upwardly from the upper edge 484*a* to free ends 498*a*, 500*a*. The first and second extension members 494*a*, 496*a* are positioned opposite one another and are identical in configuration to one another. The first and second extension members 494*a*, 496*a* have inner and outer surfaces 502*a*, 504*a*; 506*a*, 508*a*. The inner surfaces 502*a*, 506*a* are preferably flush with the inner wall 490*a* and the outer surfaces 504*a*, 508*a* are preferably flush with the outer wall 492*a*. The outer surfaces 504*a*, 508*a* of the first and second extension members 494*a*, 496*a* have serrated portions 510*a*, 512*a* proximate to the free ends 498*a*, 500*a* thereof.

The first drop tube member 482*a* has first and second flange members 514*a*, 516*a*. The first flange member 514*a* extends outwardly from the outer surface 504*a* of the first extension member 494*a* and from the outer wall 492*a*, and the second flange member 516*a* extends outwardly from the outer surface 508*a* of the second extension member 496*a* and from the outer wall 492*a*, such that the first and second flange members 514*a*, 516*a* are positioned opposite one another. The flange members 514*a*, 516*a* extend downwardly from the serrated portions 510*a*, 512*a* toward the lower edge 486*a*, but preferably do not extend to the lower edge 486*a*. Each of the flange members 514*a*, 516*a* have a plurality of notches 518*a*, 520*a*, preferably five (5) notches, cut therein, although it is to be understood that more or less notches 518*a*, 520*a* could be provided as desired. The notches 518*a*, 520*a* are preferably provided on the flange members 514*a*, 516*a* outwardly of the outer surfaces 504*a*, 508*a* of the extension members 494*a*, 496*a*, and not outwardly of the outer wall 492*a*.

The first drop tube member 482*a* further includes first and second cutouts 522*a*, 524*a* therethrough. The first cutout 522*a* is provided from the upper edge 484*a*, between where the first and second extension members 494*a*, 496*a* are provided, and extends downwardly toward the lower edge 486*a* in a generally curved manner. The second cutout 524*a* is provided from the lower edge 486*a*, and extends upwardly toward the first cutout 522*a*, in a generally triangular manner.

The first drop tube member 482*a* further includes an opening 704, which is generally rectangular in configuration, provided therethrough from the outer wall 492*a* to the inner wall 490*a*, such that the opening 704 is in communication with the aperture 488*a*. The opening 704 is provided opposite and below the first cutout 522*a*. Upper and lower edges 706, 708 and opposite side edges 710, 712 are defined by the opening 704.

The first drop tube member 482*a* further includes first and second guide extensions 714, 716. The first guide extension 714 extends outwardly from the outer wall 492*a* proximate to one side edge 710 of the opening 704 and the second guide extension 716 extends outwardly from the outer wall 492*a* proximate to the other side edge 712 of the opening 704. Each guide extension 714, 716 preferably extends from proximate the lower edge 708 of the opening 704 upwardly, past the upper edge 706 of the opening 704, to the upper edge 484*a* of the first drop tube member 482*a*. Each guide extension 714, 716 also provides a slot 718, 720 therein, respectively, such that the slots 718, 720 face one another.

First and Second Brood Gate Blockers 702, 702'

Attention is directed to the first and second brood gate blockers 702, 702'. The first and second brood gate blockers 702, 702' are identical to one another in configuration and, therefore, only the first brood gate blocker 702 will be described in detail with the understanding that the description of the second brood gate blocker 702' would be identical. As such, the elements of the second brood gate blocker 702' are denoted with a prime (').

Figure 60:
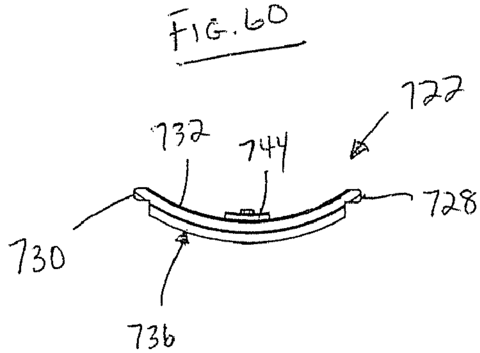
FIG. 60 is a bottom view of a masking portion of the brood gate blocker.
Figure 62:
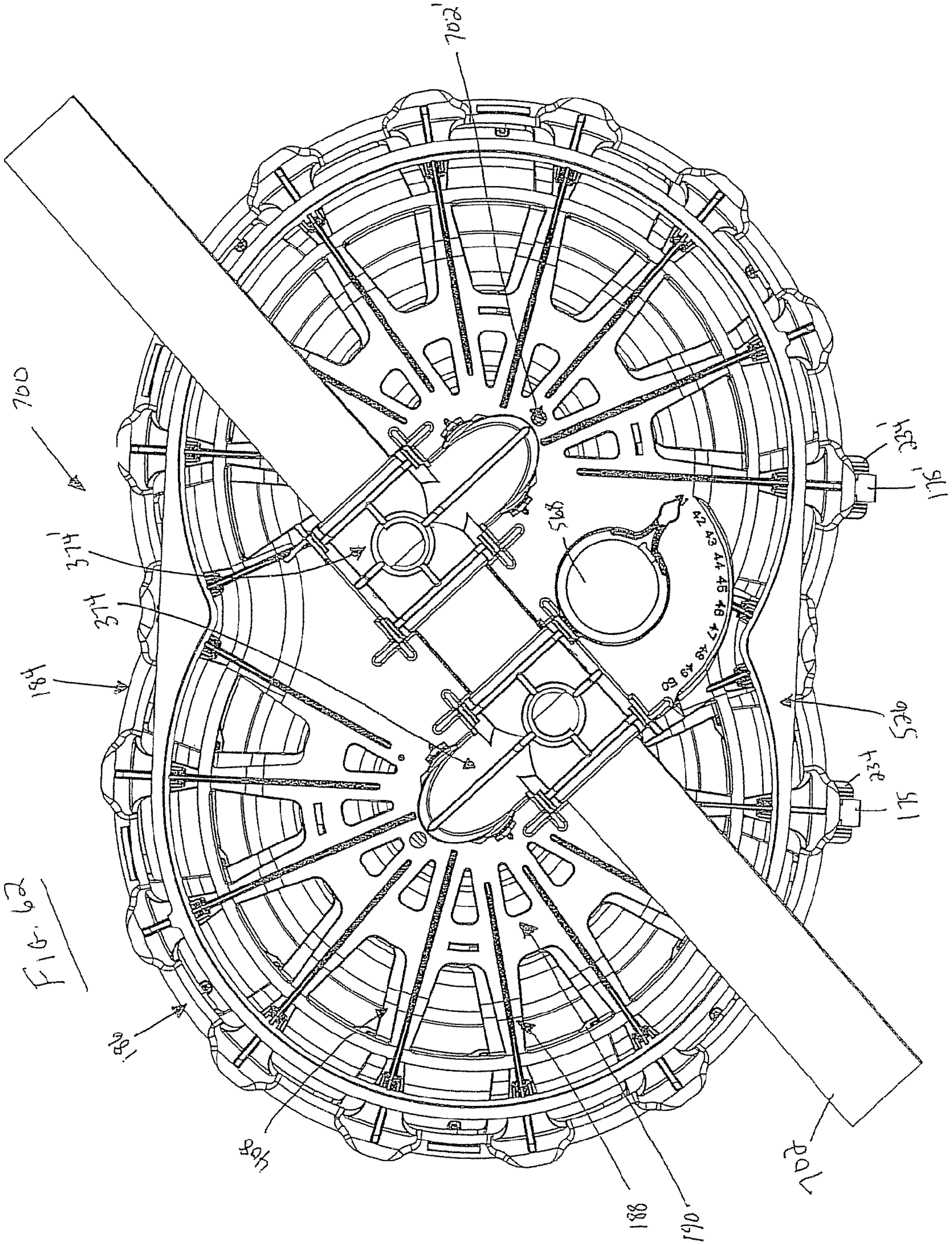
FIG. 62 is a top view of the second embodiment of the feeder assembly connected to the feed supply conduit.
Figure 63:
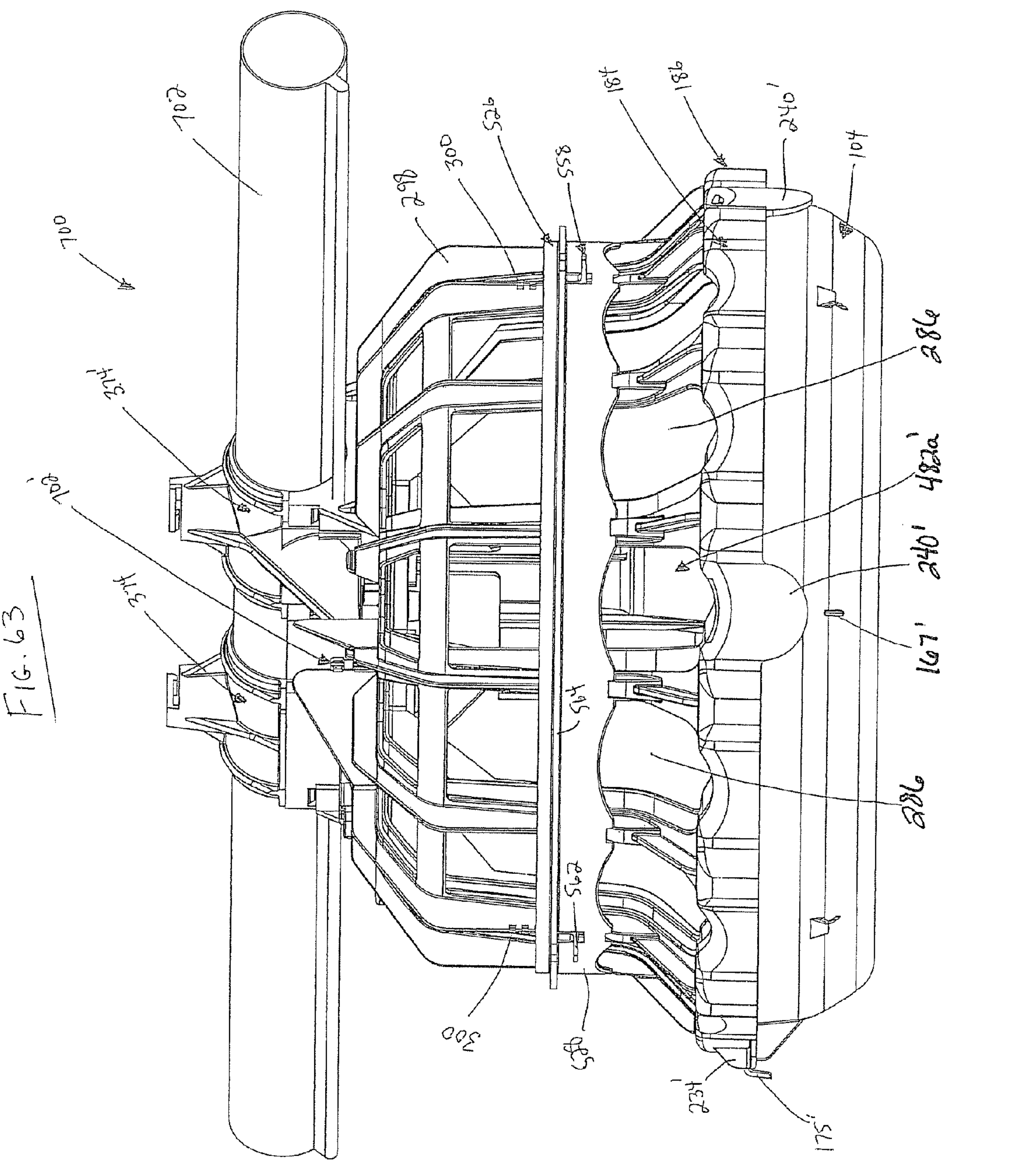
FIG. 63 is a side view of the second embodiment of the feeder assembly connected to the feed supply conduit.

The first brood gate blocker 702, which is best illustrated in FIGS. 57-61, has a generally rectangular masking portion 722 which has upper, lower and opposite side edges 724, 726, 728, 730 and inner and outer surfaces 732, 734. A wedge-shaped flange member 736 extends outwardly from the outer surface 734. The flange member 736 extends between the side edges 728, 730 and proximate the lower edge 726. The wedge-shaped flange 736 has a first surface 738 which is parallel to the lower edge 726 and which extends outwardly from the outer surface 734, a second surface 740 which extends upwardly from the first surface 738 which is generally parallel to the outer surface 734, and a third surface 742 which is angled upwardly and inwardly from the second surface 740 to the outer surface 734. A flange member 744 extends inwardly from the inner surface 732 proximate to the upper edge 724 and is generally provided equidistantly between the side edges 728, 730. The masking portion 722 is generally curved from the side edge 728 to the side edge 730, as best illustrated in FIG. 60.

The first brood gate blocker 702 also has a generally tube-shaped member 746 which extends upwardly from the upper edge 724 of the masking portion 722 to a top end 748 thereof. The tube-shaped member 746 has a cylindrical notch 750 provided therein proximate to the top end 748.

Operation of the Feeder Assembly 700

Assembly of the Feeder Assembly 700

The feeder assembly 700 is illustrated in FIGS. 62-67 and the assembly of the feeder assembly 700 is identical to the assembly of the feeder assembly 100 described hereinabove except as noted hereinbelow and, therefore, description of the assembly 700 will not be repeated hereinbelow.

Figure 66:
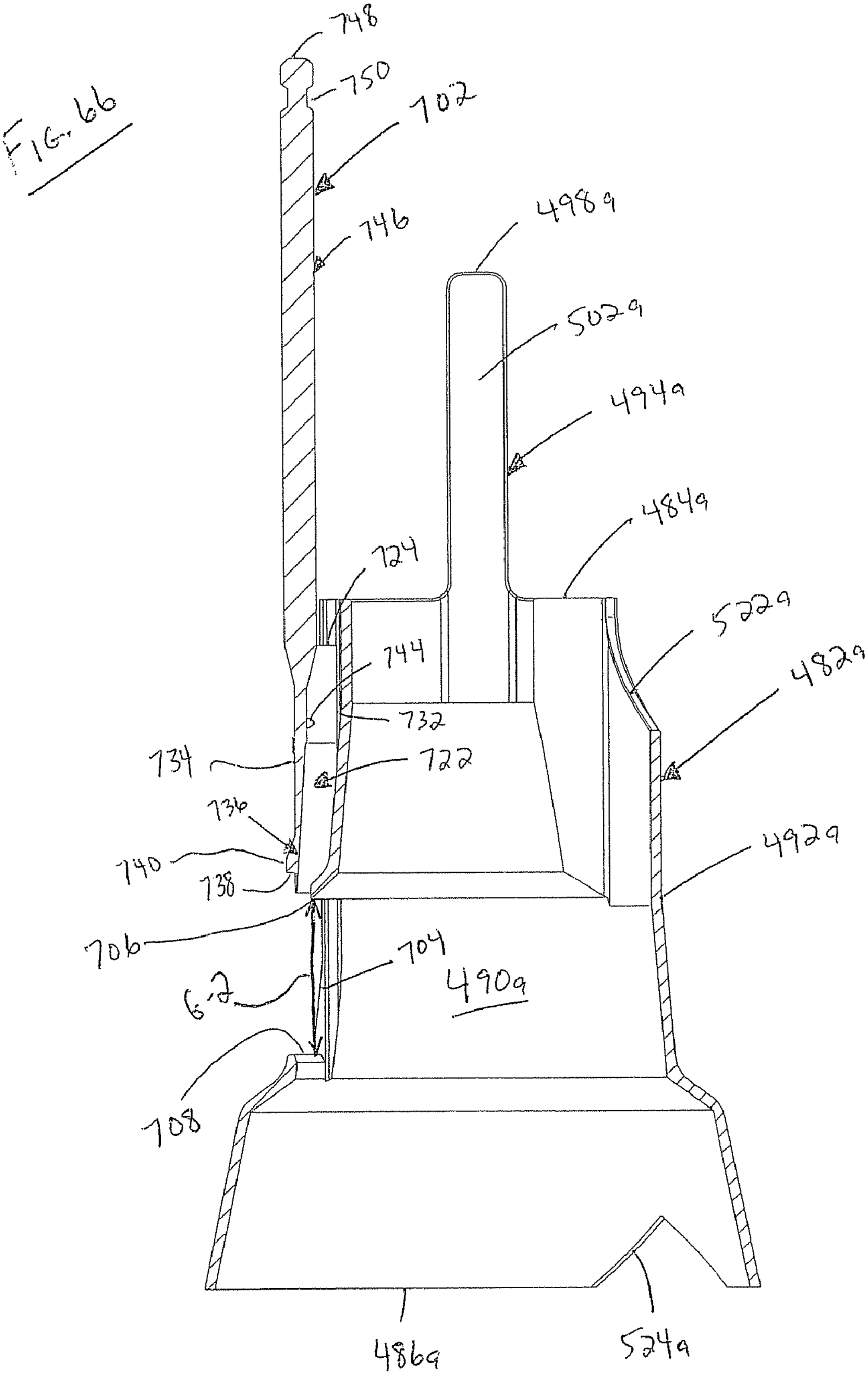
FIG. 66 is a cross-sectional view of the drop tube member and the brood gate blocker with the brood gate blocker in a position to allow feed to flow through the upper brood gate.

Attention is invited to FIGS. 66 and 67 which illustrate the securement/positioning of the first and second brood gate blockers 702, 702' with the first and second drop tube members 482, 482'. The first brood gate blocker 702 is positioned such that the opposite side edges 728, 730 of the masking portion 722 are slidable within the slots 718, 720 of the first and second guide extensions 714, 716 of the first drop tube member 482*a*. The tube-shaped member 746 is positioned to be below, within or extending through the eighth aperture 358 of the top member 190 of the outer grill member 184. Likewise, the second brood gate blocker 702' is positioned such that the opposite side edges 728', 730' of the masking portion 722' are slidable within the slots 718', 720' of the first and second guide extensions 714', 716' of the second drop tube member 482*a'*. The tube-shaped member 746' is positioned to be below, within or extending through the ninth aperture 358' of the top member 190 of the outer grill member 184.

Opening and Closing of the Brood Gates G-2, G-2'

Figure 65:
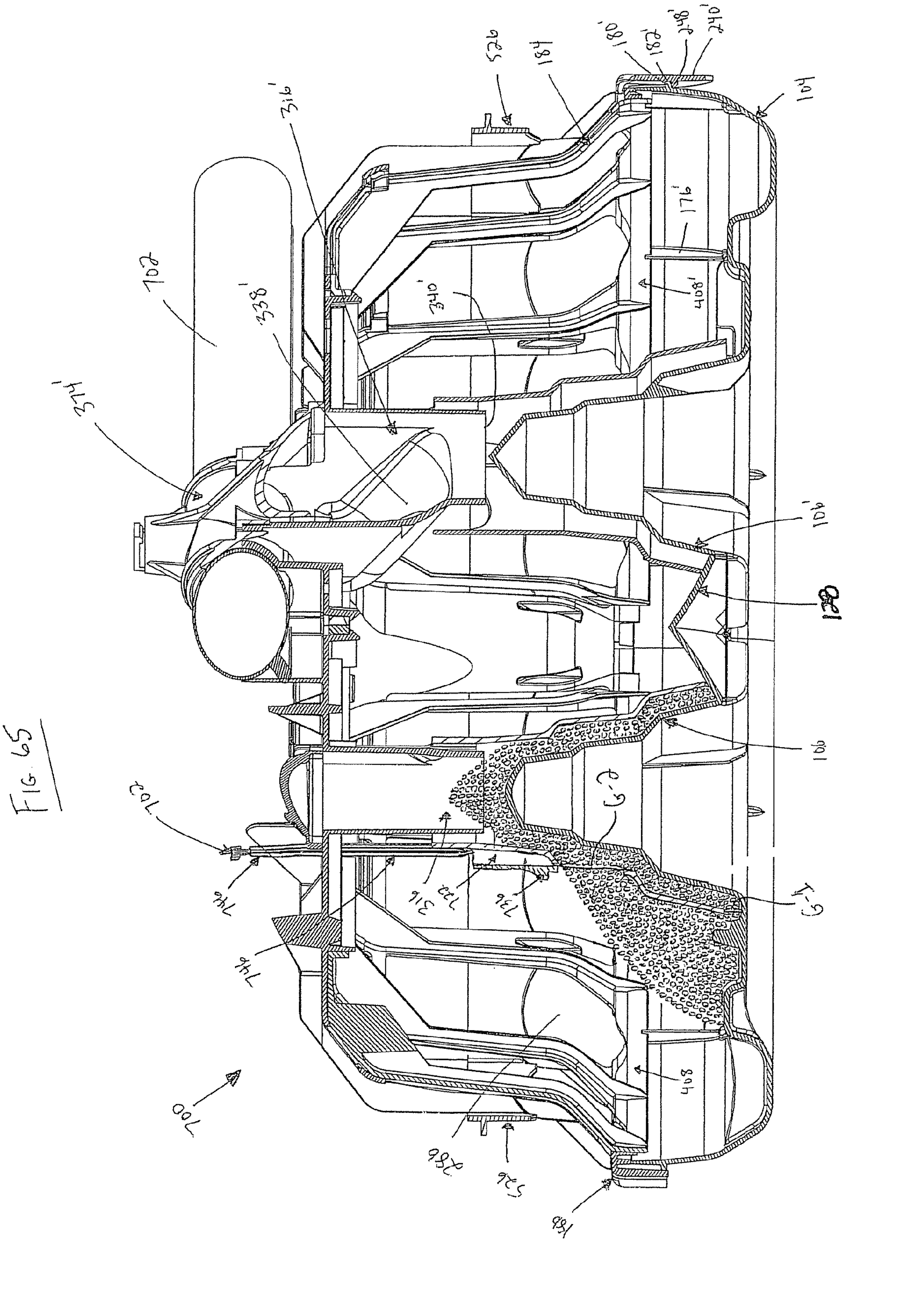
FIG. 65 is identical to FIG. 64, but shows the brood gate blocker in a position to allow feed, as illustrated, to flow through the upper brood gate.

The openings 704, 704' provided through the first and second drop tube members 482*a*, 482*a*' define upper or brood gates G-2, G-2' of the feeder assembly 700. Feed flowing into the first and second drop tube members 482, 482*a*' from the first and second fill ports 312, 312' can flow out of the brood gates G-2, G-2', as opposed to, or in addition to, the lower feed gates G-1, G-1', and onto the base portions 112, 112' of the pan member 104 in order to present high levels of feed on the base portions 112, 112', as illustrated in FIGS. 65 and 66. Feed is assisted in flowing through the brood gates G-2, G-2' by the upstanding cone portions 106, 106'. High levels of feed in the pan member 104 are beneficial because smaller birds in the poultry house are able to see the feed in the pan members 104 and, thus, are attracted thereto, which leads to the smaller birds eating the feed within the pan member 104. As the birds grow older/larger, however, it is unnecessary to provide high levels of feed in the pan member 104, as illustrated in FIG. 65, because the birds have learned where the feed is presented, and also are large enough that they can reach down into the pan member 104 to eat feed which is presented at a lower level, e.g., through the lower feed gates G-1, G-1'. Thus, it is beneficial to have the capability to present high levels of feed in the pan member 104, but also beneficial to stop the presentation of high levels of feed in the pan member 104.

Figure 64:
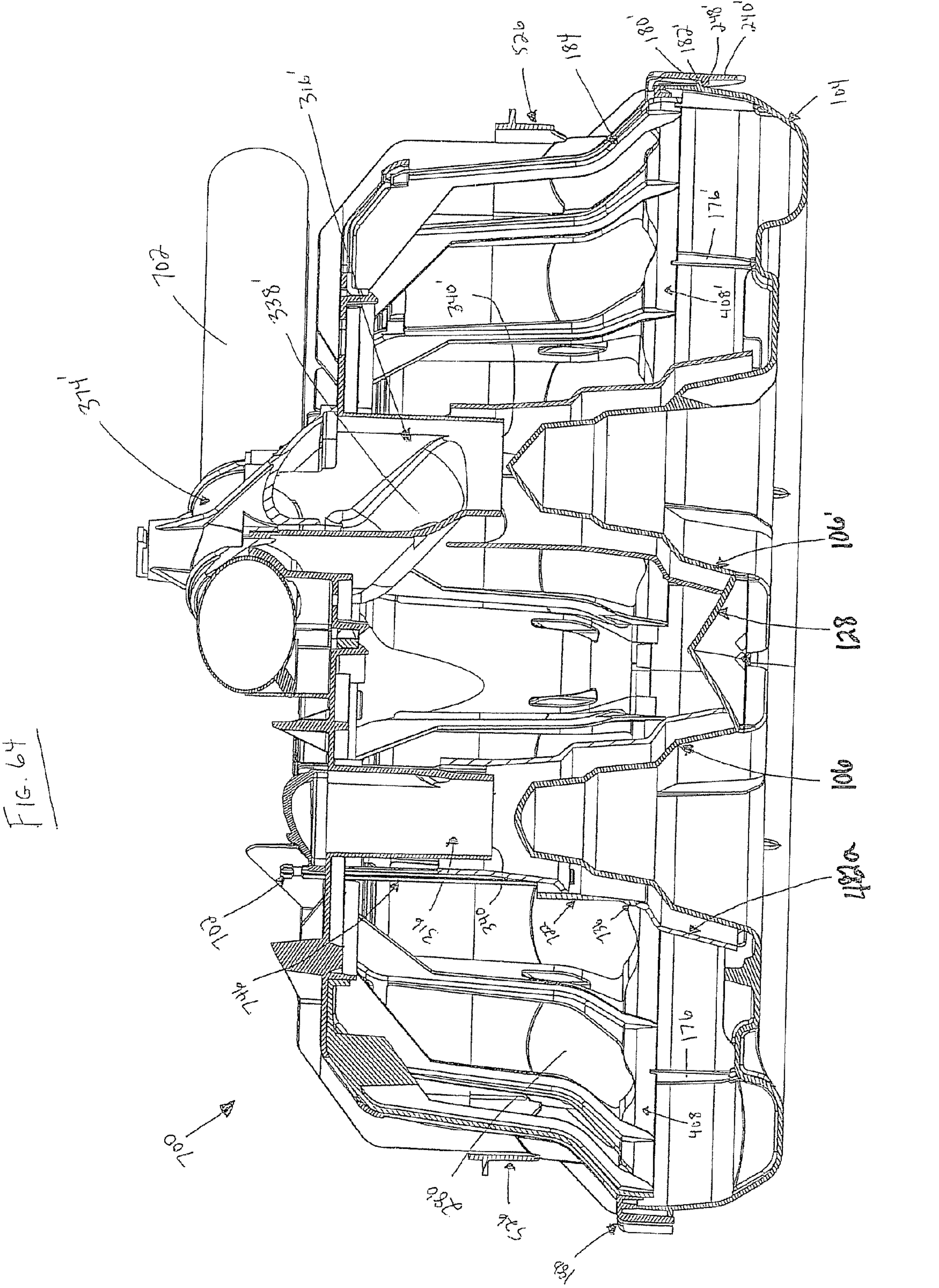
FIG. 64 is a cross-sectional view of the second embodiment of the feeder assembly connected to the feed supply conduit, showing the brood gate blocker in a position to prevent feed from flowing through the upper brood gate.

The first and second brood gate blockers 702, 702' provide the capability to present and prevent high levels of feed in the pan member 104. The first and second brood gate blockers 702, 702' can be positioned such that the masking portions 722, 722' either mask the brood gates G-2, G-2', as illustrated in FIGS. 64 and 67, or do not mask the brood gates G-2, G-2', as illustrated in FIGS. 65 and 66. In order to mask the brood gates G-2, G-2', the tube-shaped members 746, 746' of the first and second brood gate blockers 702, 702' extending through the top portion 190 of the outer grill member 184 are pushed downwardly until the first surfaces 738, 738' of the wedge shaped flanges 736, 736' are positioned against the lower edges 708, 708' of the opening 704, 704' defining the brood gates G-2, G-2', such that the mask portions 722, 722' mask the openings 704, 704', thus closing off the brood gates G-2, G-2'. In this position, the flange members 744, 744' are positioned below the upper edges 706, 706' of the openings 704, 704' in order to prevent the first and second brood gate blockers 702, 702' from being moved out of position masking the openings 704, 704', unless subjected to extreme force. In order to unmask the brood gates G-2, G-2', the tube-shaped members 746, 746' are pulled upwardly so that the flange members 744, 744' are moved around the upper edges 706, 706' of the openings 704, 704', thus allowing for the mask portions 722, 722' to be removed from masking the openings 704, 704'. The first and second brood gate blockers 702, 702' are moved upwardly, within the slots 718, 720; 718', 720', until the lower edges 726, 726' of the masking portions 722, 722' are able to rest on the outer walls 492*a*, 492*a*' of the first and second drop tube members 482*a*, 482*a*'.

Structure of the Feeder Assembly 800

Attention is invited to the third embodiment of the feeder assembly 800 which is illustrated in FIGS. 68-70. The illustrated feeder assembly 800 desirably is adapted to be used in connection with a poultry feed distribution system that includes a feed supply conduit 102. Desirably, the poultry feeder system includes a plurality of feeder assemblies 800, which can be vertically adjusted to either rest on the ground or be suspended above the ground by raising or lowering the feed supply conduit 102 or by other suitable means. The feeder assemblies 800 are preferably utilized in poultry houses used for housing and feeding poultry which are to be bred, commonly referred to as breeders. The feeder assemblies 800 are specifically designed to allow for the female breeders to eat therefrom, but to prevent the male breeders from eating therefrom. It is to be understood, however, that other types of animals and poultry, including chickens, turkeys and ducks, could also be fed with the feeder assemblies 800 of the invention.

The feeder assembly 800 is identical to the feeder assembly 100 except that the general shape of configuration of the pan member 104, the outer grill member 184 and the outer ring member 526 have been altered (thus identified as 104*a*, 184*a*, 526*a*) from being generally in the shape of two intersecting circles to a racetrack shape. As such, the remainder of the feeder assembly 800 will not be described in detail herein with the understanding that the configuration and positioning of the other elements of the feeder assembly 100 have not changed, unless noted otherwise.

Pan Member 104*a*

Only the main differences between the pan member 104*a* and the pan member 104 will be described in detail herein, with the understanding that in view of the main differences between the pan member 104*a* and the pan member 104, that other minor differences are provided as well. It is to be understood that those of ordinary skill in the art would understand the minor differences to be made based on the main differences to the pan member 104*a*.

The pan member 104*a* is illustrated in FIG. 68 and includes first and second base portions 112*a*, 112*a*' which are identical to one another in configuration and, therefore, only the first base portion 112*a* will be described in detail with the understanding that the description of the second base portion 112*a*' would be identical. As such, the elements of the second base portion 112*a*' are denoted with a prime ('). The first base portion 112*a* has an inner feeding surface 114*a* and an outer feeding surface 116*a* separated by an inner rim member 118*a*.

The inner feeding surface 114*a* extends generally outwardly from the bottom end 110 of the first upstanding cone portion 106 to the inner rim member 118*a*. An outer edge of the inner feeding surface 114*a* is generally formed in a shape of half a racetrack such that the outer edge has first and second portions which are separated from one another, but parallel to one another, and a third portion which is semi-circular in configuration and which connects the first and second portions together.

The inner feeding surfaces 114*a*, 114*a*' are separated from one another by an upstanding portion 128*a* which slopes or curves downwardly from a pointed top end 130*a*. The upstanding portion 128*a* also extends between the first and second upstanding cone portions 106, 106'.

The inner rim member 118*a* extends generally outwardly from the inner feeding surface 114*a* to the outer feeding surface 116*a*. The inner rim member 118*a* is generally formed in a shape of half a racetrack such that inner and outer edges of the inner rim member 118*a* each have first and second portions which are separated from one another, but which are parallel to one another, and third portions which are semi-circular in configuration and which connect the first and second portions together. The inner rim members 118*a*, 118*a*' are connected to one another to generally be formed in the shape of a whole racetrack.

The outer feeding surface 116*a* extends generally outwardly from the inner rim member 118*a* to a first outer rim member 152*a* of the pan member 104*a*. The outer feeding surface 116*a* is generally formed in a shape of half a racetrack such that inner and outer edges of the outer feeding surfaces 116*a* each have first and second portions which are separated from one another, but which are parallel to one another, and third portions which are semi-circular in configuration and which connect the first and second portions together. The outer feeding surfaces 116*a*, 116*a*' are connected to one another to generally be formed in the shape of a whole racetrack.

The pan member 104*a* further includes the first and second outer rim members 152*a*, 152*a*' which are identical to one another in configuration and, therefore, only the first outer rim member 152*a* will be described in detail with the understanding that the description of the second outer rim member 152*a*' would be identical. As such, the elements of the second outer rim member 152*a*' are denoted with a prime (').

The outer rim member 152*a* extends upwardly from the outer edge of the outer feeding surface 116*a* to a top edge 158*a*. The outer rim member 152*a* preferably extends upwardly and outwardly from the outer edge of the outer feeding surface 116*a* to the top edge 158*a*, and further preferably curves upwardly and outwardly, preferably in a concave manner, from the outer edge of the outer feeding surface 116*a* to the top edge 158*a*.

The outer rim member 152*a* separates an inner surface 164*a* of the pan member 104*a* from an outer surface (not shown) of the pan member 104*a*. The top edge 158*a* is generally formed in a shape of half a racetrack such that the top edge 158*a* has first and second portions which are separated from one another, but which are parallel to one another, and a third portion which is semi-circular in configuration and which connects the first and second portions together. The top edges 158*a*, 158*a*' are connected to one another to generally be formed in the shape of a whole racetrack.

First and second hook members 175*a*, 175*a*' extend outwardly from the outer surfaces (not shown) of the outer rim members 152*a*, 152*a*' proximate to and below the connections of the first and second portions of the top edges 158*a*, 158*a*'.

Thus, from the foregoing and from a study of FIG. 68 illustrating the pan member 104*a*, it is apparent that the pan member 104*a* is generally formed in the shape of a racetrack. Like the pan member 104, the pan member 104*a* has at least one (1) plane of symmetry and, if the hook members 175*a*, 175*a*' were not provided on the pan member 104*a*, the pan member 104*a* would have an infinite member of axes of symmetry (not taking into account the placement of the fin members 168*a*, 168*a*' or the fin members 172*a*, 172*a*').

Outer Grill Member 184*a*

Only the main differences between the outer grill member 184*a* and the outer grill member 184 will be described in detail herein, with the understanding that in view of the main differences between the outer grill member 184*a* and the outer grill member 184, that other minor differences are provided as well. It is to be understood that those of ordinary skill in the art would understand the minor differences to be made based on the main differences to the outer grill member 184*a*. The outer grill member 184*a* is illustrated in FIG. 69.

The rim member 186*a*, in a preferred embodiment, is generally formed in a shape to match the shape in which the top edges 158*a*, 158*a*' of the outer rim members 152*a*, 152*a*' of the pan member 104*a* are formed, preferably in a shape of a whole racetrack, such that the rim member 186*a* has first and second portions 192*a*, 192*a*', where each portion 192*a*, 192*a*' is generally formed in a shape of half a racetrack such that each portion 192*a*, 192*a*' each have first and second portions which are separated from one another, but which are parallel to one another, and third portions which are semi-circular in configuration and which connect the first and second portions together. The first and second portions 192*a*, 192*a*' are connected to one another to generally be formed in the shape of a whole racetrack.

The first portion 192*a* of the rim member 186*a* has a side rim portion 198*a* including an inner wall 200*a* and a plurality of outer walls 202*a*.

The inner wall 200*a* has an inner surface (not shown) and an outer surface 206*a*. The inner wall 200*a* is formed in the shape of half a racetrack such that the connection of the inner walls 200*a*, 200*a*' forms a whole racetrack.

The ring member 260*a* of the spoke assembly 188*a* is generally formed in the shape of a racetrack, as opposed to the ring member 260 which is generally formed in the shape of two intersecting circles.

Outer Ring Member 526*a*

Only the main differences between the outer ring member 526*a* and the outer ring member 526 will be described in detail herein, with the understanding that in view of the main differences between the outer ring member 526*a* and the outer ring member 526, that other minor differences are provided as well. It is to be understood that those of ordinary skill in the art would understand the minor differences to be made based on the main differences to the outer ring member 526*a*. The outer ring member 526*a* is illustrated in FIG. 70.

The upstanding member 528*a* of the outer ring member 526*a* is generally formed in the shape of a racetrack such that the outer ring member 526*a* can be positioned around, and movable relative to, the spoke members 256*a* and the reinforcing members 298*a* of the outer grill member 184*a*, such that the outer ring member 526*a* can effectively change the height of the apertures 286*a* provided through the outer grill member 184*a*.

Unique Shape of the Feeder Assembly 800

The pan member 104*a* and the rim member 186*a* of the outer grill member 184*a* are both uniquely shaped in the form of a racetrack, such that the feeder assembly 800 is uniquely shaped in the form of a racetrack. The feeder assembly 800 incorporates the well-known and desired features of the round/circular prior art feeders, essentially generally combining two such round/circular feeders together and bridging the gap between the two such round/circular feeders. Thus, the feeder assembly 800 has all of the same advantages as are generally described in connection with the feeder assembly 100 or the feeder assembly 700.

As the pan member 104*a*, the outer grill member 184*a* and the outer ring member 526*a* have been described and illustrated herein, drawings of the feeder assembly 800 as a whole have not been provided as one of ordinary skill in the art would understand the configuration of the feeder assembly 800 as a whole based on the drawings and descriptions of the altered pan member 104*a*, the outer grill member 184*a* and the outer ring member 526*a*.

Structure of the Feeder Assembly 900

Attention is invited to the fourth embodiment of the feeder assembly 900 which is illustrated in FIGS. 71-73. The illustrated feeder assembly 900 desirably is adapted to be used in connection with a poultry feed distribution system that includes a feed supply conduit 102. Desirably, the poultry feeder system includes a plurality of feeder assemblies 900, which can be vertically adjusted to either rest on the ground or be suspended above the ground by raising or lowering the feed supply conduit 102 or by other suitable means. The feeder assemblies 900 are preferably utilized in poultry houses used for housing and feeding poultry which are to be bred, commonly referred to as breeders. The feeder assemblies 900 are specifically designed to allow for the female breeders to eat therefrom, but to prevent the male breeders from eating therefrom. It is to be understood, however, that other types of animals and poultry, including chickens, turkeys and ducks, could also be fed with the feeder assemblies 900 of the invention.

The feeder assembly 900 is identical to the feeder assembly 100 except that the configuration of the pan member 104, the outer grill member 184 and the outer ring member 526 have been altered (thus identified as 104*b*, 184*b*, 526*b*) from being generally in the shape of two intersecting circles to an elliptical or football shape. As such, the remainder of the feeder assembly 900 will not be described in detail herein with the understanding that the configuration and positioning of the other elements of the feeder assembly 100 have not changed, unless noted otherwise.

Pan Member 104*b*

Only the main differences between the pan member 104*b* and the pan member 104 will be described in detail herein, with the understanding that in view of the main differences between the pan member 104*b* and the pan member 104, that other minor differences are provided as well. It is to be understood that those of ordinary skill in the art would understand the minor differences to be made based on the main differences to the pan member 104*b*.

The pan member 104*b* is illustrated in FIG. 71 and includes first and second base portions 112*b*, 112*b*' which are identical to one another in configuration and, therefore, only the first base portion 112*b* will be described in detail with the understanding that the description of the second base portion 112*b*' would be identical. As such, the elements of the second base portion 112*b*' are denoted with a prime ('). The first base portion 112*b* has an inner feeding surface 114*b* and an outer feeding surface 116*b* separated by an inner rim member 118*b*.

The inner feeding surface 114*b* extends generally outwardly from the bottom end 110 of the first upstanding cone portion 106 to the inner rim member 118*b*. An outer edge of the inner feeding surface 114*b* is generally formed in a shape of half an ellipse or football such that the outer edge has first and second portions which are separated from one another, and a third portion which connects the first and second portions together. Each of the first, second and third portions are curved with the first and second portions having a relatively large radius of curvature and the third portion having a relatively small radius of curvature, which is smaller than the radius of curvature of the first and second portions.

The inner feeding surfaces 114*b*, 114*b*' are separated from one another by an upstanding portion 128*b* which slopes or curves downwardly from a pointed top end 130*b*. The upstanding portion 128*b* also extends between the first and second upstanding cone portions 106, 106'.

The inner rim member 118*b* extends generally outwardly from the inner feeding surface 114*b* to the outer feeding surface 116*b*. The inner rim member 118*b* is generally formed in a shape of half an ellipse or football such that inner and outer edges of the inner rim member 118*b* each have first and second portions which are separated from one another, and a third portion which connects the first and second portions together. Each of the first, second and third portions are curved with the first and second portions having a relatively large radius of curvature and the third portion having a relatively small radius of curvature, which is smaller than the radius of curvature of the first and second portions. The inner rim members 118*b*, 118*b*' are connected to one another to generally be formed in the shape of an ellipse or a football.

The outer feeding surface 116*b* extends generally outwardly from the inner rim member 118*b* to a first outer rim member 152*b* of the pan member 104*b*. The outer feeding surface 116*b* is generally formed in a shape of half an ellipse or football such that inner and outer edges of the outer feeding surface 116*b* each have first and second portions which are separated from one another, and a third portion which connects the first and second portions together. Each of the first, second and third portions are curved with the first and second portions having a relatively large radius of curvature and the third portion having a relatively small radius of curvature, which is smaller than the radius of curvature of the first and second portions. The outer feeding surfaces 116*b*, 116*b*' are connected to one another to generally be formed in the shape of an ellipse or a football.

The pan member 104*b* further includes the first and second outer rim members 152*b*, 152*b*' which are identical to one another in configuration and, therefore, only the first outer rim member 152*b* will be described in detail with the understanding that the description of the second outer rim member 152*b*' would be identical. As such, the elements of the second outer rim member 152*b*' are denoted with a prime (').

The outer rim member 152*b* extends upwardly from the outer edge of the outer feeding surface 116*b* to a top edge 158*b*. The outer rim member 152*b* preferably extends upwardly and outwardly from the outer edge of the outer feeding surface 116*b* to the top edge 158*b*, and further preferably curves upwardly and outwardly, preferably in a concave manner, from the outer edge of the outer feeding surface 116*b* to the top edge 158*b*.

The outer rim member 152*b* separates an inner surface 164*b* of the pan member 104*b* from an outer surface (not shown) of the pan member 104*b*. The top edge 158*b* is generally in a shape of half an ellipse or football such that the top edge 158*b* has first and second portions which are separated from one another, and a third portion which connects the first and second portions together. Each of the first, second and third portions are curved with the first and second portions having a relatively large radius of curvature and the third portion having a relatively small radius of curvature, which is smaller than the radius of curvature of the first and second portions. The top edges 158*b*, 158*b*' are connected to one another to generally be formed in the shape of an ellipse or a football.

First and second hook members 175*b*, 175*b*' extend outwardly from the outer surfaces (not shown) of the outer rim members 152*b*, 152*b*' proximate to and below the connections of the first and second portions of the top edges 158*b*, 158*b*'.

Thus, from the foregoing and from a study of FIG. 71 illustrating the pan member 104*b*, it is apparent that the pan member 104*b* is generally formed in the shape of an ellipse or a football. Like the pan member 104, the pan member 104*b* has at least one (1) plane of symmetry and, if the hook members 175*b*, 175*b*' were not provided on the pan member 104*b*, the pan member 104*b* would have an infinite number of axes of symmetry (not taking into account the placement of the fin members 168*b*, 168*b*' or the fin members 172*b*, 172*b*').

Outer Grill Member 184*b*

Only the main differences between the outer grill member 184*b* and the outer grill member 184 will be described in detail herein, with the understanding that in view of the main differences between the outer grill member 184*b* and the outer grill member 184, that other minor differences are provided as well. It is to be understood that those of ordinary skill in the art would understand the minor differences to be made based on the main differences to the outer grill member 184*b*. The outer grill member 184*b* is illustrated in FIG. 72.

The rim member 186*b*, in a preferred embodiment, is generally formed in a shape to match the shape in which the top edges 158*b*, 158*b*' of the outer rim members 152*b*, 152*b*' of the pan member 104*b* are formed, preferably in a shape of an ellipse or a football, such that the rim member 186*b* has first and second portions 192*b*, 192*b*', where each portion 192*b*, 192*b*' is generally formed in a shape of half an ellipse or football such that each portion 192*b*, 192*b*' has first and second portions which are separated from one another, and a third portion which connects the first and second portions together. Each of the first, second and third portions are curved with the first and second portions having a relatively large radius of curvature and the third portion having a relatively small radius of curvature, which is smaller than the radius of curvature of the first and second portions. The first and second portions 192*b*, 192*b*' are connected to one another to generally be formed in the shape of an ellipse or a football.

The first portion 192*b* of the rim member 186*b* has a side rim portion 198*b* including an inner wall 200*b* and a plurality of outer walls 202*b*.

The inner wall 200*b* has an inner surface (not shown) and an outer surface 206*b*. The inner wall 200*b* is formed in the shape of half an ellipse or football such that the connection of the inner walls 200*b*, 200*b*' forms an entire ellipse or football.

The ring member 260*b* of the spoke assembly 188*b* is generally formed in the shape of an ellipse or a football, as opposed to the ring member 260 which is generally formed in the shape of two intersecting circles.

Outer Ring Member 526*b*

Only the main differences between the outer ring member 526*b* and the outer ring member 526 will be described in detail herein, with the understanding that in view of the main differences between the outer ring member 526*b* and the outer ring member 526, that other minor differences are provided as well. It is to be understood that those of ordinary skill in the art would understand the minor differences to be made based on the main differences to the outer ring member 526*b*. The outer ring member 526*b* is illustrated in FIG. 73.

The upstanding member 528*b* of the outer ring member 526*b* is generally formed in the shape of a racetrack such that the outer ring member 526*b* can be positioned around, and movable relative to, the spoke members 256*b* and the reinforcing members 298*b* of the outer grill member 184*b*, such that the outer ring member 526*b* can effectively change the height of the apertures 286*b* provided through the outer grill member 184*b*.

Shape of the Feeder Assembly 900

The pan member 104*b* and the rim member 186*b* of the outer grill member 184*b* are both shaped in the form of an ellipse or a football, such that the feeder assembly 900 is shaped in the form an ellipse or a football. The feeder assembly 900 thus incorporates the beneficial features of an elliptical pan member 104*b* and an elliptical feeder assembly 900 which are discussed in U.S. Pat. No. 6,786,178 and which is embodied in the Kixoo® Feeder manufactured and sold by Roxell N.V. Otherwise, the feeder assembly 900 has all of the same advantages as are generally described in connection with either the feeder assembly 100 or the feeder assembly 700.

It should be noted that because of the elliptical shape of the pan member 104*b* and the outer grill member 184*b*, the configuration of the inner grill members 408, 408', if included in the feeder assembly 900, would have to be slightly altered such that they could rotate within the outer grill member 184*b* as desired.

As the pan member 104*b*, the outer grill member 184*b* and the outer ring member 526*b* have been described and illustrated herein, drawings of the feeder assembly 900 as a whole have not been provided as one of ordinary skill in the art would understand the configuration of the feeder assembly 900 as a whole based on the drawings and descriptions of the altered pan member 104*b*, the outer grill member 184*b* and the outer ring member 526*b*.

It is to be understood that while the configuration of the feeder assemblies 100, 700, 800, 900 have been described and illustrated to be elongated and in the shape of two intersecting circles, a racetrack configuration, or an elliptical configuration, that the feeder assembly of the invention may be of any other alternative configuration as desired, such as three or more intersecting circles, or any oval shape other than the racetrack configuration and the elliptical configuration (as the racetrack and elliptical configurations described and illustrated herein are considered to both be oval in configuration).

Also, it is further to be understood that regardless of the shape of the feeder assemblies, whether circular, elongated or other and in the shapes described and illustrated with regard to the first, second and third embodiments described and illustrated, or any other shape, the invention is intended to include any feeder assembly, other than trough type feeder assemblies, where multiple individual and separate feeder assemblies, of the type generally described herein, are provided along one or more feed supply conduits, where each feeder assembly has two or more separate fill ports for receiving feed from the feed supply conduit(s).

It is also further to be understood that, if desired, the feeder assemblies 100, 700, 800, 900 may be provided without the outer ring members 526, 526*a*, 526*b*, respectively, if it is not desired to change the height of the apertures 286, 286*a*, 286*b* provided through the outer grill members 184, 184*a*, 184*b*. Likewise, it is also further to be understood that, if desired, the feeder assemblies 100, 700, 800, 900 may be provided without the inner ring members 408, 408' and the dial member 568, if it is not desired to change the width of the apertures 286, 286*a*, 286*b* provided through the outer grill members 184, 184*a*, 184*b*.

While preferred embodiments of the invention are shown and described, it is envisioned that those skilled in the art may devise various modifications without departing from the spirit and scope of the foregoing description and the appended claims.

The invention is claimed as follows:

1. A feeder assembly for use in a feed distribution system having a feed supply conduit, said feeder assembly comprising:

a pan member having a base portion which is generally formed in a shape of intersecting circles, said base portion having a region which is common to adjacent intersecting circles, wherein said region comprises rises less than half of an area defined by each of said adjacent intersecting circles;

at least one fill port lot receiving feed from the feed supply conduit and for providing feed onto said base portion; and a grill member having a rim member which is operatively associated with said pan member, said at least one fill port being defined in said grill member.

2. The feeder assembly as defined claim 1, wherein each of said intersecting circles defining said base portion have equal diameters.

3. The feeder assembly as defined in claim 2, wherein said equal diameter of each of said intersecting circles defining said base portion is approximately thirteen inches and wherein centers of each of said intersecting circles are provided at a distance of approximately six inches relative to an adjacent intersecting circle.

4. The feeder assembly as defined in claim 1, wherein said base portion is generally formed in a shape of two intersecting circles, one of said intersecting circles defining a first portion of said base portion and said other one of said intersecting circles defining a second portion of said base portion.

5. The feeder assembly as defined in claim 4, wherein a connection between said two intersecting circles forming said base portion is generally rounded.

6. The feeder assembly as defined in claim 4, wherein first and second fill ports receive feed from the feed supply conduit, said first fill port providing feed onto said first portion of said base portion, said second fill port providing feed onto said second portion of said base portion.

7. The feeder assembly as defined in claim 1, wherein said rim member has a top portion which varies in vertical height relative to said base portion of said pan member without adjustment of said feeder assembly.

8. The feeder assembly as defined in claim 1, wherein said rim member is generally formed in a shape of two intersecting circles, wherein one of said intersecting circles defining said rim member is generally positioned about a first portion of said base portion, and wherein said other one of said intersecting circles defining said rim member is generally positioned about a second portion of said base portion.

9. The feeder assembly as defined in claim 8, wherein a connection between said two intersecting circles forming said rim member is generally rounded.

10. The feeder assembly as defined in claim 8, wherein said two intersecting circles defining said rim member have equal diameters.

11. The feeder assembly as defined in claim 8, wherein each of said two intersecting circles defining said rim member has a center, and wherein said rim member has a side portion, said side portion of said rim member provided around said first portion of said base portion of said pan member being varied in radial distance relative to said center of said intersecting circle defining said first portion of said base portion of said pan member, said side portion of said rim member provided around said second portion of said base portion of said pan member being varied in radial distance relative to said center of said intersecting circle defining said second portion of said base portion of said pan member.

12. The feeder assembly as defined in claim 1, wherein said rim member is generally formed in an oval, racetrack, or elliptical shape.

13. The feeder assembly as defined in claim 1, wherein said grill member provides a plurality of apertures therethrough through which birds can eat the feed provided on said base portion.

14. The feeder assembly as defined in claim 13, further comprising means for effectively changing a width of said apertures provided through said grill member.

15. The feeder assembly as defined in claim 13, further comprising means for effectively changing a dimensional height of said apertures provided through said grill member.

16. The feeder assembly as defined in claim 1, wherein said grill member is generally elongated such that a length of said grill member is larger than a width of said pan member.

17. The feeder assembly as defined in claim 1, wherein said pan member is generally elongated such that a length of said pan member is larger than a width of said pan member.

18. A feeder assembly for use in a feed distribution system having a feed supply conduit, said feeder assembly comprising:

a pan member; and a grill member having a rim member which is operatively associated with said pan member, said rim member being generally formed in a shape of intersecting circles, said rim member defining a region which is common to adjacent intersecting circles, wherein said region comprises less than half of an area defined by each of said adjacent intersecting circles, said grill member defining at least one fill port for receiving feed from the feed supply conduit and for providing feed to said pan member.

19. The feeder assembly as defined in claim 18, wherein each of said intersecting circles defining said rim member have equal diameters.

20. The feeder assembly as defined in claim 18, wherein said rim member is generally formed in a shape of two intersecting circles, one of said intersecting circles generally defining a first portion of said feeder assembly and said other one of said intersecting circles generally defining a second portion of said feeder assembly.

21. The feeder assembly as defined in claim 20, wherein a connection between said two intersecting circles forming said rim member is generally rounded.

22. The feeder assembly as defined in claim 20, wherein first and second fill ports receive feed from the feed Supply conduit, said first fill port providing feed to said pan member in said first portion of said feeder assembly, said second fill port providing feed to said pan member in said second portion of said feeder assembly.

23. The feeder assembly as defined in claim 18, wherein said grill member provides a plurality of apertures therethrough through which birds can eat the feed provided in said feeder assembly.

24. The feeder assembly as defined in claim 23, further comprising means for effectively changing a width of said apertures provided through said grill member.

25. The feeder assembly as defined in claim 23, further comprising means for effectively changing a dimensional height of said apertures provided through said grill member.

26. The feeder assembly as defined in claim 18, wherein a base portion of said pan member is generally formed in a shape of two intersecting circles.

27. The feeder assembly as defined in claim 26, wherein a connection between said two intersecting circles forming said base portion is generally rounded.

28. The feeder assembly as defined in claim 26, wherein said two intersecting circles defining said base portion have equal diameters.

29. The feeder assembly as defined in claim 18, wherein a base portion of said pan member is generally formed in an oval, racetrack or elliptical shape.

30. The feeder assembly as defined in claim 18, wherein said pan member is generally elongated such that a length of said pan member is larger than a width of said pan member.

31. The feeder assembly as defined in claim 18, wherein said grill member is generally elongated such that a length of said grill member is larger than a width of said grill member.

32. A feeder assembly for use in a feed distribution system having a feed supply conduit, said feeder assembly comprising:

a pan member having a base portion which is generally formed in a shape of at least two intersecting circles; and a grill member having a rim member which is operatively associated with said pan member, said grill member defining at least one fill port for receiving feed from the feed supply conduit and for providing feed onto said base portion, said rim member having a top portion which varies in vertical height relative to said base portion of said pan member without adjustment of said feeder assembly.

33. A feeder assembly for use in a feed distribution system having a feed supply conduit, said feeder assembly comprising:

a pan member having a base portion which is generally formed in a shape of at least two intersecting circles; and a grill member having a rim member which is operatively associated with said pan member, said grill member defining at least one fill port for receiving feed from the feed supply conduit and for providing feed onto said base portion, said rim member being generally formed in a shape of two intersecting circles, wherein one of said intersecting circles defining said rim member is generally positioned about a first portion of said base portion, and wherein said other one of said intersecting circles defining said rim member is generally positioned about a second portion of said base portion, wherein each of said two intersecting circles of said grill member has a center, and wherein said rim member has a side portion, said side portion of said rim member provided around said first portion of said base portion of said pan member being varied in radial distance relative to said center of said intersecting circle defining said first portion of said base portion of said pan member, said side portion of said rim member provided around said second portion of said base portion of said pan member being varied in radial distance relative to said center of said intersecting circle defining said second portion of said base portion of said pan member.

* * * * *

UNITED STATES PATENT AND TRADEMARK OFFICE

CERTIFICATE OF CORRECTION

PATENT NO. : 7,581,512 B2
APPLICATION NO. : 11/539943
DATED : September 1, 2009
INVENTOR(S) : Theodore J. Cole, Lionel L. Kreger and Charles R. Bird It is certified that error appears in the above-identified patent and that said Letters Patent is hereby corrected as shown below:

Column 47, Line 11 “comprises rises less” should read
--comprises less--

Signed and Sealed this

Twenty-seventh Day of April, 2010

David J. Kappos
*Director of the United States Patent and Trademark Office*